(12) United States Patent
Chiwata et al.

(10) Patent No.: US 8,042,906 B2
(45) Date of Patent: Oct. 25, 2011

(54) IMAGE FORMING METHOD AND APPARATUS

(75) Inventors: Yuhei Chiwata, Kanagawa-ken (JP); Jun Yamanobe, Kanagawa-ken (JP); Toshiyuki Makuta, Kanagawa-ken (JP); Naoki Kusunoki, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 523 days.

(21) Appl. No.: 12/237,017

(22) Filed: Sep. 24, 2008

(65) Prior Publication Data
US 2009/0079784 A1    Mar. 26, 2009

(30) Foreign Application Priority Data

Sep. 25, 2007 (JP) ................................. 2007-247969
Sep. 27, 2007 (JP) ................................. 2007-252445
Aug. 14, 2008 (JP) ................................. 2008-208983

(51) Int. Cl.
*B41J 2/015* (2006.01)
(52) U.S. Cl. ......................................................... 347/21
(58) Field of Classification Search .................... 347/21, 347/103
See application file for complete search history.

(56) References Cited

U.S. PATENT DOCUMENTS

| | | | |
|---|---|---|---|
| 6,257,716 B1 | 7/2001 | Yanagawa et al. | |
| 6,402,317 B2 | 6/2002 | Yanagawa et al. | |
| 6,422,696 B1 | 7/2002 | Takahashi et al. | |
| 7,281,790 B2 | 10/2007 | Mouri et al. | |
| 7,381,756 B2 * | 6/2008 | Kato et al. | 523/160 |
| 2004/0017406 A1 | 1/2004 | Kato et al. | |
| 2005/0110855 A1 | 5/2005 | Taniuchi et al. | |
| 2006/0164488 A1 | 7/2006 | Taniuchi et al. | |
| 2006/0238592 A1 | 10/2006 | Kadomatsu et al. | |
| 2007/0064077 A1 | 3/2007 | Konno | |

FOREIGN PATENT DOCUMENTS

| | | |
|---|---|---|
| JP | 11-188858 A | 7/1999 |
| JP | 2000-280460 A | 10/2000 |
| JP | 2004-10633 A | 1/2004 |
| JP | 2004-90595 A | 3/2004 |
| JP | 2004-114675 A | 4/2004 |
| JP | 2005-170036 A | 6/2005 |
| JP | 2006-137127 A | 6/2006 |
| JP | 2007-69584 A | 3/2007 |

* cited by examiner

*Primary Examiner* — An Do
(74) *Attorney, Agent, or Firm* — Birch, Stewart, Kolasch & Birch, LLP

(57) ABSTRACT

The image forming method is for forming an image on an image formation body by using an ink liquid including a coloring material and an aggregation treatment agent including a component that causes the coloring material to aggregate. The image forming method includes: an aggregation treatment layer formation step of forming, on the image formation body, a semisolid aggregation treatment layer that includes the aggregation treatment agent and has a moisture content ratio not more than 56%; an ink droplet deposition step of ejecting droplets of the ink liquid and depositing the droplets of the ink liquid onto the image formation body where the aggregation treatment layer has been formed; and a solvent removal step of removing a liquid solvent present on the image formation body after the ink droplet deposition step.

24 Claims, 42 Drawing Sheets

| | TEST 1 (COMPARATIVE) | TEST 2 (COMPARATIVE) | TEST 3 (EXAMPLE) | TEST 4 (EXAMPLE) | TEST 5 (EXAMPLE) | TEST 6 (COMPARATIVE) |
|---|---|---|---|---|---|---|
| DRYING | NO | YES | YES | YES | YES | YES |
| TOTAL AMOUNT (g/m²) | 2.50 | 2.18 | 2.01 | 1.81 | 1.31 | 1.01 |
| AMOUNT, EXCEPT WATER (g/m²) *1 | 0.88 | 0.88 | 0.88 | 0.88 | 0.88 | 0.88 |
| AMOUNT OF WATER (g/m²) | 1.62 | 1.30 | 1.13 | 0.93 | 0.43 | 0.13 |
| MOISTURE CONTENT RATIO (%) | 64.80 | 59.63 | 56.21 | 51.38 | 32.82 | 12.87 |
| MOVEMENT OF COLORING MATERIAL | POOR | POOR | GOOD | EXCELLENT | EXCELLENT | EXCELLENT |
| LINE WIDTH, LIQUID RESIDUE | GOOD | GOOD | GOOD | GOOD | GOOD | POOR |
| DOT EXPANSION RATIO | 1.735 | 1.705 | 1.695 | 1.685 | 1.660 | 1.648 |

NOTE 1: AMOUNT OF COMPONENTS OTHER THAN WATER:
MALONIC ACID 0.38 g/m², DIETHYLENE GLYCOL MONOMETHYL ETHER 0.5 g/m²

| TYPE OF AGGREGATING AGENT | PREPARATION | DRYING | MOISTURE CONTENT RATIO | MOVEMENT OF COLORING MATERIAL | LINE WIDTH, LIQUID RESIDUE |
|---|---|---|---|---|---|
| ACID TREATMENT AGENT | TREATMENT LIQUID 1 | NO | 65 | POOR | GOOD |
| ACID TREATMENT AGENT | TREATMENT LIQUID 1 | YES | 51 | EXCELLENT | GOOD |
| ACID TREATMENT AGENT | TREATMENT LIQUID 2 | NO | 65 | POOR | GOOD |
| ACID TREATMENT AGENT | TREATMENT LIQUID 2 | YES | 51 | EXCELLENT | GOOD |
| ACID TREATMENT AGENT | TREATMENT LIQUID 3 | NO | 65 | POOR | GOOD |
| ACID TREATMENT AGENT | TREATMENT LIQUID 3 | YES | 51 | EXCELLENT | GOOD |
| ACID TREATMENT AGENT | TREATMENT LIQUID 4 | NO | 65 | POOR | GOOD |
| ACID TREATMENT AGENT | TREATMENT LIQUID 4 | YES | 51 | EXCELLENT | GOOD |
| POLYVALENT METAL SALT | TREATMENT LIQUID 5 | NO | 65 | FAIR | POOR |
| POLYVALENT METAL SALT | TREATMENT LIQUID 5 | YES | 51 | EXCELLENT | POOR |
| POLYVALENT METAL SALT | TREATMENT LIQUID 6 | NO | 65 | FAIR | POOR |
| POLYVALENT METAL SALT | TREATMENT LIQUID 6 | YES | 51 | EXCELLENT | POOR |
| CATIONIC POLYMER | TREATMENT LIQUID 7 | NO | 65 | FAIR | POOR |
| CATIONIC POLYMER | TREATMENT LIQUID 7 | YES | 51 | EXCELLENT | POOR |

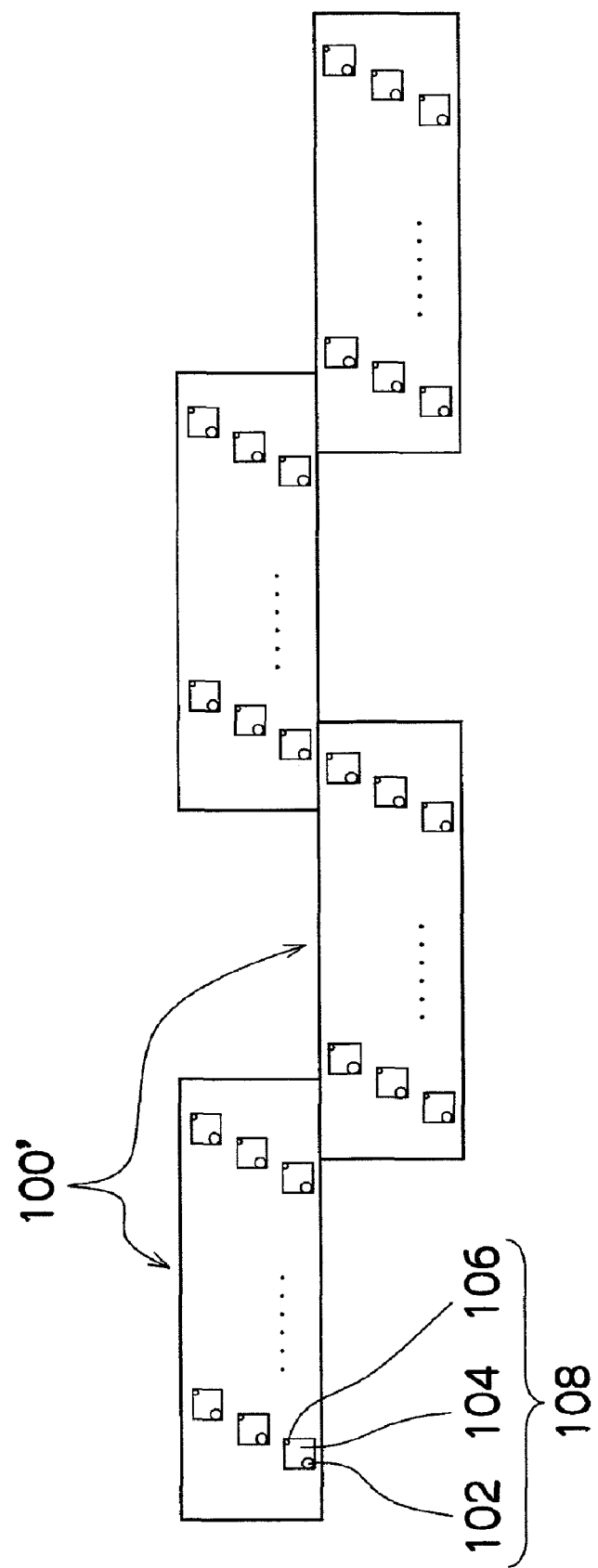

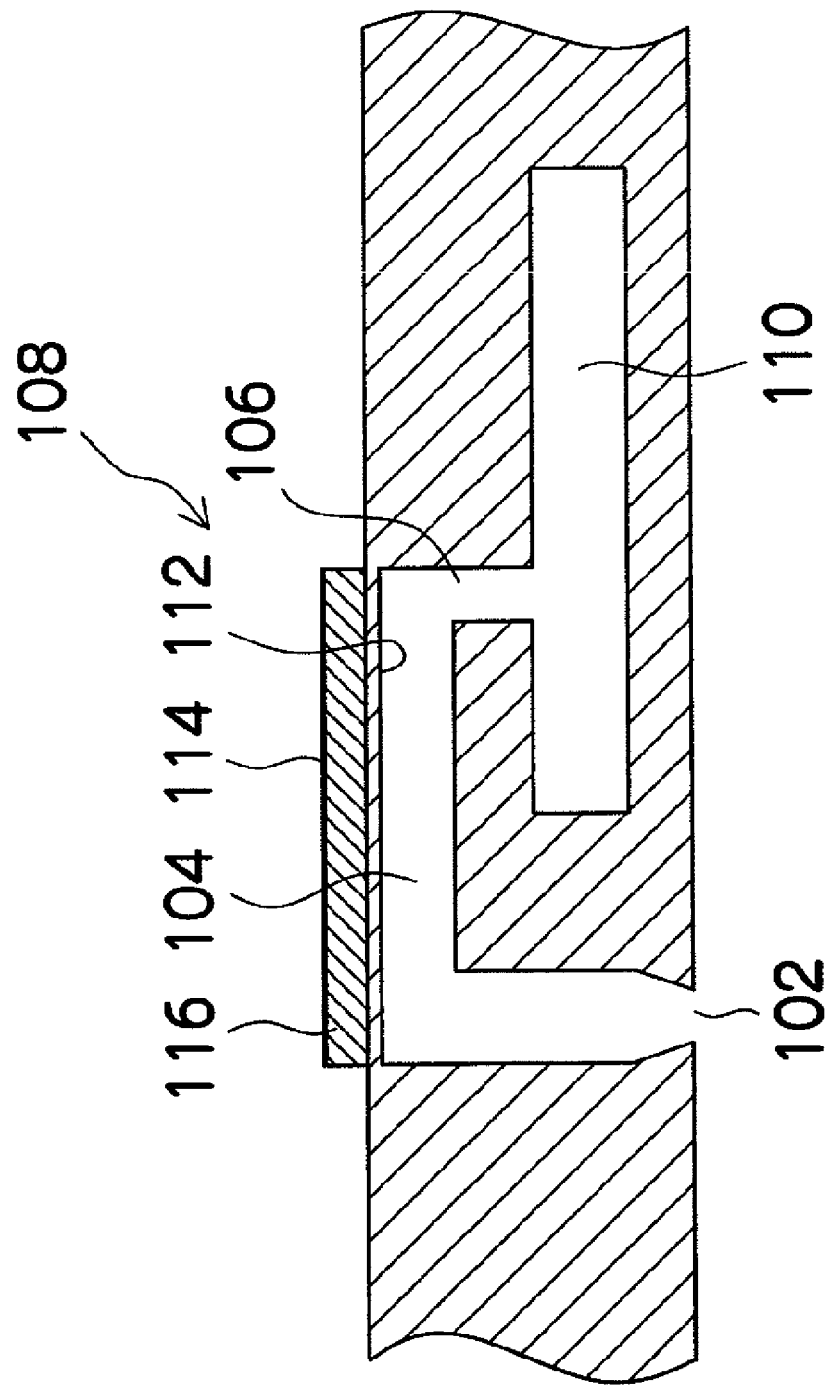

FIG.22

| | TEST 1 (COMPARATIVE) | TEST 2 (COMPARATIVE) | TEST 3 (EXAMPLE) | TEST 4 (EXAMPLE) | TEST 5 (EXAMPLE) | TEST 6 (COMPARATIVE) |
|---|---|---|---|---|---|---|
| DRYING | NO | YES | YES | YES | YES | YES |
| TOTAL AMOUNT (g/m²) | 2.50 | 2.18 | 2.01 | 1.81 | 1.31 | 1.01 |
| AMOUNT, EXCEPT WATER (g/m²) *1 | 0.88 | 0.88 | 0.88 | 0.88 | 0.88 | 0.88 |
| AMOUNT OF WATER (g/m²) | 1.62 | 1.30 | 1.13 | 0.93 | 0.43 | 0.13 |
| MOISTURE CONTENT RATIO (%) | 64.80 | 59.63 | 56.21 | 51.38 | 32.82 | 12.87 |
| MOVEMENT OF COLORING MATERIAL | POOR | POOR | GOOD | EXCELLENT | EXCELLENT | EXCELLENT |
| LINE WIDTH, LIQUID RESIDUE | GOOD | GOOD | GOOD | GOOD | GOOD | POOR |
| DOT EXPANSION RATIO | 1.735 | 1.705 | 1.695 | 1.685 | 1.660 | 1.648 |

NOTE 1: AMOUNT OF COMPONENTS OTHER THAN WATER:
MALONIC ACID 0.38 g/m², DIETHYLENE GLYCOL MONOMETHYL ETHER 0.5 g/m²

FIG.23

| TYPE OF AGGREGATING AGENT | PREPARATION | DRYING | MOISTURE CONTENT RATIO | MOVEMENT OF COLORING MATERIAL | LINE WIDTH, LIQUID RESIDUE |
|---|---|---|---|---|---|
| ACID TREATMENT AGENT | TREATMENT LIQUID 1 | NO | 65 | POOR | GOOD |
| ACID TREATMENT AGENT | TREATMENT LIQUID 1 | YES | 51 | EXCELLENT | GOOD |
| ACID TREATMENT AGENT | TREATMENT LIQUID 2 | NO | 65 | POOR | GOOD |
| ACID TREATMENT AGENT | TREATMENT LIQUID 2 | YES | 51 | EXCELLENT | GOOD |
| ACID TREATMENT AGENT | TREATMENT LIQUID 3 | NO | 65 | POOR | GOOD |
| ACID TREATMENT AGENT | TREATMENT LIQUID 3 | YES | 51 | EXCELLENT | GOOD |
| ACID TREATMENT AGENT | TREATMENT LIQUID 4 | NO | 65 | POOR | GOOD |
| ACID TREATMENT AGENT | TREATMENT LIQUID 4 | YES | 51 | EXCELLENT | GOOD |
| POLYVALENT METAL SALT | TREATMENT LIQUID 5 | NO | 65 | FAIR | POOR |
| POLYVALENT METAL SALT | TREATMENT LIQUID 5 | YES | 51 | EXCELLENT | POOR |
| POLYVALENT METAL SALT | TREATMENT LIQUID 6 | NO | 65 | FAIR | POOR |
| POLYVALENT METAL SALT | TREATMENT LIQUID 6 | YES | 51 | EXCELLENT | POOR |
| CATIONIC POLYMER | TREATMENT LIQUID 7 | NO | 65 | FAIR | POOR |
| CATIONIC POLYMER | TREATMENT LIQUID 7 | YES | 51 | EXCELLENT | POOR |

FIG.28

| | LIQUID COMPOSITION | |
|---|---|---|
| AGGREGATION TREATMENT LIQUID | 2-PYRROLIDONE-5-CARBOXYLIC ACID | 10 PARTS BY WEIGHT |
| | LiOH · H$_2$O | 2 PARTS BY WEIGHT |
| | OLFINE | 1 PART BY WEIGHT |
| | DEIONIZED WATER | BALANCE |
| INK | PIGMENT | 5 PARTS BY WEIGHT |
| | GLYCERIN | 20 PARTS BY WEIGHT |
| | DIETHYLENE GLYCOL | 10 PARTS BY WEIGHT |
| | JOHNCRIL 537 (MANUFACTURED BY JOHNSON POLYMER) | 1 PART BY WEIGHT |
| | OLFINE | 1 PART BY WEIGHT |
| | DEIONIZED WATER | BALANCE |

FIG.29

| | TEST A (COMPARATIVE) | TEST B (COMPARATIVE) | TEST C (EXAMPLE) | TEST D (EXAMPLE) | TEST E (COMPARATIVE) |
|---|---|---|---|---|---|
| DRYING | NO | YES | YES | YES | YES |
| TOTAL AMOUNT (g/m²) | 10.0 | 3.42 | 3.06 | 1.83 | 1.53 |
| AMOUNT, EXCEPT WATER (g/m²) *1 | 1.30 | 1.30 | 1.30 | 1.30 | 1.30 |
| AMOUNT OF WATER (g/m²) | 8.70 | 2.12 | 1.76 | 0.53 | 0.23 |
| MOISTURE CONTENT RATIO (%) | 87.00 | 61.98 | 57.52 | 28.96 | 15.00 |
| MOVEMENT OF COLORING MATERIAL | POOR | POOR | GOOD | EXCELLENT | EXCELLENT |
| LINE WIDTH, LIQUID RESIDUE | GOOD | GOOD | GOOD | GOOD | POOR |

EVALUATION CRITERIA FOR COLORING MATERIAL MOVEMENT, LINE WIDTH, LIQUID RESIDUE ARE IDENTICAL TO THOSE OF EXAMPLE 1

FIG.31

| | DRYING OF TREATMENT LIQUID | MOISTURE CONTENT RATIO | TIME FROM INK EJECTION TO CONTACT WITH ABSORBING BODY | OPTICAL DENSITY AFTER SOLVENT ABSORPTION BY ABSORBING BODY |
|---|---|---|---|---|
| TEST a (EXAMPLE) | YES | 56% | 0.7 sec | 0.028 |
| TEST b (EXAMPLE) | YES | 52% | 0.7 sec | 0.027 |
| TEST c (COMPARATIVE) | NO | 87% | 0.7 sec | 0.125 |
| TEST d (COMPARATIVE) | NO | 87% | 30 sec | 0.041 |

FIG.32

| | LIQUID COMPOSITION | |
|---|---|---|
| AGGREGATION TREATMENT LIQUID | 2-PYRROLIDONE-5-CARBOXYLIC ACID | 10 PARTS BY WEIGHT |
| | LiOH·H₂O | 2 PARTS BY WEIGHT |
| | LIQUID INCLUDING POLYOLEFIN PARTICLES (CHEMIPEARL W400, MANUFACTURED BY MITSUBISHI CHEMICAL) | 10 PARTS BY WEIGHT |
| | FLUORINE-CONTAINING SURFACTANT (1,4-BIS(3,3,4,4,5,5,6,6,6-NONAFLUOROHEXYL)-2-SULFOBUTANEDIOATE SODIUM SALT) | 1 PART BY WEIGHT |
| | DEIONIZED WATER | BALANCE |
| INK | PIGMENT | 5 PARTS BY WEIGHT |
| | GLYCERIN | 20 PARTS BY WEIGHT |
| | DIETHYLENE GLYCOL | 10 PARTS BY WEIGHT |
| | JOHNCRIL 537 (MANUFACTURED BY JOHNSON POLYMER) | 1 PART BY WEIGHT |
| | OLFINE | 1 PART BY WEIGHT |
| | DEIONIZED WATER | BALANCE |

FIG.33

| | EXAMPLE | COMPARATIVE |
|---|---|---|
| IMAGE FORMATION OF CHARACTER | | |
| IMAGE FORMATION OF CHARACTER IN WHITE | | |

FIG.34

[EVALUATION ITEM] IMAGE SHRINKAGE

| | | PARTICLE APPLICATION AMOUNT (g/m²) | | | | | | |
|---|---|---|---|---|---|---|---|---|
| | | 0.001 | 0.01 | 0.1 | 1 | 3 | 5 | 10 |
| MEAN PARTICLE SIZE (μm) | 0.01 | POOR | POOR | POOR | POOR | POOR | POOR | POOR |
| | 0.1 | POOR | FAIR | FAIR | FAIR | FAIR | FAIR | FAIR |
| | 1 | POOR | FAIR | GOOD | GOOD | GOOD | GOOD | GOOD |
| | 3 | POOR | FAIR | GOOD | GOOD | GOOD | GOOD | GOOD |
| | 5 | POOR | FAIR | GOOD | GOOD | GOOD | GOOD | GOOD |
| | 10 | POOR | FAIR | GOOD | GOOD | GOOD | GOOD | GOOD |
| | 20 | POOR | FAIR | GOOD | GOOD | GOOD | GOOD | GOOD |

FIG.35

| [EVALUATION ITEM] | IMAGE NOISE | PARTICLE APPLICATION AMOUNT (g/m²) | | | | | | | |
|---|---|---|---|---|---|---|---|---|---|
| | | 0.001 | 0.01 | 0.1 | 1 | 3 | 5 | 10 |
| MEAN PARTICLE SIZE (μm) | 0.01 | GOOD | GOOD | GOOD | GOOD | GOOD | GOOD | GOOD |
| | 0.1 | GOOD | GOOD | GOOD | GOOD | GOOD | GOOD | GOOD |
| | 1 | GOOD | GOOD | GOOD | GOOD | GOOD | GOOD | GOOD |
| | 3 | GOOD | GOOD | GOOD | GOOD | GOOD | GOOD | GOOD |
| | 5 | GOOD | GOOD | GOOD | GOOD | GOOD | GOOD | GOOD |
| | 10 | FAIR | FAIR | FAIR | FAIR | FAIR | FAIR | FAIR |
| | 20 | POOR | POOR | POOR | POOR | POOR | POOR | POOR |

FIG.36

[EVALUATION ITEM] PRINT APPEARANCE

| | | PARTICLE APPLICATION AMOUNT (g/m²) | | | | | | |
|---|---|---|---|---|---|---|---|---|
| | | 0.001 | 0.01 | 0.1 | 1 | 3 | 5 | 10 |
| MEAN PARTICLE SIZE (μm) | 0.01 | GOOD | GOOD | GOOD | GOOD | GOOD | FAIR | POOR |
| | 0.1 | GOOD | GOOD | GOOD | GOOD | GOOD | FAIR | POOR |
| | 1 | GOOD | GOOD | GOOD | GOOD | GOOD | FAIR | POOR |
| | 3 | GOOD | GOOD | GOOD | GOOD | GOOD | FAIR | POOR |
| | 5 | GOOD | GOOD | GOOD | GOOD | GOOD | FAIR | POOR |
| | 10 | GOOD | GOOD | GOOD | GOOD | GOOD | FAIR | POOR |
| | 20 | GOOD | | | | | | |

FIG.37

[EVALUATION ITEM] TOTAL EVALUATION

| | | PARTICLE APPLICATION AMOUNT (g/m²) | | | | | | |
|---|---|---|---|---|---|---|---|---|
| | | 0.001 | 0.01 | 0.1 | 1 | 3 | 5 | 10 |
| MEAN PARTICLE SIZE (μm) | 0.01 | POOR | POOR | POOR | POOR | POOR | POOR | POOR |
| | 0.1 | POOR | GOOD | GOOD | GOOD | GOOD | FAIR | POOR |
| | 1 | POOR | GOOD | GOOD | GOOD | GOOD | GOOD | POOR |
| | 3 | POOR | GOOD | EXCELLENT | EXCELLENT | EXCELLENT | GOOD | POOR |
| | 5 | POOR | GOOD | EXCELLENT | EXCELLENT | EXCELLENT | GOOD | POOR |
| | 10 | POOR | FAIR | GOOD | GOOD | GOOD | FAIR | POOR |
| | 20 | POOR | POOR | POOR | POOR | POOR | POOR | POOR |

FIG.38

| | IMAGE SHRINKAGE | TRANSFER-ABILITY | GLOSS | ABRASION RESISTANCE |
|---|---|---|---|---|
| METAL MICROPARTICLES (TiO₂) (TIPARK R980, MANUFACTURED BY ISHIHARA SANGYO) | GOOD | GOOD | FAIR | FAIR |
| WAX (PARAFFIN WAX) (TRASOL PF60, MANUFACTURED BY CHUKYO YUSHI) | GOOD | GOOD | GOOD | FAIR |
| ACRYLIC POLYMER (JURIMER FC-30, MANUFACTURED BY NIPPON JUNYAKU) | GOOD | GOOD | GOOD | GOOD |
| POLYOLEFIN (CHEMIPEARL W400, MANUFACTURED BY MITSUBISHI CHEMICAL) | GOOD | EXCELLENT | GOOD | GOOD |

FIG.39

| | LIQUID COMPOSITION | |
|---|---|---|
| FIRST TREATMENT LIQUID (PARTICLE DISPERSION) | LIQUID INCLUDING POLYOLEFIN PARTICLES (CHEMIPEARL W400 MANUFACTURED BY MITSUBISHI CHEMICAL) | 10 PARTS BY WEIGHT |
| | FLUORINE-CONTAINING SURFACTANT (1,4-BIS(3,3,4,4,5,5,6,6,6-NONAFLUOROHEXYL)- 2-SULFOBUTANEDIOATE SODIUM SALT) | 1 PART BY WEIGHT |
| | DEIONIZED WATER | BALANCE |
| SECOND TREATMENT LIQUID (AGGREGATION TREATMENT AGENT) | 2-PYRROLIDONE-5-CARBOXYLIC ACID | 10 PARTS BY WEIGHT |
| | LiOH · H$_2$O | 2 PARTS BY WEIGHT |
| | FLUORINE-CONTAINING SURFACTANT (1,4-BIS(3,3,4,4,5,5,6,6,6-NONAFLUOROHEXYL)- 2-SULFOBUTANEDIOATE SODIUM SALT) | 1 PART BY WEIGHT |
| | DEIONIZED WATER | BALANCE |
| INK | PIGMENT | 5 PARTS BY WEIGHT |
| | GLYCERIN | 20 PARTS BY WEIGHT |
| | DIETHYLENE GLYCOL | 10 PARTS BY WEIGHT |
| | JOHNCRIL 537 (MANUFACTURED BY JOHNSON POLYMER) | 1 PART BY WEIGHT |
| | OLFINE | 1 PART BY WEIGHT |
| | DEIONIZED WATER | BALANCE |

IMAGE FORMING METHOD AND APPARATUS

BACKGROUND OF THE INVENTION

1. Field of the Invention

The present invention relates to an image forming method and an image forming apparatus, and more particularly to an image forming method and an image forming apparatus in which an image is formed on an image formation body by using an ink and an aggregation treatment agent.

2. Description of the Related Art

In the inkjet recording system, the recording is performed by discharging ink droplets from nozzles and causing the ink droplets to adhere to a recording medium or the like. By contrast with other systems, noise during the recording operation is low, running cost is low, and image recording with high resolution and high quality can be performed. The ink ejection system can be a piezoelectric system using the displacement of a piezoelectric element or a thermal system using thermal energy generated by a heat-generating element.

Image forming methods in the inkjet recording system generally can be classified into two systems: a direct image formation system in which an image is directly formed on a recording medium (for example, a mildly permeable medium such as coated paper for printing) and an intermediate transfer system in which an image is formed on an impermeable medium such as a plastic sheet and then the image is transferred onto a recording medium.

However, the problem associated with the inkjet recording system is that where dots are formed to a high density such that the adjacent dots overlap by using ink droplets that are continuously deposited onto the recording medium, the so-called landing interference (bleeding) occurs, namely, the ink droplets forming the adjacent dots merge under the effect of surface tension on the recording medium and dots of desired shape and size cannot be formed. Where the aforementioned landing interference occurs, when the dots have the same color, the shape of dots collapses, and when the dots of different colors are obtained, not only the dot shape collapses, but also colors are mixed.

A two-liquid aggregation system using a treatment liquid that reacts with ink and causes the ink to aggregate has been suggested as means for preventing such landing interference occurring between the ink droplets (dots) on the recording medium. For example, Japanese Patent Application Publication No. 2004-010633 discloses a technology that improves optical density, oozing, oozing between colors (bleeding), and drying time in the two-liquid aggregation system by imparting acidic properties to one liquid from among the liquid composition (treatment liquid) and ink and imparting alkaline properties to the other and controlling the aggregation ability of the pigment on the recording medium.

Further, an intermediate transfer system in which an image formed on an intermediate transfer body is transferred onto a recording medium has been suggested as a technique for preventing image deterioration caused by a liquid solvent (ink solvent etc.) present on the recording medium and curing of the recording medium. For example, Japanese Patent Application Publication No. 11-188858 discloses a method by which a powder layer (water-soluble resin) that demonstrates solubility or swellability with respect to ink droplets, can increase the viscosity of ink droplets, and can be peeled off from an intermediate transfer body is formed in advance on the intermediate transfer body before the ink droplets land on the intermediate transfer body, whereby high-speed recording is enabled, without bleeding into the permeable recording medium.

In the case of the above-described intermediate transfer method, a medium that is impermeable to inks (impermeable medium) is typically employed for the intermediate transfer body with the object of improving transferability. As a result, where ink droplets are continuously deposited so that the adjacent droplets (dots) overlap on the intermediate transfer body, a problem of bleeding (landing interference) is encountered, namely, the adjacent ink droplets merge on the intermediate transfer body under the effect of surface tension of the droplets and the desired dots cannot be formed. Such bleeding makes it difficult to perform high-speed printing.

The following methods have been suggested to resolve the above-described problems.

(1) A method of incorporating a two-liquid aggregation system using ink aggregation induced by a treatment agent into the intermediate transfer system. Japanese Patent Application Publication Nos. 2004-090595, 2004-114675, and 2005-170036 disclose methods that resolve the bleeding problem by applying an ink aggregating agent to the intermediate transfer body before the ink is deposited, thereby decreasing the flowability of the ink. In this case, a water-soluble pigment ink is used as the ink and a polyvalent metal salt or an acidic solution is used as the ink aggregating agent.

(2) A method of forming concavities and convexities on the intermediate transfer body Japanese Patent Application Publication Nos. 2006-137127 and 2007-069584 disclose methods for forming concavities and convexities on the surface of intermediate transfer body and preventing bleeding by an anchor effect.

(3) Method using water-absorbing particles

Japanese Patent Application Publication Nos. 2000-280460 discloses a method for preventing bleeding by forming a layer composed of particles that are soluble in water or swell when water is supplied thereto on an intermediate transfer body and causing the particles to absorb the ink.

However, the below-described unresolved problems are still associated with image formation in the two-liquid aggregation system and intermediate transfer system, and further improvements are needed.

<Problems Arising in Two-Liquid Aggregation System>

Where an ink is deposited after applying a treatment liquid (aggregation treatment liquid) to an impermeable medium (intermediate transfer system) such as a plastic sheet or mildly permeable medium (direct image forming system) such as coated paper for printing, ink aggregates (coloring material aggregates) formed due to mixing and reaction (aggregation reaction) of the treatment liquid and ink do not remain in the desired position and move. A new problem that results therefrom is that the output image is greatly distorted with respect to the desired image.

A general process implemented in the two-liquid aggregation system in the related art will be described below with reference to FIGS. 40A to 40E. First, an aggregation treatment layer (liquid layer) 902 having a predetermined thickness is formed on a recording medium (impermeable medium) 900 having impermeability (see FIG. 40A). Then, ink droplets 904 are deposited onto the recording medium 900 having the aggregation treatment layer 902 formed thereon. Where the ink droplets 904 land on the aggregation treatment layer 902 located on the recording medium 900 (FIG. 40B), an aggregation reaction instantaneously starts on the entire surface of the ink droplets 904, the aggregation reaction advances before the ink droplets 904 reach the recording medium 900, and ink aggregates (coloring material aggregates) 906 are formed (FIG. 40C). Therefore, the ink aggregates 906 do not come into contact with the recording medium 900 or come into extremely weak contact with the recording medium 900 (FIG. 40D). As a result, the adhesion force (bonding force) between the ink aggregates 906 and recording medium 900 is insufficient, dots composed of the ink aggregates 906 that are in a rolling state assume an unstable adhesion state (for example, a state in which they float in the aggregation treatment layer 902), and cause image deterioration induced by the movement of coloring material.

Further, it has been found that when a liquid solvent (solvent component of the ink and aggregation treatment liquid) 908 on the recording medium 900 is attempted to be absorbed and removed by using, for example, an absorbing body 910 such as a solvent-absorbing roller composed on the surface thereof of a porous material, as shown in FIG. 40E, because the adhesion force between the ink aggregates 906 and recording medium 900 is insufficient, as described hereinabove, part of the coloring material adheres to the absorbing body 910. The problems that result from this drawback include image deterioration caused by insufficient amount of coloring material on the recording medium 900 and reverse transfer of the coloring material that has adhered to the absorbing body 910 to the recording medium 900.

In addition, the following problems (A)-(C) are associated with the method described in Japanese Patent Application Publication No. 11-188858.

(A) Because the coloring material present in the ink is not actively aggregated, where the ink droplets are ejected with a high speed not higher than 10 kHz, the swelling or thickening processes do not proceed in time and landing interference of the adjacent ink droplets occurs.

(B) Because the transferred image formation layer swells due to the absorption of ink solvent, the thickness of the image portion increases causing the so-called "pile height" problem. Problems arising when the image thickness increases include not only the image quality problem associated with change in appearance of the boundary of the printing zone and non-printing zone, but also a problem associated with that a step is felt when this portion is touched.

(C) Because the ink solvent is absorbed by the transferred image formation layer, the ink solvent oozes to the paper surface after transferring and the paper is deformed (the so-called "cockling").

The aforementioned problems (B), (C) arise because an image is formed on the recording medium (paper), while the ink solvent is still contained therein. The problems (A) to (C) cause crucial quality deterioration in high-quality printing.

<Problems Associated with Intermediate Transfer System>

The following problems are associated with the related art of the intermediate transfer system discussed in sections (1) to (3) above that are described in relation to background art.

With the "method using ink aggregation induced by a treatment agent" of section (1), the tests conducted by the inventors demonstrated that when an ink and an aggregating agent react to form an image, shrinking of the image is caused by the ink aggregation reaction and image surface area decreases with respect to the intended one, thereby making it impossible to form a quality image.

Problems arising when the image forming method based on two-liquid aggregation is applied to the intermediate transfer system will be described below in greater details.

FIGS. 41A to 41D are a schematic diagram illustrating the behavior of the ink droplets (dots) in the related art when they land on an intermediate transfer body. FIG. 41A shows a state in which an aggregation treatment agent layer 912 composed of an ink aggregating agent (aggregation treatment liquid) is formed on an intermediate transfer body 910 (impermeable body), FIG. 41B shows a state of the aggregation treatment agent layer 912 before the ink droplets 914 land on the intermediate transfer body 910, FIG. 41C shows a state immediately before the ink droplet 914 lands, and FIG. 41D shows a state about 1 sec after the ink droplet 914 has landed. First, an aggregation treatment agent is applied to the intermediate transfer body 910 and the aggregation treatment agent layer 912 of a predetermined thickness is formed (FIG. 41A). Where an ink droplet 914 ejected from an inkjet head (not shown in the drawing) thereafter reaches the aggregation treatment agent layer 912, an aggregation reaction starts from the portion of the aggregation treatment agent layer 912 reached by the ink droplet, the viscosity of ink droplet locally rises, and an ink aggregate (coloring agent aggregate) 916 is formed (FIG. 41B). Immediately after the ink droplet 914 has landed on the intermediate transfer body 910, the ink droplet 914 spreads to a certain size on the intermediate transfer body 910 due to kinetic energy of the droplet, the aggregation reaction advances in the entire ink droplet 914, and viscosity rises (FIG. 41C). Where the aggregation reaction further proceeds as the time elapses, the ink aggregate shrinks as the solvent located in the ink droplet 914 is released to the outside (FIG. 41D). In this case, the dot size reduction occurs.

FIGS. 42A and 42B are a schematic diagram illustrating the behavior observed when an image is formed according to the related art. FIG. 42A shows the state immediately before the image is formed. In this case, a portion (image portion) 920 where a coloring material is to be applied and a white background portion (image-free portion) 922 are formed in accordance with the input image data. It will be assumed that the image portion 920 is formed by a plurality of dots. FIG. 42B represents a state about 1 sec after the image has been formed. The aggregation reaction proceeds similarly to the process illustrated by FIGS. 41A to 41D, shrinkage of the image portion 920 occurs, and the surface area of the white background portion 922 becomes larger than the desired one.

With the "method for forming concavities and convexities on the intermediate transfer body" of section (2) above, where concavities and convexities are formed on the intermediate transfer body surface, the contact surface area of the ink layer and intermediate transfer body increases and the adhesive force of the two becomes too strong. Furthermore, adhesion of the recording medium and intermediate transfer body decreases. The resultant problem is that transferability onto the recording medium is degraded. Further, the intermediate transfer body has to be cleaned after the transfer, but cleaning ability of the intermediate transfer body surface is degraded by the concavities and convexities.

FIGS. 43A and 43B show schematically the behavior in the transfer process in the related art. FIG. 43A illustrates how an image formed on the intermediate transfer body 930 having concavities and convexities formed on the surface thereof is transferred onto the recording medium 932, while a pressure is applied by a transfer roller (not shown in the drawing). The reference numeral 934 represents an ink layer configuring an image formed on the intermediate transfer body 930. FIG. 43B shows a state after the recording medium 932 has been peeled off (that is, the state after transferring). Where concavities and convexities are formed on the surface of the intermediate transfer body 930, the contact surface area of the ink layer 934 and intermediate transfer body 930 increases, as described hereinabove. Therefore, part of the ink layer 934 remains on the intermediate transfer body 930 after the transfer, thereby causing transfer defects such as image deterioration.

Further, in the "system using water-absorbing particles" of section (3) above, a particulate layer that has absorbed ink is directly transferred onto the paper. The resultant problem is that a thick image is formed on the paper. For example, when a standard inkjet ink with a pigment concentration in the ink of 4 parts by weight is used, the amount of ink with a thickness about 10 μm is required for high-concentration portions of the image, but when the image on paper has a thickness of 10 μm, a strong unpleasant feel is created by the appearance of the printed matter and problems are associated with quality thereof.

Thus, there is still room for improvement in the two-liquid aggregation system and intermediate transfer system.

SUMMARY OF THE INVENTION

With the foregoing in view, it is an object of the present invention to provide an image forming method and image forming apparatus that can form a high-quality image in a two-liquid aggregation system using an ink and an aggregation treatment agent, while preventing the deterioration of image quality caused by the movement of coloring material.

Another object of the present invention is to provide an image forming method and image forming apparatus that can prevent the occurrence of image size reduction caused by aggregation reaction of an ink coloring material in the intermediate transfer system, improve transferability, and form a high-quality image.

In order to attain the aforementioned object, the present invention is directed to an image forming method for forming an image on an image formation body, by using an ink liquid, including a coloring material and an aggregation treatment agent including a component that causes the coloring material to aggregate, the method comprising: an aggregation treatment layer formation step of forming, on the image formation body, a semisolid aggregation treatment layer that includes the aggregation treatment agent and has a moisture content ratio not more than 56%; an ink droplet deposition step of ejecting droplets of the ink liquid and depositing the droplets of the ink liquid onto the image formation body where the aggregation treatment layer has been formed; and a solvent removal step of removing a liquid solvent present on the image formation body after the ink droplet deposition step.

According to this first aspect of the present invention, the semisolid aggregation treatment layer that includes an aggregation treatment agent and has a moisture content ratio not more than 56% is formed on an image formation body and then the ink droplets are deposited. As a result, when the ink droplet lands on the aggregation treatment layer, an aggregation reaction is instantaneously started from the surface of contact with the aggregation treatment layer, and a dot composed of an ink aggregate (coloring material aggregate) that has spread to a predetermined size is formed on the aggregation treatment layer. As a result, a sufficient adhesion strength can be obtained between the dot (ink aggregate) and the image formation body, image deterioration caused by the movement of coloring material can be prevented and high-quality image recording can be performed.

Therefore, in a two-liquid aggregation system using the ink and the aggregation treatment agent, high-quality image recording can be performed, while preventing the deterioration of image quality caused by the movement of coloring material.

Further, the image forming method in accordance with the present invention can be applied both to the direct image forming system in which an image is directly formed on an image formation body and in the intermediate transfer system in which an image is formed on an impermeable image formation body and then the image is transferred onto the recording medium. In the case of the direct image forming system, the present invention is especially effective when the image formation body is a recording medium having a property of mild permeability or impermeability. Here, for example, a coated paper for printing can be used as the recording medium having a property of mild permeability.

In the case of the intermediate transfer system, the liquid solvent present on the intermediate transfer body is removed, while inhibiting the movement of coloring material on the intermediate transfer body, and the image is then transferred. Therefore, image deterioration and curling of the recording medium caused by liquid solvent can be prevented and image quality can be increased.

In the aggregation treatment layer formation step according to the present invention, the aggregation treatment agent is preferably dried. As a result, even if the moisture content of the aggregation treatment agent applied onto the image formation body is high, the moisture content ratio of the aggregation treatment layer can be adjusted by drying to 56% or below. As a consequence, an aggregation treatment agent with a high moisture content can be used and, therefore, the application to the image formation body is facilitated and clogging of a nozzle, when such is used for application, can be prevented.

By performing drying after a liquid aggregation treatment agent with a high moisture content has been applied on the image formation body and forming a semisolid aggregation treatment layer, it is possible to form a uniform semisolid aggregation treatment layer on the image formation body, eliminate a spread of size of the ink aggregates (dots) formed by the aggregation reaction of ink droplets, and improve image quality.

An application device such as an application roller or an inkjet head can be employed as a device which applies the aggregation treatment liquid obtained by converting the aggregation treatment agent into a liquid. When the application device is used, a thin layer (aggregation treatment agent layer) with a thickness of about 0.5 μm to 20 μm can be uniformly formed. Further, when an inkjet head is used, the aggregation treatment liquid can be selectively applied in an on-demand mode according to the recorded image (image data), and the consumption of treatment agent and energy on drying can be reduced.

Further, a step of removing a liquid solvent present on the image formation body by drying or a step of removing the liquid solvent present on the image formation body by absorption with an absorbing body can be advantageously used as the step of removing a solvent in accordance with the present invention.

In particular, when an absorbing body is used, in accordance with the present invention, a sufficient adhesion force can be obtained between the dot (image aggregate) and the image formation body. Therefore, adhesion of the coloring material to the absorbing body can be prevented. As a result, a large amount of liquid solvent can be removed from the image formation body within a short interval, without degrading the image quality, and productivity can be increased.

In the case of an intermediate transfer system, a medium having impermeability, such as a medium made of a resin, a metal, or a rubber, is advantageous as the image formation body that is used in accordance with the present invention. Further, in the case of a direct image forming system, a recording medium having mild permeability, such as a coated paper for printing can be advantageously used. Where the image formation body is mildly permeable or impermeable, deterioration of quality caused by the movement of coloring material can be effectively inhibited. Further, the present invention is not limited to the mildly permeable or impermeable bodies and can be also applied to a permeable medium such as the usual paper.

In accordance with the present invention, "the moisture content ratio" is determined as a ratio $((X_2/X_1)\times100)$ of a weight $X_2$ (g/m$^2$) per unit surface area of water contained in the aggregation treatment agent to a weight $X_1$ (g/m$^2$) per unit surface area of the aggregation treatment agent. In accordance with the present invention, the moisture content ratio of the aggregation treatment layer is not more than 56%, that is, the upper limit is established for the moisture content ratio. The preferred lower limit thereof is 32 wt. %.

In accordance with the present invention, the aggregation treatment liquid located on the image formation body may be dried and a semisolid aggregation treatment layer may be formed on the image formation body after the aggregation treatment liquid has been applied on the image formation body, or a semisolid aggregation treatment agent may be directly applied to the image formation body.

In the second aspect of the present invention, the aggregation treatment agent is dried in the aggregation treatment layer formation step.

In the third aspect of the present invention, the image forming method employs a direct image formation system in which an image is directly formed on the image formation body.

In the fourth aspect of the present invention, the image formation body is a recording medium having a property of being mildly permeable or impermeable to liquid.

In the fifth aspect of the present invention, the image forming method employs an intermediate transfer system in which an image is formed on the image formation body that is impermeable and the image is then transferred onto a recording medium.

In the sixth aspect of the present invention, the solvent removal step includes the step of removing the liquid solvent present on the image formation body by drying.

In the seventh aspect of the present invention, the solvent removal step is includes the step of removing the liquid solvent present on the image formation body by absorption on an absorbing body.

In order to attain the aforementioned object, the present invention is directed to an image forming apparatus which forms an image on an image formation body by using an ink liquid including a coloring material and an aggregation treatment agent including a component that causes the coloring material to aggregate, the apparatus comprising: an aggregation treatment layer formation device which forms, on the image formation body, a semisolid aggregation treatment layer that includes the aggregation treatment agent and has a moisture content ratio not more than 56%; an ink droplet deposition device which ejects droplets of the ink liquid and deposits the droplets of the ink liquid onto the image formation body where the aggregation treatment layer has been formed; and a solvent removal device which removes a liquid solvent present on the image formation body after the droplets of the ink liquid have been deposited on the image formation body by the ink droplet deposition device.

In this eighth aspect, the present invention is configured as an apparatus, with which high-quality image formation can be achieved in the two-liquid aggregation system using an ink and an aggregation treatment agent, while preventing image deterioration caused by the movement of coloring material.

In the ninth aspect of the present invention, the aggregation treatment layer formation device comprises: an aggregation treatment liquid application device which applies an aggregation treatment liquid obtained by converting the aggregation treatment agent into a liquid onto the image formation body; and an aggregation treatment liquid drying device which dries the aggregation treatment liquid having been applied on the image formation body and forms the semisolid aggregation treatment layer on the image formation body.

In the tenth aspect of the present invention, the image forming apparatus is of a direct image formation system in which an image is directly formed on the image formation body.

In the eleventh aspect of the present invention, the image formation body is a recording medium having a property of being mildly permeable or impermeable to liquid.

In the twelfth aspect of the present invention, the image forming apparatus is of an intermediate transfer system in which an image is formed on the image formation body that is impermeable and the image is then transferred onto a recording medium.

In the thirteenth aspect of the present invention, the solvent removal device includes a device which removes a liquid solvent present on the image formation body by drying.

In the fourteenth aspect of the present invention, the solvent removal device includes a device which removes a liquid solvent present on the image formation body by absorption on an absorbing body.

The ninth to fourteenth aspects of the present invention establish the preferred modes for the image forming apparatus. The operation effect obtained with the inventions set forth in these claims is identical to that relating to the above-described first to seventh aspects of the present invention.

In order to attain the aforementioned object, the present invention is also directed to an image forming method, comprising the steps of: applying a liquid including a component that causes a coloring material of an ink to aggregate and substantially colorless microparticles onto an intermediate transfer body; drying the liquid having applied on the intermediate transfer body and forming a particulate layer including the microparticles and having a moisture content ratio not more than 56%; ejecting droplets of the ink and depositing the droplets of the ink onto the intermediate transfer body where the particulate layer has been formed, in accordance with image data; removing a liquid solvent present on the intermediate transfer body; and transferring an image formed on the intermediate transfer body to a recording medium.

According to this fifteenth aspect of the present invention, by depositing ink droplets after a particulate layer composed of microparticles and having a moisture content ratio not more than 56% has been formed on the intermediate transfer body, it is possible to prevent the occurrence of image size reduction in the process of aggregation reaction due to the anchor effect of the particle layer. Furthermore, because the contact surface area of the image (ink layer) and intermediate transfer body is decreased by the particulate layer formed on the intermediate transfer body, transferability onto the recording medium increases.

As a result, the occurrence of image size reduction in the process of aggregation reaction of the ink coloring material is prevented, transferability is increased, and high-quality image formation can be performed.

"Substantially colorless" as referred to herein means that when microparticles in accordance with the present invention are applied at 0.1 g/m$^2$, the light absorption density in the visible light region is not more than 0.1. Same hereinbelow.

In the sixteenth and twenty-first aspects of the present invention, a mean particle size of the microparticles is 0.1 μm to 10.0 μm; and an amount of the microparticles applied to the intermediate transfer body is 0.01 g/m² to 5.0 g/m². It is especially preferred that a mean particle size of the microparticles be 3 μm to 5 μm and an amount of the microparticles applied to the intermediate transfer body be 0.1 g/m² to 3 g/m². In this case, the occurrence of image size reduction can be prevented, image noise can be reduced, the printed matter causes no unpleasant feel, and good image quality can be obtained.

In the seventeenth and twenty-second aspects of the present invention, the microparticles include an organic compound. This case is advantageous in terms of gloss of the recording medium.

In the eighteenth and twenty-third aspects of the present invention, the microparticles include a polymer. In this case, abrasion resistance of the recording medium can be further increase.

In the nineteenth and twenty-fourth aspects of the present invention, the microparticles include a polyolefin. In this case, transferability onto the recording medium is further improved.

In order to attain the aforementioned object, the present invention is also directed to an image forming method, comprising the steps of: applying a first liquid including substantially colorless microparticles to an intermediate transfer body; applying a second liquid including a component that causes a coloring material of an ink to aggregate to the intermediate transfer body; drying the first liquid and the second liquid present on the intermediate transfer body after at least the second liquid has been applied on the intermediate transfer body, and forming a particulate layer including the microparticles and having a moisture content ratio not more than 56%; ejecting droplets of the ink and depositing the droplets of the ink onto the intermediate transfer body where the particulate layer has been formed, in accordance with image data; removing a liquid solvent present on the intermediate transfer body; and transferring an image formed on the intermediate transfer body to a recording medium.

In the twentieth aspect of the present invention, a liquid including a component that causes the coloring material of the ink to aggregate and a liquid including substantially colorless microparticles are configured as separate liquids, whereas in the fifteenth aspect of the present invention, a component causing the coloring material of the ink to aggregate and substantially colorless microparticles are configured as one liquid. Thus, a first liquid including substantially colorless microparticles and a second liquid including a component that causes the coloring material of the ink to aggregate are applied independently from each other onto the intermediate transfer body. As a result, the occurrence of image size reduction in the process of aggregation reaction can be prevented by the anchor effect of the particulate layer. Furthermore, because the contact surface area of the image (ink layer) and intermediate transfer body is reduced by the particulate layer formed on the intermediate transfer body, transferability onto the recording medium is increased. In this case, the moisture content ratio of the aggregation treatment layer is also not more than 56%. Therefore, movement of the coloring material included in the deposited ink liquid in the aggregation treatment layer can be remarkably inhibited, and a high-quality image can be formed.

In order to attain the aforementioned object, the present invention is also directed to an image forming apparatus, comprising: a liquid application device which applies a liquid including a component that causes a coloring material of an ink to aggregate and substantially colorless microparticles onto an intermediate transfer body; a drying device which dries the liquid having been applied on the intermediate transfer body and forms a particulate layer including the microparticles and having a moisture content ratio not more than 56%; an ink droplet deposition device which ejects droplets of the ink and deposits the droplets of the ink onto the intermediate transfer body where the particulate layer has been formed, in accordance with image data; a solvent removal device which removes a liquid solvent present on the intermediate transfer body; and a transfer device which transfers an image formed on the intermediate transfer body to a recording medium.

In order to attain the aforementioned object, the present invention is also directed to an image forming apparatus, comprising: a first liquid application device which applies a first liquid including substantially colorless microparticles to an intermediate transfer body; a second liquid application device which applies a second liquid including a component that causes a coloring material of an ink to aggregate to the intermediate transfer body; a drying device which dries the first liquid and the second liquid present on the intermediate transfer body after at least the second liquid has been applied on the intermediate transfer body and forms a particulate layer including the microparticles and having a moisture content ratio not more than 56%; an ink droplet deposition device which ejects droplets of the ink and deposits the droplets of the ink onto the intermediate transfer body where the particulate layer has been formed, in accordance with image data; a solvent removal device which removes a liquid solvent present on the intermediate transfer body; and a transfer device which transfers an image formed on the intermediate transfer body to a recording medium.

These twenty-fifth and twenty-sixth aspects of the present invention are configured as apparatuses. The twenty-fifth aspect of the present invention features an aggregating component and substantially colorless microparticles as one liquid, and the twenty-sixth aspect of the present invention features two separate liquids.

In accordance with the present invention, with such a configuration, the occurrence of image size reduction in the course of aggregation reaction of the coloring material of the ink is prevented, transferability is improved, and high-quality image formation can be performed.

In accordance with the present invention, a variety of methods such as application with an application roller or a blade and droplet ejection with an inkjet head can be employed in a liquid application device (including first and second liquid application devices). In particular, in the case of an inkjet system, the liquid can be accurately patterned and applied in an on-demand mode in accordance with the recording image (image data), the drying time can be shortened, and energy consumed on drying can be reduced.

With the image forming method and image forming apparatus in accordance with the present invention, a semisolid aggregation treatment layer including an aggregation treatment agent and having a moisture content ratio not more than 56% is formed on an image formation body, and where an ink liquid droplet thereafter lands on the aggregation treatment layer as a result of ejection of the ink droplet, an aggregation reaction starts instantaneously from the surface of contact with the aggregation treatment layer, and a dot composed of an ink aggregate (coloring material aggregate) that has spread to a predetermined size is formed on the aggregation treatment layer. As a result, a sufficient adhesive force can be obtained between the dot (ink aggregate) and image formation body, image deterioration caused by the movement of coloring material is prevented, and high-quality image recording can be performed. In the two-liquid aggregation system using an ink and an aggregation treatment agent, high-quality image formation can be performed, while preventing the deterioration of image quality caused by the movement of coloring material.

Further, with the image forming method and image forming apparatus in accordance with the present invention, by forming a particulate layer composed of microparticles and having a moisture content ratio not more than 56% on the intermediate transfer body and then depositing ink droplets, it is possible to prevent the occurrence of image size reduction in the course of aggregation reaction by the anchor effect of the particulate layer. In addition, because the contact surface area of the image (in layer) and intermediate transfer body is reduced by the particulate layer formed on the intermediate transfer body, transferability onto the recording medium is increased.

BRIEF DESCRIPTION OF THE DRAWINGS

FIG. 10 is a plan view illustrating another configuration example of the head;

FIG. 11 is a cross-sectional view along line 11-11 in FIGS. 9A and 9B;

FIG. 22 is a table showing the results obtained in Example 1 of the present invention;

FIG. 23 is a table showing the results obtained in Example 2 of the present invention;

FIG. 28 is a table showing the compositions of ink and treatment liquid of Example 4 of the present invention;

FIG. 29 is a table showing the results obtained in Example 4 of the present invention;

FIG. 31 is a table showing the results obtained in Example 5;

FIG. 32 is a table showing the compositions of ink and treatment liquid of Example 6;

FIG. 33 is a table showing the results obtained in Example 6;

FIG. 34 is a table showing the results relating to image shrinking in Example 7;

FIG. 35 is a table showing the results relating to image noise in Example 7;

FIG. 36 is a table showing the results relating to appearance of printed matter in Example 7;

FIG. 37 is a table showing the results relating general evaluation in Example 7;

FIG. 38 is a table showing the results obtained in Example 8;

FIG. 39 is a table showing the compositions of ink and treatment liquid of Example 9;

DESCRIPTION OF THE PREFERRED EMBODIMENTS

First Embodiment

In the first embodiment of the image forming apparatus in accordance with the present invention, an image is directly formed by a two-liquid aggregation method on a recording medium transported by a drum. In this embodiment of the present invention, the explanation will be conduced with respect to a typical inkjet recording apparatus as an image forming apparatus.

<Entire Configuration of Inkjet Recording Device>

Figure 1:
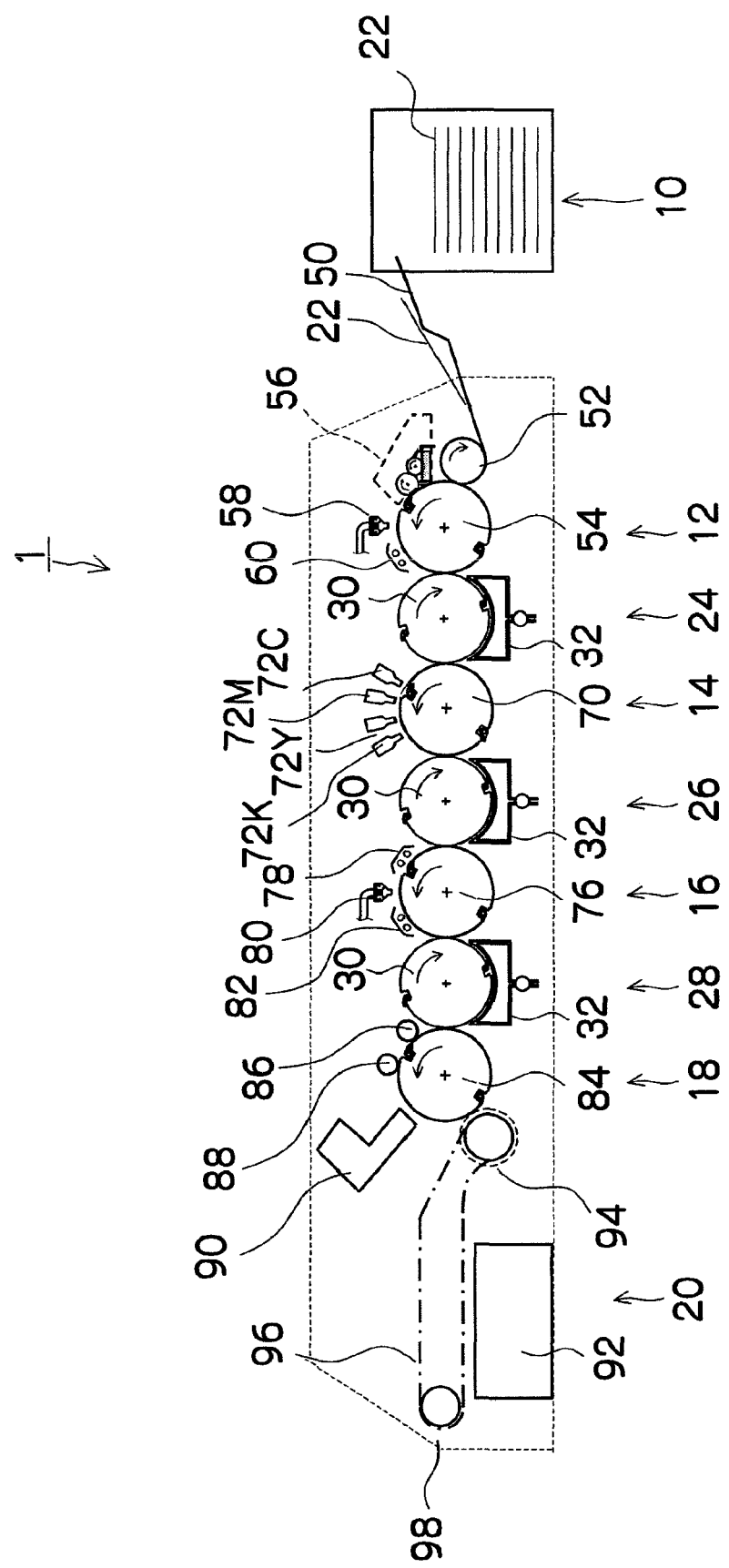
FIG. 1 is a schematic structural diagram illustrating the inkjet printing apparatus of a first embodiment of the present invention.

FIG. 1 is a structural diagram illustrating the entire configuration of an inkjet recording apparatus 1 of the present embodiment. The inkjet recording apparatus 1 shown in the drawing is a device that forms an image on a recording surface of a recording medium 22. The device includes a paper feed unit 10, a treatment liquid application unit 12, an image formation unit 14, a drying unit 16, a fixing unit 18, and a discharge unit 20 as the main components. A recording medium 22 (paper sheets) is stacked in the paper feed unit 10, and the recording medium 22 is fed from the paper feed unit 10 to the treatment liquid application unit 12. A treatment liquid is applied to the recording surface in the treatment liquid application unit 12, and then a color ink is applied to the recording surface in the image formation unit 14. The image is fixed with the fixing unit 18 on the recording medium 22 onto which the ink has been applied, and then the recording medium is discharged with the is discharge unit 20. The recording medium with a size up to a maximum small octavo size (469 mm×636 mm) can be conveyed.

In the inkjet recording apparatus 1, intermediate conveyance units 24, 26, 28 are provided between the units, and the recording medium 22 is transferred by these intermediate conveyance units 24, 26, 28. Thus, a first intermediate conveyance unit 24 is provided between the treatment liquid application unit 12 and image formation unit 14, and the recording medium 22 is transferred from the treatment liquid application unit 12 to the image formation unit 14 by the first intermediate conveyance unit 24. Likewise, the second intermediate conveyance unit 26 is provided between the image formation unit 14 and the drying unit 16, and the recording medium 22 is transferred from the image formation unit 14 to the drying unit 16 by the second intermediate conveyance unit 26. Further, a third intermediate conveyance unit 28 is provided between the drying unit 16 and the fixing unit 18, and the recording medium 22 is transferred from the drying unit 16 to the fixing unit 18 by the third intermediate conveyance unit 28.

Each unit (paper feed unit 10, treatment liquid application unit 12, image formation unit 14, drying unit 16, fixing unit 18, discharge unit 20, and first to third intermediate conveyance units 24, 26, 28) of the inkjet recording apparatus 1 will be described below in greater details.

<Paper Feed Unit>

The paper feed unit 10 feeds the recording medium 22 to the image formation unit 14. A paper feed tray 50 is provided in the paper feed unit 10, and the recording medium 22 is fed, sheet by sheet, from the paper feed tray 50 to the treatment liquid application unit 12.

<Treatment Liquid Application Unit>

The treatment liquid application unit 12 is a mechanism that applies a treatment liquid to the recording surface of the recording medium 22. The treatment liquid includes a coloring material aggregating agent that causes the aggregation or precipitation of a coloring material (pigment) included in the ink applied in the image formation unit 14, and the separation of the coloring material and a solvent in the ink is enhanced when the treatment liquid is brought into contact with the ink.

It is preferred that a non-curling solvent be added to the treatment liquid. Specific examples of non-curling agents include alcohols (for example, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexane diol, pentane diol, hexane triol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethylsulfoxide, sulfolan, 2-pyrrolidone, N-methyl-2-pyrrolidone, N-vinyl-2-pyrrolidone, 2-oxazolidone, 1,3-dimethyl-2-imidazolidinone, acetonitrile, and acetone).

The above-described organic solvents may be used individually or in combinations of two or more thereof. It is preferred that these organic solvents be included in the treatment liquid at a content ratio of 1 wt. % to 50 wt. %.

As shown in FIG. 1, the treatment liquid application unit 12 includes a transfer cylinder 52, a treatment liquid drum 54, a treatment liquid application device 56, a warm-air blow-out nozzle 58, and an IR heater 60. The transfer cylinder 52 is disposed between the paper feed ray 50 of the paper feed unit 10 and the treatment liquid drum 54. The rotation of the transfer cylinder is driven and controlled by a below-described motor driver 142 (see FIG. 13). The recording medium 22 fed from the paper feed unit 10 is received by the transfer cylinder 52 and transferred to the treatment liquid drum 54. The below-described intermediate conveyance unit may be also provided instead of the transfer cylinder 52.

The treatment liquid drum 54 is a drum that holds and rotationally conveys the recording medium 22. The rotation of the treatment liquid drum is driven and controlled by the below-described motor driver 142 (see FIG. 13). Further, the treatment liquid drum 54 is provided on the outer peripheral surface thereof with a hook-shaped holding device (device identical to a below-described holding device 73 shown in FIG. 4). The distal end of the recording medium 22 is held by the holding device. In a state in which the distal end of the recording medium 22 is held by the holding device, the treatment liquid drum 54 is rotated to convey rotationally the recording medium. In this case, the recording medium 22 is conveyed so that the recording surface thereof faces outside. The treatment liquid drum 54 may be provided with suction holes on the outer peripheral surface thereof and connected to a suction device that performs suction from the suction holes. As a result, the recording medium 22 can be tightly held on the circumferential surface of the treatment liquid drum 54.

The treatment liquid application device 56, warm-air blow-out nozzle 58, and an infrared heater 60 are provided on the outside of the treatment liquid drum 54 opposite the circumferential surface thereof The treatment liquid application device 56, warm-air blow-out nozzle 58, and IR heater 60 are installed in the order of description from the upstream side in the rotation direction (counterclockwise direction in FIG. 1) of the treatment liquid drum 54. First, the treatment liquid is applied on the recording surface of the recording medium 22 by the treatment liquid application device 56. The warm-air blow-out nozzle 58 and IR heater 60 are required to have a capacity sufficient to decrease the water content ratio in an aggregation treatment layer applied on the recording medium 22 in the treatment liquid application device 56 to 56% or below as the recording medium 22 is being conveyed by the treatment liquid drum 54.

Figure 2:
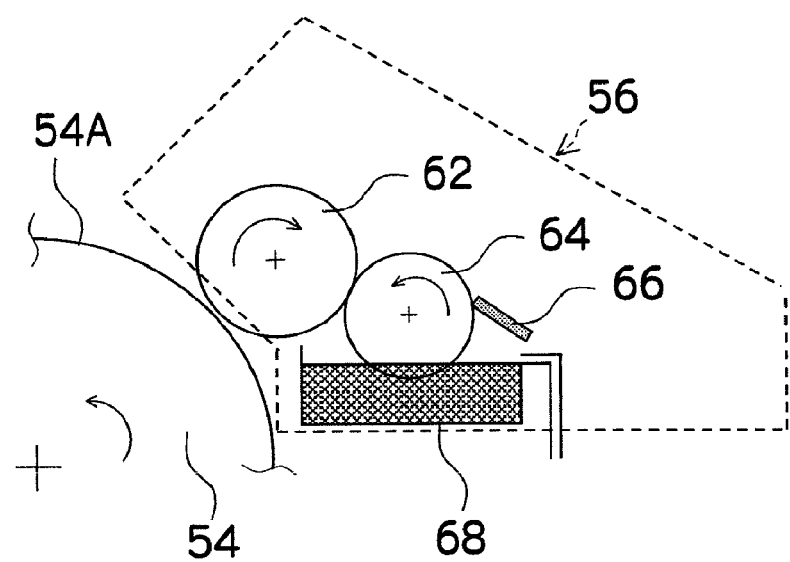
FIG. 2 is a structural diagram illustrating the treatment liquid application device of the treatment liquid application unit.

FIG. 2 is a configuration diagram of the treatment liquid application device 56. As shown in FIG. 2, the treatment liquid application device 56 is composed of a rubber roller 62, an anilox roller 64, a squeegee 66, and a treatment liquid container 68. The treatment liquid is stored in the treatment liquid container 68, and part of the anilox roller 64 is immersed in the treatment liquid. The squeegee 66 and rubber roller 62 are pressed against the anilox roller 64. The rubber roller 62 is brought into contact with the recording medium 22 that is held and rotationally conveyed by the treatment liquid drum 54, and the rubber roller is rotationally driven with a constant predetermined speed in the direction opposite (clockwise direction in the drawing) the rotation direction of the treatment liquid drum 54.

With the treatment liquid application device 56 of the above-described configuration, the treatment liquid is applied by the rubber roller 62 on the recording medium 22, while being metered by the anilox roller 64 and squeegee 66. In this case, it is preferred that the film thickness of the treatment liquid be sufficiently smaller than the diameter of ink droplets that are ejected from inkjet heads 72C, 72M, 72Y, 72K (see FIG. 1) of the image formation unit 14. For example, when the ink droplet volume is 2 picoliters (pl), the average diameter of the droplet is 15.6 µm. In this case, when the film thickness of the treatment liquid is large, the ink dot will be suspended in the treatment liquid, without coming into contact with the surface of the recording medium 22. Accordingly, when the ink droplet volume is 2 pl, it is preferred that the film thickness of the treatment liquid be not more than 3 µm in order to obtain a landing dot diameter not less than 30 µm.

Figure 3:
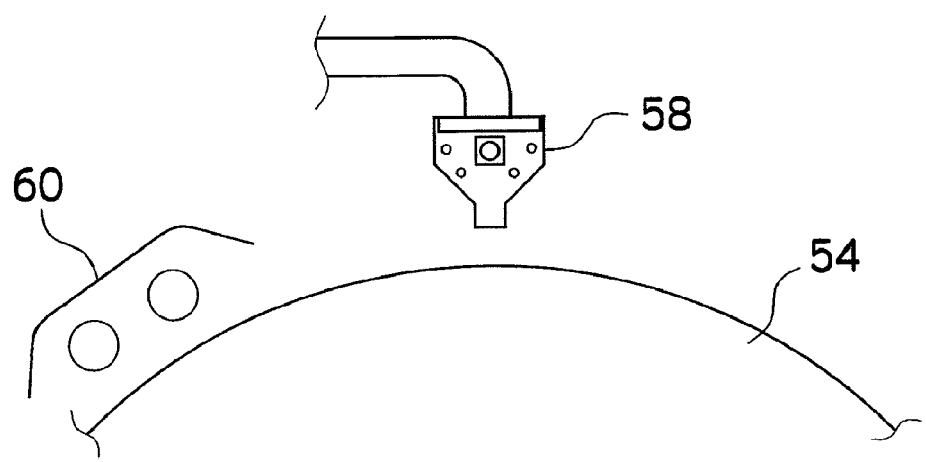
FIG. 3 is a structural diagram illustrating the drying device of the treatment liquid application unit.

The recording medium 22 that has been coated with the treatment liquid in the treatment liquid application device 56 is conveyed to the location of the warm-air blow-out nozzle 58 and IR heater 60 shown in FIG. 3. The warm-air blow-out nozzle 58 is configured to blow hot air at a high temperature (for example, 70° C.) at a constant blowing rate (for example, 9 m$^3$/min) toward the recording medium 22, and the IR heater 60 is controlled to a high temperature (for example, 180° C.). Water included in the solvent of the treatment liquid is evaporated by heating with these warm-air blow-out nozzle 58 and IR heater 60 and a semisolid thin aggregation treatment layer with a water content ratio not more than 56% is formed on the recording surface. Where the treatment liquid is formed into such a thin layer, the dots of ink deposited in the image formation unit 14 come into contact with the recording surface of the recording medium 22 and a necessary dot diameter is obtained. Moreover, the ink reacts with the components of the treatment liquid formed into a thin layer, coloring material aggregation occurs, and an action fixing the ink to the recording surface of the recording medium 22 is easily obtained. By reducing the water content ratio of the aggregation treatment layer to 56% or less, it is possible to prevent the movement of dots (coloring material movement). The treatment liquid drum 54 may be controlled to a predetermined temperature (for example, 50° C.).

<Image Formation Unit>

Figure 4:
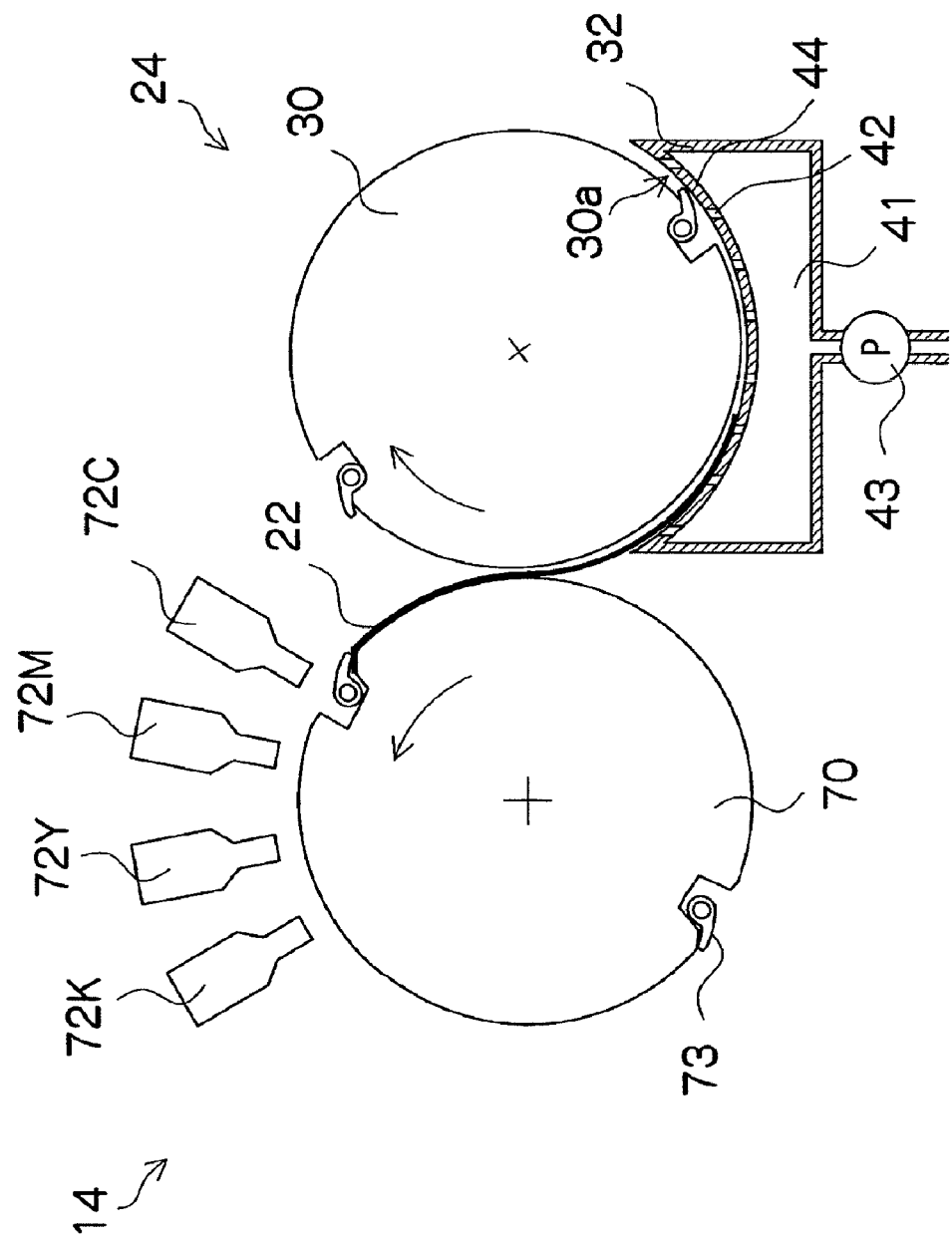
FIG. 4 is a structural diagram illustrating the image formation unit.
Figure 5:
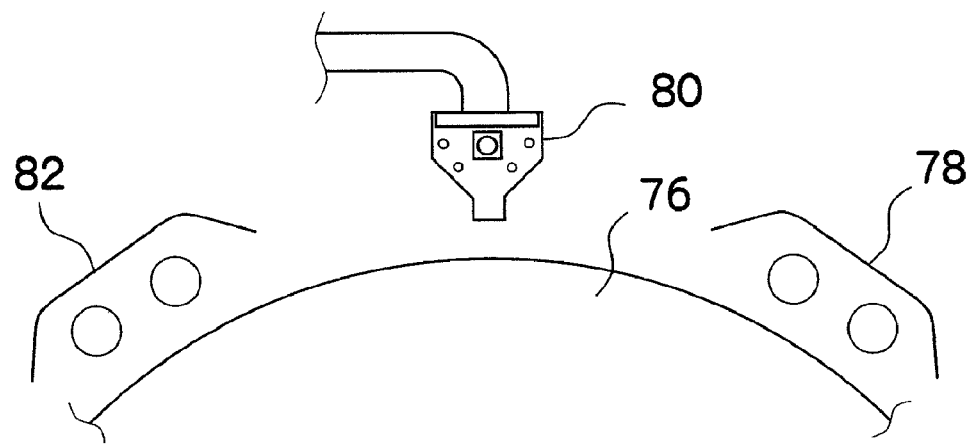
FIG. 5 is a structural diagram illustrating the drying unit.

As shown in FIG. 4, the image formation unit 14 is composed of an image formation drum 70 and inkjet heads 72C, 72M, 72Y, 72K that are proximally disposed in a position facing the outer peripheral surface of the image formation drum 70. The inkjet heads 72C, 72M, 72Y, 72K correspond to inks of four colors: cyan (C), magenta (M), yellow (Y), and black (K) and are disposed in the order of description from the upstream side in the rotation direction (counterclockwise direction in FIG. 4) of the image formation drum 70.

The image formation drum 70 is a drum that holds the recording medium 22 on the outer peripheral surface thereof and rotationally conveys the recording medium. The rotation of the image formation drum is driven and controlled by the below-described motor driver 142 (see FIG. 13). Further, the image formation drum 70 is provided on the outer peripheral surface thereof with a hook-shaped holding device 73, and the distal end of the recording medium 22 is held by the holding device 73. In a state in which the distal end of the recording medium 22 is held by the holding device 73, the image formation drum 70 is rotated to convey rotationally the recording medium. In this case, the recording medium 22 is conveyed so that the recording surface thereof faces outside. Inks are applied to the recording surface by the inkjet heads 72C, 72M, 72Y, 72K.

The inkjet heads 72C, 72M, 72Y, 72K are recording heads (inkjet heads) of an inkjet system of a full line type that have a length corresponding to the maximum width of the image formation region in the recording medium 22. A nozzle row is formed on the ink ejection surface of the inkjet head. The nozzle row has a plurality of nozzles arranged therein for discharging ink over the entire width of the image recording region. Each inkjet head 72C, 72M, 72Y, 72K is fixedly disposed so as to extend in the direction perpendicular to the conveyance direction (rotation direction of the image formation drum 70) of the recording medium 22.

Droplets of corresponding colored inks are ejected from the inkjet heads 72C, 72M, 72Y, 72K having the above-described configuration toward the recording surface of the recording medium 22 held on the outer peripheral surface of the image formation drum 70. As a result, the ink comes into contact with the treatment liquid that has been heretofore applied on the recording surface by the treatment liquid application unit 12, the coloring material (pigment) dispersed in the ink is aggregated, and a coloring material aggregate is formed. Therefore, the coloring material flow on the recording medium 22 is prevented and an image is formed on the recording surface of the recording medium 22. In this case, because the image formation drum 70 of the image formation unit 14 is structurally separated from the treatment liquid drum 54 of the treatment liquid application unit 12, the treatment liquid does not adhere to the inkjet heads 72C, 72M, 72Y, 72K, and the number of factors preventing the ejection of ink can be reduced.

The following reaction can be considered as the reaction of ink and treatment liquid. For example, by using a mechanism of breaking the pigment dispersion and causing aggregation by introducing an acid into the treatment liquid and decreasing pH, it is possible to avoid oozing of the coloring agent, color mixing among inks of different colors, and deposition interference caused by merging of ink droplets during landing.

The ejection timing of the inkjet heads 72C, 72M, 72Y, 72K is synchronized by an encoder 91 (see FIG. 13) that is disposed in the image formation drum 70 and detects the rotation speed. As a result, landing positions can be determined with high accuracy. Further, it is also possible to learn in advance the speed fluctuations caused, e.g., by oscillations of the image formation drum 70 and correct the ejection timing obtained with the encoder 91, exclude the effect of oscillations of the image formation drum 70, accuracy of the rotation shafts, and speed of the outer peripheral surface of the image formation drum 70, and reduce the unevenness of deposition.

Further, maintenance operations such as cleaning of the nozzle surface of the inkjet heads 72C, 72M, 72Y, 72K and ejection of thickened ink may be performed after the head units have been withdrawn from the image formation drum 70.

In the present example, a CMYK standard color (four color) configuration is described, but combinations of ink colors and numbers of colors are not limited to that of the present embodiment, and if necessary, light inks, dark inks, and special color inks may be added. For example, a configuration is possible in which an ink head is added that ejects a light ink such as light cyan and light magenta. The arrangement order of color heads is also not limited. The inkjet heads 72C, 72M, 72Y, 72K will be described below in greater detail.

<Drying Unit>

The drying unit 16 dries water included in the solvent separated by the coloring material aggregation action. As shown in FIG. 1, the drying unit includes a drying drum 76 and a first IR heater 78, a warm-air blow-out nozzle 80, and a second IR heater 82 disposed in positions facing the outer peripheral surface of the drying drum 76. The first IR heater 78 is provided upstream of the warm-air blow-out nozzle 80 in the rotation direction (counterclockwise direction in FIG. 1) of the drying drum 76, and the second IR heater 82 is provided downstream of the warm-air blow-out nozzle 80.

The drying drum 76 is a drum that holds the recording medium 22 on the outer peripheral surface thereof and rotationally conveys the recording medium. The rotation of the drying drum is driven and controlled by the below-described motor driver 142 (see FIG. 13). Further, the drying drum 76 is provided on the outer peripheral surface thereof with hook-shaped holding device (device identical to a below-described holding device 73 shown in FIG. 4). The distal end of the recording medium 22 is held by the holding device. In a state in which the distal end of the recording medium 22 is held by the holding device, the drying drum 76 is rotated to convey rotationally the recording medium. In this case, the recording medium 22 is conveyed so that the recording surface thereof faces outside. The drying treatment is carried out by the first IR heater 78, warm-air blow-out nozzle 80, and second IR heater 82 with respect to the recording surface of the recording medium.

The warm-air blow-out nozzle 80 is configured to blow hot air at a high temperature (for example, 50° C. to 70° C.) at a constant blowing rate (for example, 12 m$^3$/min) toward the recording medium 22, and the first IR heater 78 and second IR heater 82 are controlled to respective high temperature (for example, 180° C.). Water included in the ink solvent on the recording surface of the recording medium 22 held by the drying drum 76 is evaporated by heating with these first IR heater 78, warm-air blow-out nozzle 80, and second IR heater 82 and drying treatment is performed. In this case, because the drying drum 76 of the drying unit 16 is structurally separated from the image formation drum 70 of the image formation unit 14, the number of ink non-ejection events caused by drying of the head meniscus portion by thermal drying can be reduced in the inkjet heads 72C, 72M, 72Y, 72K. Further, there is a degree of freedom in setting the temperature of the drying unit 16, and the optimum drying temperature can be set.

The evaporated moisture may be released to the outside of the apparatus with a release device (not shown in the drawings). Further, the recovered air may be cooled with a cooler (radiator) or the like and recovered as a liquid.

The outer peripheral surface of the aforementioned drying drum 76 may be controlled to a predetermined temperature (for example, not higher than 60° C.).

The drying drum 76 may be provided with suction holes on the outer peripheral surface thereof and connected to a suction device which performs suction from the suction holes. As a result, the recording medium 22 can be tightly held on the circumferential surface of the drying drum 76.

<Fixing Unit>

Figure 6:
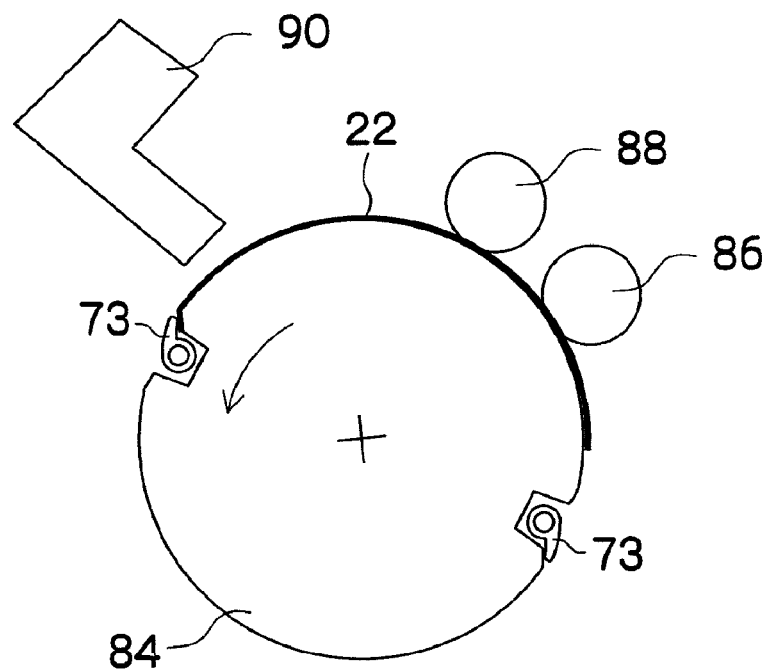
FIG. 6 is a structural diagram illustrating the fixing unit.

As shown in FIG. 6, the fixing unit 18 includes a fixing drum 84, a first fixing roller 86, a second fixing roller 88, and an inline sensor 90. The first fixing roller 86, second fixing roller 88, and inline sensor 90 are arranged in positions opposite the circumferential surface of the fixing drum 84 in the order of description from the upstream side in the rotation direction (counterclockwise direction in FIG. 6) of the fixing drum 84.

The fixing drum 84 holds the recording medium 22 on the outer peripheral surface thereof rotates, and conveys the recording medium. The rotation of the fixing drum is driven and controlled by a motor driver 142 (see FIG. 13) described below. The fixing drum 84 has a hook-shaped holding device (device identical to the holding device 73 shown in FIG. 4), and the distal end of the recording medium 22 can be held by this holding device. The recording medium 22 is rotated and conveyed by rotating the fixing drum 84 in a state in which the distal end of the recording medium is held by the holding device. In this case, the recording medium 22 is conveyed so that the recording surface thereof faces outside, and the fixing treatment by the first fixing roller 86 and second fixing roller 88 and the inspection by the inline sensor 90 are performed with respect to the recording surface.

The first fixing roller 86 and second fixing roller 88 are roller members serving to fix the image formed on the recording medium 22 and they are configured to apply a pressure and heat the recording medium 22. Thus, the first fixing roller 86 and second fixing roller 88 are arranged so as to be pressed against the fixing drum 84, and a nip roller is configured between them and the fixing drum 84. As a result, the recording medium 22 is squeezed between the first fixing roller 86 and the fixing drum 84 and between the second fixing roller 88 and the fixing drum 84, nipped under a predetermined nip pressure (for example, 1 MPa), and subjected to fixing treatment. An elastic layer may be formed on the surface of one from the first fixing roller 86, second fixing roller 88, and fixing drum 84 to obtain a configuration providing a uniform nip width with respect to the recording medium 22.

Further, the first fixing roller 86 and second fixing roller 88 are configured by heating rollers in which a halogen lamp is incorporated in a metal pipe, for example from aluminum, having good thermal conductivity and the rollers are controlled to a predetermined temperature (for example 60° C. to 80° C.). Where the recording medium 22 is heated with the heating roller, thermal energy not lower than a Tg temperature (glass transition temperature) of a latex included in the ink is applied and latex particles are melted. As a result, fixing is performed by penetration into the concavities-convexities of the recording medium 22, the concavities-convexities of the image surface are leveled out, and gloss is obtained.

In the above-described embodiment, heating and pressure application are used in combination, but only one of them may be performed. Further, depending on the thickness of image layer and Tg characteristic of latex particles, the first fixing roller 86 and second fixing roller 88 may have a configuration provided with a plurality of steps. Furthermore, the surface of the fixing drum 84 may be controlled to a predetermined temperature (for example 60° C.).

On the other hand, the inline sensor 90 is a measuring device which measures the check pattern, moisture amount, surface temperature, gloss, and the like of the image fixed to the recording medium 22. A CCD sensor or the like can be used for the inline sensor 90.

With the fixing unit 18 of the above-described configuration, the latex particles located within a thin image layer formed in the drying unit 16 are melted by pressure application and heating by the first fixing roller 86 and second fixing roller 88. Therefore, the latex particles can be reliably fixed to the recording medium 22. In addition, with the fixing unit 18, the fixing drum 84 is structurally separated from other drums. Therefore, the temperature of the fixing unit 18 can be freely set separately from the image formation unit 14 and drying unit 16.

Further, the above-described fixing drum 84 may be provided with suction holes on the outer peripheral surface thereof and connected to a suction device which performs suction from the suction holes. As a result, the recording medium 22 can be tightly held on the circumferential surface of the fixing drum 84.

<Discharge Unit>

As shown in FIG. 1, the discharge unit 20 is provided after the fixing unit 18. The discharge unit 20 includes a discharge tray 92, and a transfer body 94, a conveying belt 96, and a tension roller 98 are provided between the discharge tray 92 and the fixing drum 84 of the fixing unit 18 so as to face the discharge tray and the fixing drum. The recording medium 22 is fed by the transfer body 94 onto the conveying belt 96 and discharged into the discharge tray 92.

<Intermediate Conveyance Unit>

The structure of the first intermediate conveyance unit 24 will be described below. A second intermediate conveyance unit 26 and a third intermediate conveyance unit 28 are configured identically to the first intermediate conveyance unit 24 and the explanation thereof will be omitted.

Figure 7A:
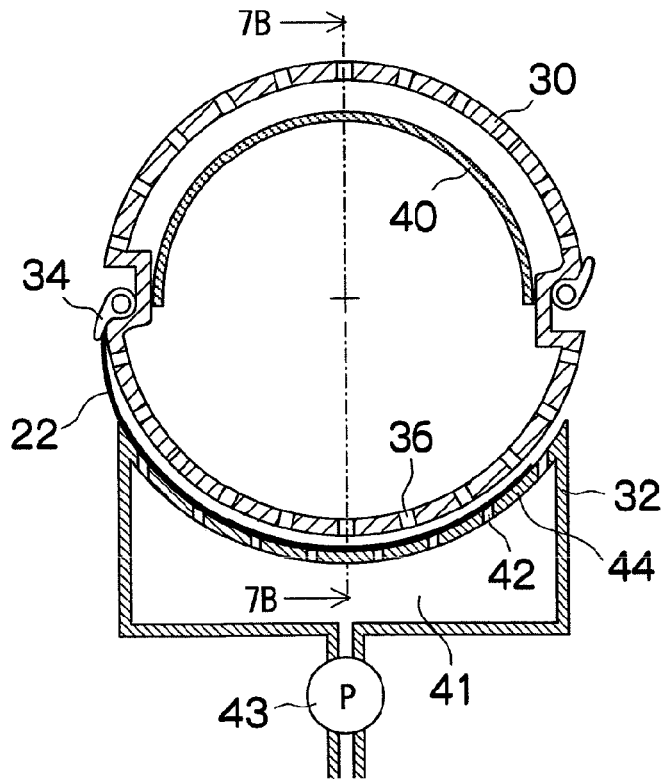
FIG. 7A is a cross-sectional view illustrating the configuration of a first intermediate conveyance unit.
Figure 7B:
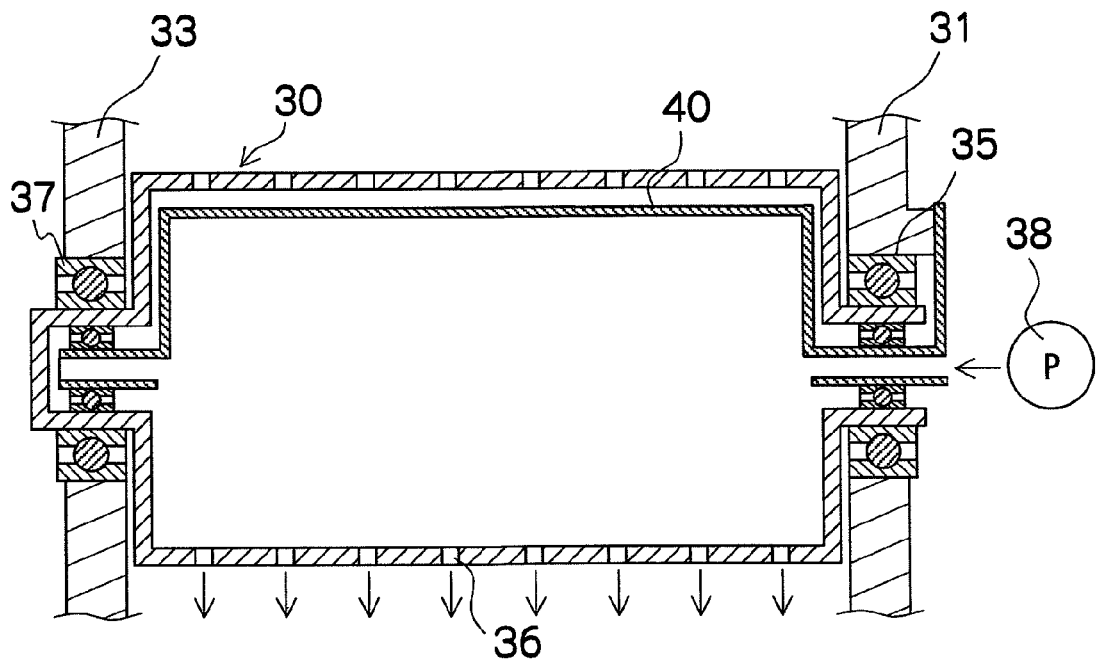
FIG. 7B is a cross-sectional view along line 7B-7B in FIG. 7A.

FIG. 7A is a cross-sectional view of the first intermediate conveyance unit 24. FIG. 7B is a cross-sectional view along line 7B-7B in FIG. 7A.

As shown in the drawings, the first intermediate conveyance unit 24 mainly includes an intermediate conveyance body 30 and a conveyance guide 32. The intermediate conveyance body 30 is a drum for receiving the recording medium 22 from a drum of a previous stage, rotationally conveying the recording medium, and transferring it to a drum of the subsequent stage. As shown in FIG. 7B, the intermediate conveyance body is rotationally mounted on frames 31, 33 via bearings 35, 37. The intermediate conveyance body 30 is rotated by a motor (not shown in the drawings), and the rotation thereof is driven and controlled by the below-described intermediate conveyance body rotation drive unit 141 (see FIG. 14).

Hook-shaped holding devices 34 (devices identical to the holding device 73 shown in FIG. 4) are provided with a 90° spacing on the outer peripheral surface of the intermediate conveyance body 30. The holding device 34 rotates, while describing a circular path, and the distal end of the recording medium 22 is held by the action of the holding device 34. Therefore, the recording medium 22 can be rotationally conveyed by rotating the intermediate conveyance body 30 in a state in which the distal end of the recording medium 22 is held by the holding device 34. In this case, the recording medium 22 is rotationally conveyed so that the recording surface thereof faces inward, whereas the non-recording surface faces outward. In the present embodiment, the intermediate conveyance body 30 is provided with two holding devices 34, hut the number of the holding devices 34 is not limited to two.

A plurality of blower ports 36 are formed on the surface of the intermediate conveyance body 30. The inside of the intermediate conveyance body 30 is connected to a blower 38, and air is blown by the blower 38 onto the intermediate conveyance body 30. The air is preferably warm air. For example, warm air at 70° C. is blown at a blow rate of 1 m³/min. As a result, warm air is blown from the blower ports 36 located on the surface of the intermediate conveyance body 30, the recording medium 22 is supported in a floating state, and a drying treatment of the recording surface is performed. As a result, the recording surface of the recording medium 22 is prevented from coming into contact with the intermediate conveyance body 30 and adhesion of the treatment liquid to the intermediate conveyance body 30 can be avoided.

A blow control guide 40 is provided inside the intermediate conveyance body 30 and acts so that the air is blown out only from the blower ports 36 on the side where the recording medium 22 is conveyed. Thus, in the present embodiment, because the recording medium 22 is conveyed by the lower half of the intermediate conveyance body 30 shown in FIG. 7A, the blower ports 36 of the upper half of the intermediate conveyance body 30 are sealed by the blow control guide 40. As a result, the recording medium 22 can be more reliably supported in a floating state by the air flow blown from the blower ports 36.

As shown in FIG. 7A, the conveying guide 32 has a circular-arc guide surface 44, and this guide surface 44 is disposed along the circumferential surface of the lower half of the intermediate conveyance body 30. Therefore, the recording medium 22 that is supported in a floating state by the intermediate conveyance body 30 is conveyed, while the surface (referred to hereinbelow as "non-recording surface") opposite to the recording surface is in contact with the guide surface 44. As a result, a tension (referred to hereinbelow as "back tension") in the direction opposite to the conveyance direction can be applied to the recording medium 22, and the occurrence of floating wrinkles in the recording medium 22 that is being conveyed can be prevented.

A plurality of suction holes 42 are provided equidistantly in the guide surface 44 of the conveying guide 32. The suction holes 42 communicate with an internal space (referred to hereinbelow as "chamber 41") of the conveying guide 32. This chamber 41 is connected to a pump 43. Therefore, by driving the pump 43, it is possible to create a negative pressure inside the chamber 41 and suck the air from the suction holes 42. As a result, the non-recording surface of the recording medium 22 that is supported in a floating state by the intermediate conveyance body 30 can be brought into intimate contact with the guide surface 44 and the back tension can be reliably applied to the recording medium 22. Further, by controlling the pump 43 with a below-described negative pressure control unit 147 and adjusting the air suction amount, it is possible to adjust the back tension. The negative pressure control unit 147 may control the suction force of the pump 43 correspondingly to specifications (for example, thickness, porosity, type, etc.) of the recording medium 22.

With the first intermediate conveyance unit 24 of the above-described configuration, when the recording medium 22 is conveyed by the intermediate conveyance body 30, the conveyance can be performed in a contactless state of the recording surface. Therefore, image defects caused by the contact of the recording surface can be avoided. Further, with the first intermediate conveyance unit 24, because the conveyance can be performed while the non-recording surface is in intimate contact with the conveying guide 32, a back tension can be applied to the recording medium 22 and the occurrence of defects such as floating wrinkles in the recording medium 22 can be prevented. In addition, with the first intermediate conveyance unit 24, because warm air is blown from the intermediate conveyance body 30, the recording surface can be dried, while the recording medium 22 is being conveyed.

The recording medium 22 conveyed by the first intermediate conveyance unit 24 is transferred to a drum of the subsequent stage (that is, the image formation drum 70). In this case, the transfer of the recording medium 22 is performed by synchronizing the holding device 34 of the intermediate conveyance unit 24 and the holding device 73 of the image formation unit 14. The transferred recording medium 22 is held by the image formation drum 70 and rotationally conveyed. In this case, the recording medium 22 immediately after the transfer is conveyed in a state in which the rear end side thereof is brought into intimate contact with the conveying guide 32. Therefore, the occurrence of defects such as floating wrinkles during the transfer can be prevented.

A back tension application device different from that of the above-described embodiment may be also provided. For example, the guide surface 44 may be subjected to surface treatment to increase the surface roughness thereof or the guide surface 44 may be formed from a member with a high friction coefficient such as a rubber.

Figure 8:
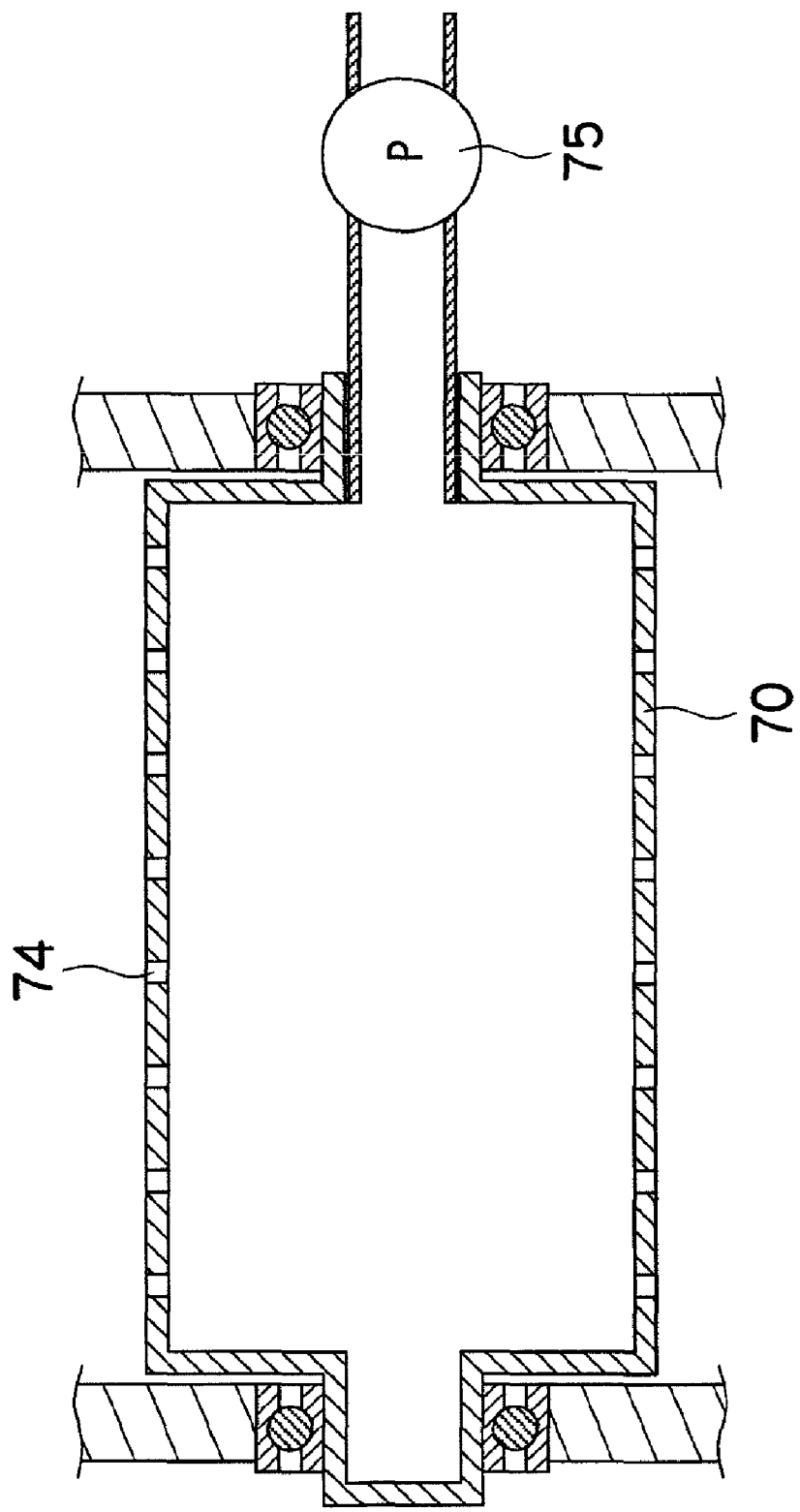
FIG. 8 is cross-sectional view illustrating the configuration of the image formation drum.

Suction of the recording medium 22 to the surface of the subsequent-stage drum also may be used as another back tension application device. For example, the image formation drum 70 shown in FIG. 8 has suction holes 74 formed in the outer peripheral surface thereof and is connected to a pump 75 to enable the suction of the recording medium 22 on the outer peripheral surface thereof. Therefore, when the recording medium 22 is transferred to the image formation drum 70, the conveyance can be performed in a state in which the distal end side of the recording medium 22 is suction attached to the image formation drum 70, whereas the rear end side of the recording medium 22 is suction attached to the conveying guide 32 of the first intermediate conveyance unit 24, thereby making it possible to apply a back tension to the recording medium 22. The distal end of the recording medium 22 may be also brought into intimate contact with the image formation drum 70 by electrostatic attraction.

<Structure of Ink Heads>

The structure of ink heads will be described below. Because inkjet heads 72C, 72M, 72Y, 72K have a common structure, an ink head representing them will be denoted below with a reference symbol 100.

Figure 9A:
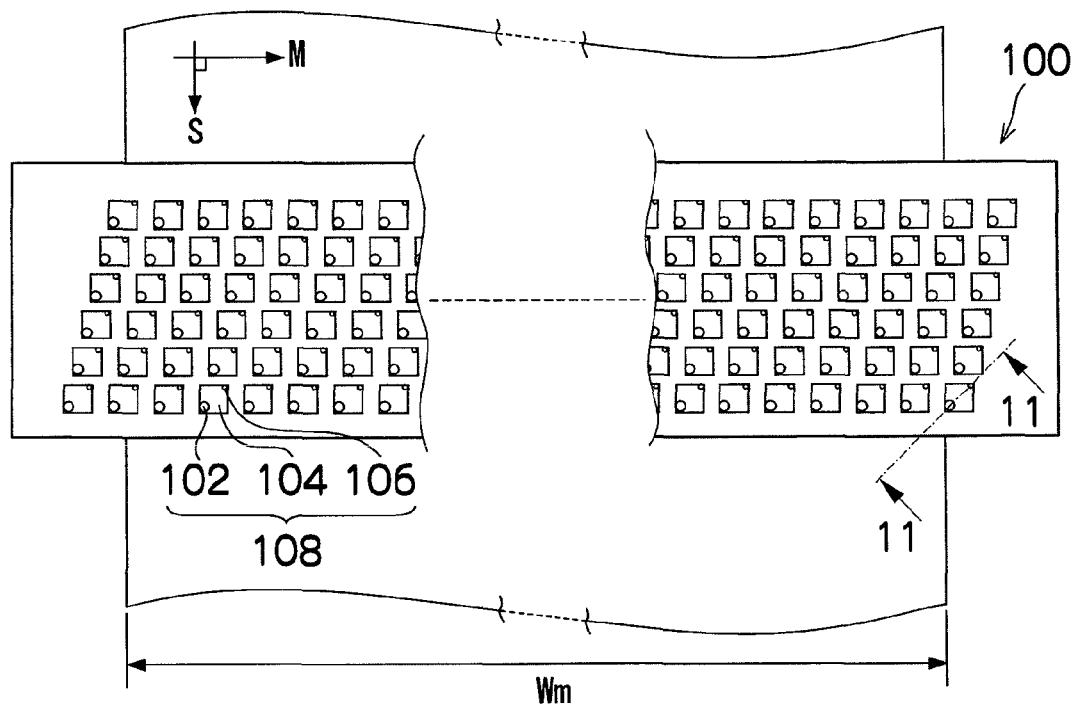
FIG. 9A is a plan perspective view of principal components illustrating the internal structure of a head.
Figure 9B:
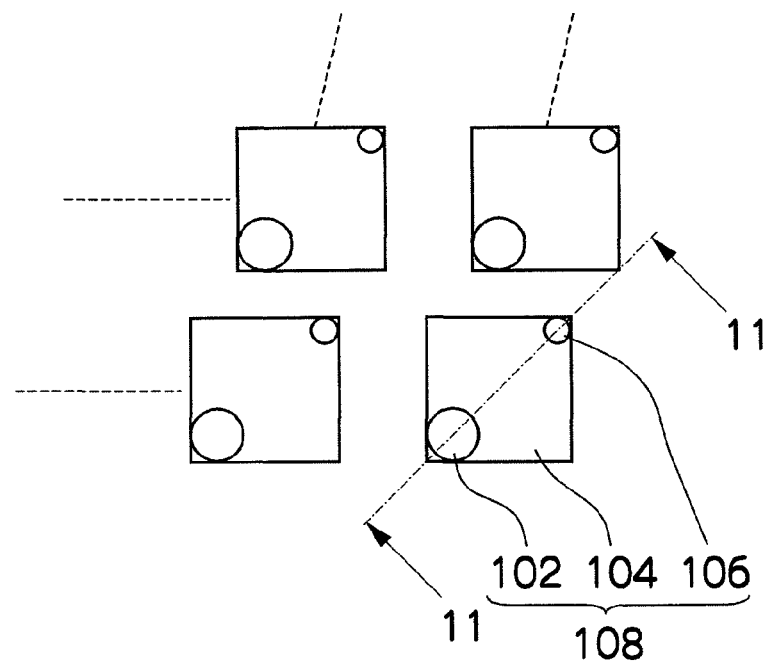
FIG. 9B is an enlarged view of part thereof.

FIG. 9A is a planar perspective view illustrating a structure of the ink head 100. FIG. 9B is an enlarged view of part thereof. A nozzle pitch density in the ink head 100 has to be increased in order to increase the pitch density of dots printed on the recording medium 22. As shown in FIGS. 9A and 9B, the ink head 100 of the present example has a structure in which a plurality of ink chamber units (liquid droplet ejection elements serving as recording element units) 108, each including a nozzle 102 serving as an ink ejection port and a pressure chamber 104 corresponding to the nozzle 102, are arranged in a zigzag manner as a matrix (two-dimensional configuration). As a result, it is possible to increase substantially the density of nozzle spacing (projected nozzle pitch) that is projected to ensure alignment along the longitudinal direction of the head (direction perpendicular to the conveyance direction of the recording medium 22).

A mode of configuring at least one nozzle column along a length corresponding to the entire width of the image formation region of the recording medium 22 in the direction (arrow M in FIGS. 9A and 9B) that is almost perpendicular to the conveyance direction (arrow S in FIGS. 9A and 9B) of the recording medium 22 is not limited to the example shown in the drawing. For example, instead of the configuration shown in FIG. 9A, a line head that as a whole has a nozzle row of a length corresponding to the entire width of the image formation region of the recording medium 22 may be configured by arranging in a zigzag manner short head modules 100' in which a plurality of nozzles 102 are arranged two-dimensionally and enlarging the length by joining the modules together as shown in FIG. 10.

The pressure chamber 104 provided correspondingly to each nozzle 102 has an almost square shape in the plan view thereof (see FIGS. 9A and 9B), an outflow port to the nozzle 102 is provided in one of the two corners on a diagonal of the pressure chamber, and an inflow port (supply port) 106 of the supplied ink is provided in the other corner on the diagonal. The shape of the pressure chamber 104 is not limited to that of the present example, and a variety of planar shapes, for example, a polygon such as a rectangle (rhomb, rectangle, etc.), a pentagon, and an octagon, a circle, and an ellipse can be employed.

FIG. 11 is a cross-sectional view (cross-sectional view along line 11-11 in FIGS. 9A and 9B) illustrating a three-dimensional configuration of a droplet ejection element (ink chamber unit corresponding to one nozzle 102) of one channel that serves as a recording element unit in the ink head 100.

As shown in FIG. 11, each pressure chamber 104 communicates with a common flow channel 110 via the supply port 106. The common flow channel 110 communicates with an ink tank (not shown in the drawing) that serves as an ink supply source, and the ink supplied from the ink tank is supplied into each pressure chamber 104 via the common flow channel 110.

An actuator 116 having an individual electrode 114 is joined to a pressure application plate (oscillation plate also used as a common electrode) 112 that configures part of the surface (top surface in FIG. 11) of the pressure chamber 104. Where a drive voltage is applied between the individual electrode 114 and the common electrode, the actuator 116 is deformed, the volume of the pressure chamfer 104 changes, and the ink is ejected from the nozzle 102 by the variation in pressure that follows the variation in volume. A piezoelectric element using a piezoelectic material such as lead titanate zirconate or barium titanate can be advantageously used in the actuator 116. When the displacement of the actuator 116 returns to the original state after the ink has been ejected, the pressure chamber 104 is refilled with new ink from the common flow channel 110 via the supply port 106.

An ink droplet can be ejected from the nozzle 102 by controlling the drive of the actuator 116 correspondingly to each nozzle 102 according to dot data generated by a digital half toning processing from the input image. By controlling the ink ejection timing of each nozzle 102 according to the conveyance speed on the recording medium 22, while conveying the recording medium with a constant speed in the sub-scanning direction, it is possible to record the described image on the recording medium 22.

Figure 12:
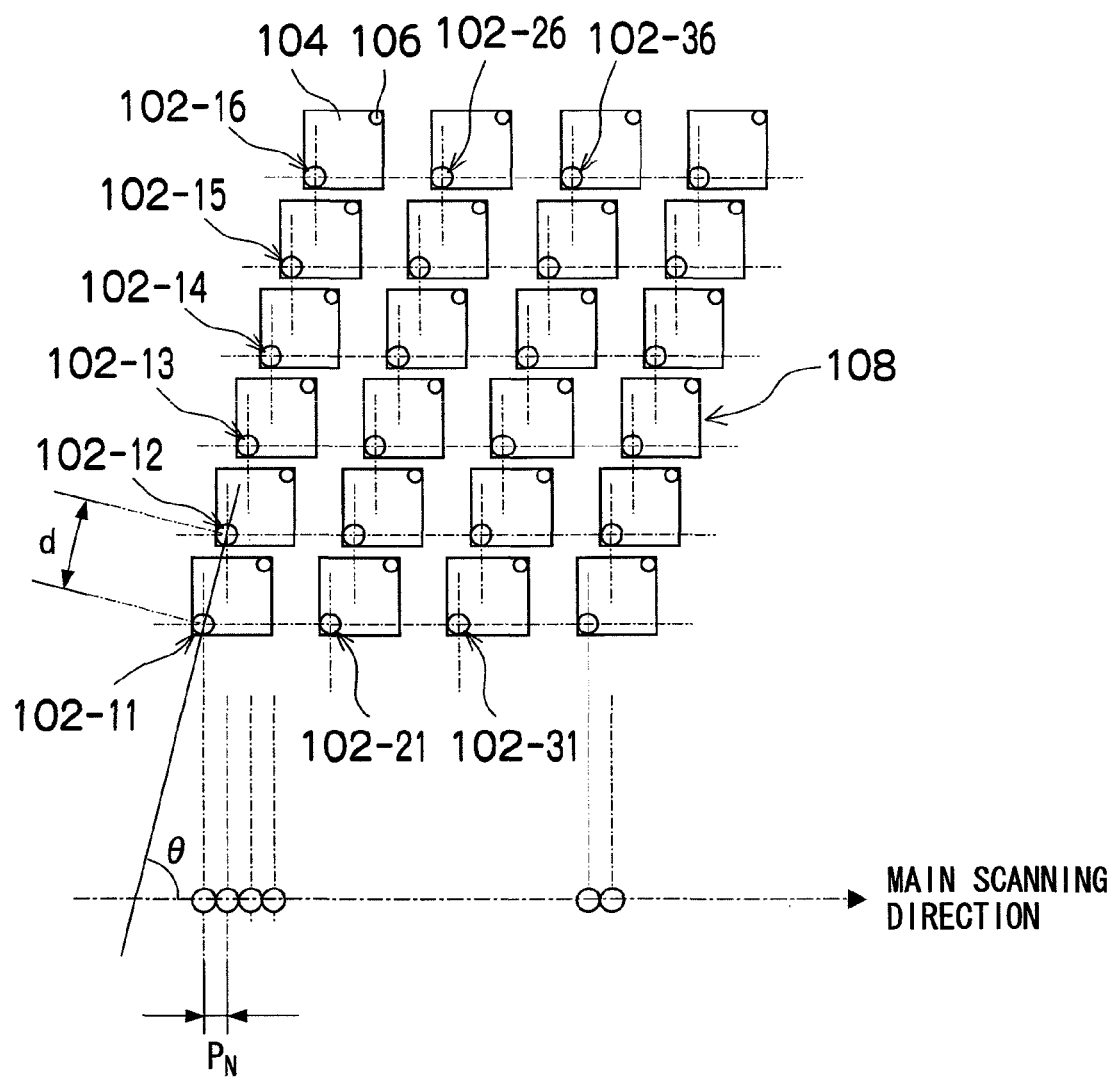
FIG. 12 is a plan view illustrating a nozzle arrangement example in the head.

A high-density nozzle head of the present example is realized by arranging a large number of ink chamber units 108 having the above-described configuration in a grid-like manner with a constant arrangement pattern along a row direction coinciding with the main scanning direction and an oblique column direction that is inclined at a certain angle θ, rather than perpendicular, to the main scanning direction, as shown in FIG. 12.

Thus, with a structure in which a plurality of ink chamber units 108 are arranged with a constant pitch, d, along a direction inclined at a certain angle θ to the main scanning direction, a pitch, P, of nozzles projected (front projection) to be aligned in the main scanning direction will be d×cos θ, and with respect to the main scanning direction, the configuration can be handled as equivalent to that in which the nozzles 102 are arranged linearly with a constant pitch P. With such a configuration, it is possible to realize a substantial increase in density of nozzle columns that are projected so as to be aligned in the main scanning direction.

When the nozzles are driven with a full line head that has a nozzle column of a length corresponding to the entire printable width, the drive can be performed by: (1) simultaneously driving all the nozzles, (2) successively driving the nozzles from one side to the other, and (3) diving the nozzles into blocks and successively driving in each block from one side to the other. A nozzle drive such that one line (a line produced by dots of one column or a line composed of dots of a plurality of columns) is printed in the direction perpendicular to the conveyance direction of the recording medium 22 is defined as main scanning.

In particular, when the nozzles 102 arranged in a matrix such as shown in FIG. 12 are driven, the main scanning of the above-described type (3) is preferred. Thus, nozzles 102-11, 102-12, 102-13, 102-14, 102-15, and 102-16 are taken as one block (also, nozzles 102-21, . . . , 102-26 are taken as one block, nozzles 102-31, . . . , 102-36 are taken as one block) and the nozzles 102-11, 102-12, . . . , 102-16 are successively driven in accordance with the conveyance speed of the recording medium 22, thereby printing one line in the direction perpendicular to the conveyance diction of the recording medium 22.

On the other hand, a process in which printing of one line (a line produced by dots of one column or a line composed of dots of a plurality of columns) formed in the aforementioned main scanning area is repeated by moving the above-described full line head and the recording medium 22 relative to each other is defined as sub-scanning.

Accordingly, the direction indicated by one line (or a longitudinal direction of a band-like region) recorded in the above-described main scanning is called a main scanning direction, whereas the direction in which the aforementioned sub-scanning is performed called a sub-scanning direction. Thus, in the present embodiment, the conveyance direction of the recording medium 22 will be called a sub-scanning direction, and the direction perpendicular thereto will be called a main scanning direction. The arrangement structure of the nozzles in the implementation of the present invention is not limited to that shown by way of an example in the drawings.

Further, in the present embodiment, a system is employed in which ink droplets are ejected by the deformation of an actuator 116 such as piezoelement (piezoelectric element), but a system for ejecting the ink in the implementation of the present invention is not particularly limited, and a variety of systems can be employed instead of the piezo jet system. An example of another suitable system is a thermal jet system in which the ink is heated by a heat-generating body such as a heater, gas bubbles are generated, and the ink droplets are ejected by the pressure of gas bubbles.

<Explanation of Control System>

Figure 13:
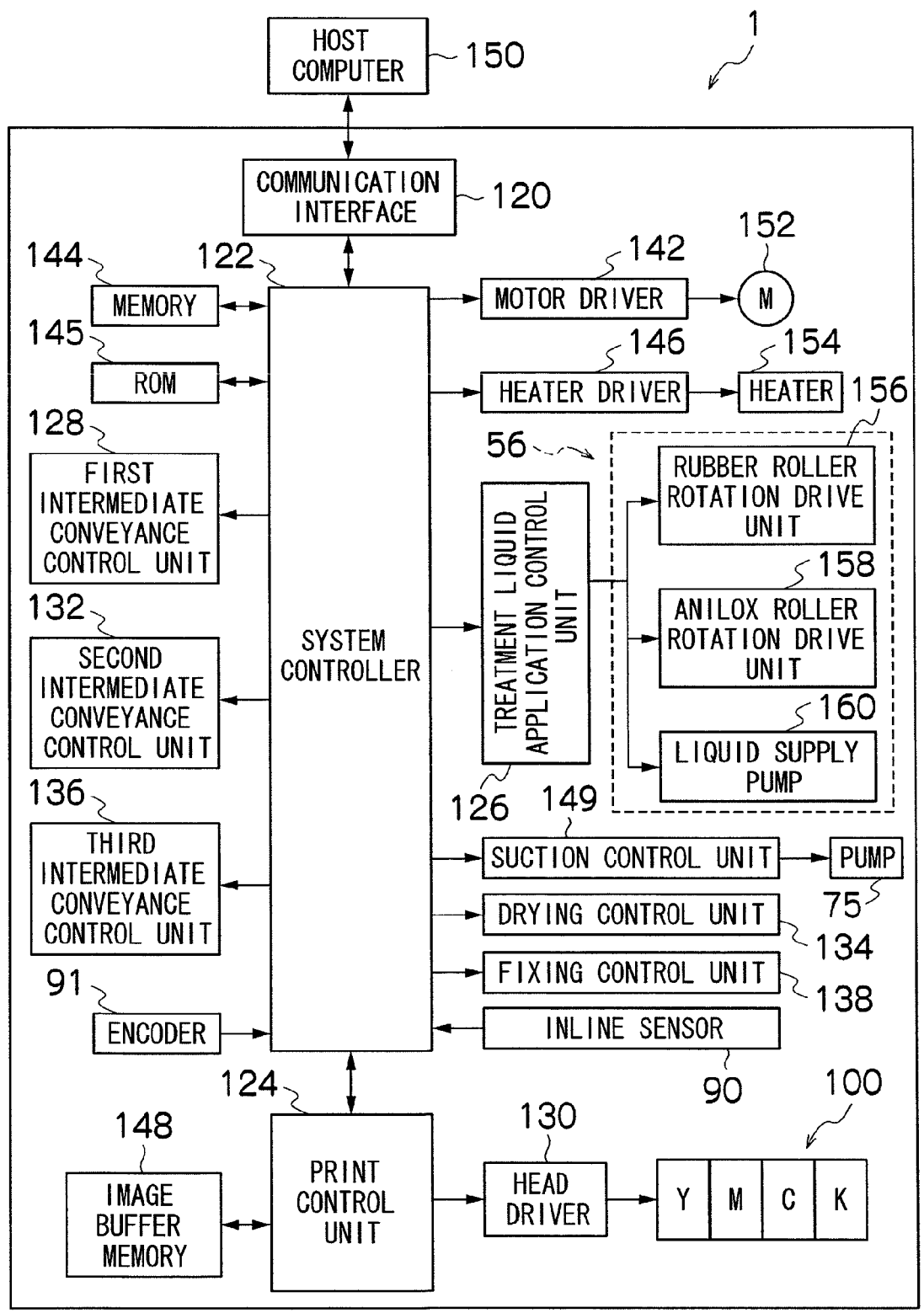
FIG. 13 is a principal block diagram illustrating the system configuration of the inkjet recording apparatus.

FIG. 13 is a block diagram of the main portion of a system configuration of the inkjet recording apparatus 1. The inkjet recording apparatus 1 include a communication interface 120, a system controller 122, a printing control unit 124, a treatment liquid application control unit 126, a first intermediate conveyance control unit 128, a head driver 130, a second intermediate conveyance control unit 132, a drying control unit 134, a third intermediate conveyance control unit 136, a fixing control unit 138, an inline sensor 90, an encoder 91, a motor driver 142, a memory 144, a heater driver 146, an image buffer memory 148, and a suction control unit 149.

The communication interface 120 is an interface unit that receives image data sent from a host computer 150. A serial interface such as USB (Universal Serial Bus), IEEE 1394, Ethernet, and a wireless network, or a parallel interface such as Centronix can be applied as the communication interface 120. A buffer memory (not shown in the drawing) may be installed in the part of the interface to increase the communication speed. The image data sent from the host computer 150 are introduced into the inkjet recording apparatus 1 via the communication interface 120 and temporarily stored in the memory 144.

The system controller 122 includes a central processing unit (CPU) and a peripheral circuitry thereof, functions as a control device that controls the entire inkjet recording apparatus 1 according to a predetermined program, and also functions as an operational unit that performs various computations. Thus, the system controller 122 controls various units such as the treatment liquid application control unit 126, first intermediate conveyance control unit 128, head driver 130, second intermediate conveyance control unit 132, drying control unit 134, third intermediate conveyance control unit 136, a fixing control unit 138, motor driver 142, memory 144, heater driver 146, and suction control unit 149, performs communication control with the host computer 150, performs read/write control of the memory 144, and also generates control signals for controlling the motor 152 and heater 154 of the conveyance system.

The memory 144 is a storage device that temporarily stores the images inputted via the communication interface 120 and reads/writes the data via the system controller 122. The memory 144 is not limited to a memory composed of semiconductor elements and may to use a magnetic medium such as a hard disk.

Programs that are executed by the CPU of the system controller 122 and various data necessary for performing the control are stored in the ROM 145. The ROM 145 may be a read-only storage device or may be a writable storage device such as EEPROM. The memory 144 can be also used as a region for temporary storing image data, a program expansion region, and a computational operation region of the CPU.

The motor driver 142 drives the motor 152 according to the indications from the system controller 122. In FIG. 13, a representative example of the motors disposed for all the units in the apparatus is denoted by the reference numeral 152. For example, the motor 152 shown in FIG. 13 includes motors for driving the rotation of the transfer body 52, treatment liquid drum 54, image formation drum 70, drying drum 76, fixing drum 84, and transfer body 94 shown in FIG. 1, a drive motor for the pump 75 designed for negative-pressure suction from the suction holes 74 of the image formation drum 70, and motors of reciprocating mechanisms of the head units of inkjet heads 72C, 72M, 72Y, and 72K.

The heater driver 146 drives the heater 154 according to the indications from the system controller 122. In FIG. 13, a representative example of a plurality of heaters provided in the inkjet recording apparatus 1 is denoted by the reference numeral 154. For example, the heaters 154 shown in FIG. 13 include a preheater (not shown in the drawing) for heating the recording medium 22 in advance to an appropriate temperature in the paper feed unit 10.

The printing control unit 124 has a signal processing function for performing a variety of processing and correction operations for generating signals for print control from the image data within the memory 144 according to control of the system controller 122, and supplies the generated printing data (dot data) to the head driver 130. The required signal processing is implemented in the printing control unit 124, and the ejection amount and ejection timing of ink droplets in the ink head 100 are controlled via the head driver 130 based on the image data. As a result, the desired dot size and dot arrangement are realized.

The printing control unit 124 is provided with an image buffer memory 148, and data such as image data or parameters are temporarily stored in the image buffer memory 148 during image data processing in the printing control unit 124. In FIG. 13 a configuration is shown in which the image buffer memory 148 is installed for the printing control unit 124, but it can be also used in combination with the memory 144. Furthermore, a mode in which the printing control unit 124 and the system controller 122 are integrated and configured by one processor is also possible.

The flow of processing from image input to printing output is described schematically below. The data of the image that is to be printed are inputted from the outside via the communication interface 120 and stored in the memory 144. At this stage, the RGB image data are stored, for example, in the memory 144.

In the inkjet recording apparatus 1, in order to form an image with a gradation that seems pseudo-continuous to human eye, it is necessary to perform a conversion to a dot pattern such that reproduces the gradation (shading of image) of the inputted digital image as truly as possible by changing the deposition density or size of fine dots formed by the ink (coloring material). For this purpose, data of the original image (RGB) that have been stored in the memory 144 are sent to the printing control unit 124 via the system controller 122 and converted in the printing control unit 124 into dot data for each ink color by a half-toning processing using a threshold matrix or an error diffusion method.

Thus, the printing control unit 124 performs a processing of converting the inputted RGB image data into dot data of four colors K, C, M, Y. The dot data thus generated in the printing control unit 124 are accumulated in the image buffer memory 148.

The head driver 130 outputs a drive signal for driving the actuator 116 corresponding to each nozzle 102 of the ink head 100 based on the printing data (that is, dot data stored in the image buffer memory 148) provided from the printing control unit 124. A feedback control system serving to maintain constant driving conditions of the heads may be included in the head driver 130.

The drive signal outputted from the head driver 130 is applied to the ink head 100, whereby ink is ejected from the corresponding nozzle 102. An image is formed on the recording medium 22 by controlling the ejection of ink from the ink head 100, while conveying the recording medium 22 with the predetermined speed.

Further, the system controller 122 controls the treatment liquid application control unit 126, first intermediate conveyance control unit 128, second intermediate conveyance control unit 132, drying control unit 134, third intermediate conveyance control unit 136, fixing control unit 138, and suction control unit 149.

The treatment liquid application control unit 126 control the operation of the treatment liquid application device 56 of the treatment liquid application unit 12 in accordance with the indications from the system controller 122. More specifically, in the treatment liquid application device 56, a rubber roller rotation drive unit 156 that drives the rotation of the rubber roller 62, an anilox roller rotation drive unit 158 that drives the rotation of the anilox roller 64, and a liquid supply pump 160 that supplies the treatment liquid to the treatment liquid container 68 are controlled by the treatment liquid application control unit 126.

The first intermediate conveyance control unit 128 controls the operation of the intermediate conveyance body 30 or conveying guide 32 of the first intermediate conveyance unit 24 in accordance with the indications from the system controller 122. More specifically, the rotation drive of the intermediate conveyance body 30 itself and the rotation of the holding devices 34 or operation of the blower 38 provided in the intermediate conveyance body 30 are controlled in the intermediate conveyance body 30. In the conveying guide 32, the operation of the pump 43 for performing a suction operation from the suction holes 42 is controlled.

Figure 14:
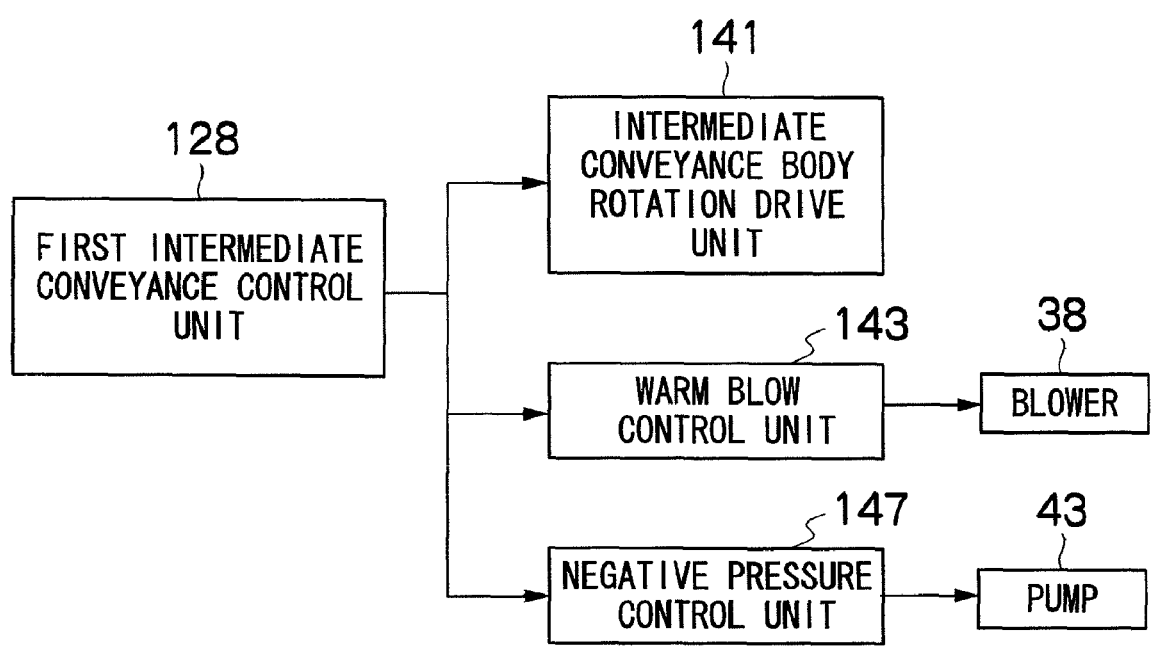
FIG. 14 is a principal block diagram illustrating the system configuration of the first intermediate conveyance control unit.

FIG. 14 is a principal block diagram illustrating a system configuration of the first intermediate conveyance control unit 128. As shown in FIG. 14, the first intermediate conveyance control unit 128 configures an intermediate conveyance body rotation drive unit 141, a blower control unit 143, and a negative pressure control unit 147.

The intermediate conveyance body rotation drive unit 141 controls the rotation drive of the intermediate conveyance body 30 itself.

With the blower control unit 143, the temperature or flow rate of the air from the blower 38 are adjusted and so controlled as to accelerate effectively the drying of moisture contained in the treatment liquid and also the decrease in viscosity or permeation of the high boiling-point solvent. Further, the value of the positive pressure created by the air flow may be controlled by controlling the flow rate of the air from the blower 38 in accordance with the type of the recording medium 22. The value of the positive pressure created by the air flow may be also controlled by controlling the flow rate of the air from the blower 38 in accordance with at least one from the thickness of the recording medium 22 and the porosity of the recording medium 22. In addition, the temperature of the air from the blower 38 may be also controlled in accordance with the type (for example, high-grade paper, coated paper, etc.) of the recording medium 22.

With the negative pressure control unit 147, the pump 43 is controlled and suction is performed from a non-recording surface, which is the surface on the side opposite the recording surface of the recording medium 22, so as to cause the penetration of the solvent contained in the treatment liquid. The negative pressure applied by the pump 43 may be controlled so as to vary it based on at least one from among the thickness of the recording medium 22 and the porosity of the recording medium 22. The value of the negative pressure applied by the pump 43 may be also controlled in accordance with the type of the recording medium 22.

The second intermediate conveyance control unit 132 and third intermediate conveyance control unit 136 have a system configuration identical to that of the first intermediate conveyance control unit 128, and the operation of the intermediate conveyance body 30 or the conveying guide 32 of the second intermediate conveyance unit 26 and third intermediate conveyance unit 28 is controlled corresponding to the indications from the system controller 122.

The drying control unit 134 controls the operation of the first IR heater 78, warm-air blow-out nozzle 80, and second IR heater 82 in the drying unit 16 correspondingly to the system controller 122.

The fixing control unit 138 controls the operation of the first fixing roller 86 and second fixing roller 88 in the fixing unit 18 in accordance with the indications from the system controller 122.

The suction control unit 149 controls the operation of the pump 75 connected to suction holes 74 of the image formation drum 70 of the image formation unit 14.

Detection signals of a check pattern applied to the recording medium 22 or data on the measurement results such as moisture content, surface temperature, and gloss of the recording medium 22 are also inputted from the inline sensor 90 into the system controller 122. The detection signal of a rotation speed of the image formation drum 70 is also inputted from the encoder 91, and the deposition timing of the ink dots 100 is controlled via the head driver 130.

<Specific Effects of Inkjet Recording Apparatus>

The below-described specific effects can be obtained with the inkjet recording apparatus 1 of the above-described configuration.

In the treatment liquid application unit 12, the treatment liquid that has been applied on the recording medium 22 by the treatment liquid application device 56 is dried by the warm-air blow-out nozzle 58 and IR heater 60, thereby forming an aggregation treatment layer with a moisture content not more than 56%. As a result, the movement of dots of ink that have been deposited on the aggregation treatment layer in the aggregation treatment layer (movement of coloring material) can be prevented.

In the drying unit 16, the ink solvent on the recording medium 22 is dried by the first IR heater 78, warm-air blow-out nozzle 80, and second IR heater 82. Therefore, unevenness of image caused by the flow movement of the coloring material on the recording medium 22, ink bleeding or color mixing occurring when a plurality of inks are applied, and deformation such as curling or cockling of the recording medium are prevented and a high-quality image can be formed on the recording medium 22 at a high speed.

Concerning the relationship between the image formation unit 14 and the drying unit 16, the inkjet heads 72C, 72M, 72Y, 72K and the first IR heater 78, warm-air blow-out nozzle 80, and second IR heater 82 are arranged separately in terms of structure for the image formation drum 70 and drying drum 76. Therefore, the image formation drum 70 itself is not heated, the meniscus of the inkjet heads 72C, 72M, 72Y, 72K is no dried, a non-ejection effect of the inkjet heads 72C, 72M, 72Y, 72K can be prevented, and a high-quality image can be formed at a high speed on the recording medium 22.

Concerning the relationship between the image formation unit 14, drying unit 16, and fixing unit 18, the inkjet heads 72C, 72M, 72Y, 72K, the first IR heater 78, warm-air blow-out nozzle 80, and second IR heater 82, and the first fixing roller 86 and second fixing roller 88 are arranged separately in terms of structure for each drum. As a result, the temperature can be freely set with the first fixing roller 86 and second fixing roller 88.

Because the recording surface of the recording medium 22 does not come into contact with other structural members such as the intermediate conveyance body 30, the damage to image can be avoid, even the large-size recording medium with a recording surface of the recording medium 22 in a semi-wet state can be conveyed with high accuracy, and the position of recording medium can be ensured with high accuracy. Moreover, where the pump 43 or blower 38 are controlled and the pressure applied to the recording medium 22 is controlled in accordance with the type of the recording medium 22 by the blower control unit 143 and negative pressure control unit 147, the issue of versatility of the recording medium 22 can be addressed.

Where the pressure applied to the recording medium 22 is controlled in accordance with at least one from among the thickness and porosity of the recording medium 22 by the blower control unit 143 or negative pressure control unit 147, the issue of versatility of the recording medium 22 can be addressed.

Where, an air is blown from the blower ports 36 of the intermediate conveyance body 30 onto the recording surface of the recording medium 22, the penetration of the high boiling-point solvent of the ink that has been deposited on the recording surface of the recording medium 22 into the recording medium 22 can be further enhanced.

By controlling the direction of air blow by using the blow control guide 40 in the intermediate conveyance body 30 so that the air flow is blown from the blower ports 36 facing the recording surface of the recording medium 22, the penetration of the high boiling-point solvent of the ink that has been deposited on the recording surface of the recording medium 22 into the recording medium 22 is enhanced more reliably.

Table 1 shows evaluation results on a viscosity characteristic of a high boiling-point solvent vs. a liquid temperature for the liquid including the high boiling-point solvent. Table 1 shows the evaluation results obtained when the content of the high boiling-point solvent was set to 5 levels and the liquid temperature was set to 3 levels. The viscosity units are mPa·s (cP).

TABLE 1

|  |  | CONTENT OF HIGH BOILING-POINT SOLVENT (wt. %) | | | | |
| --- | --- | --- | --- | --- | --- | --- |
|  |  | 100 | 90 | 67 | 50 | 33 |
| TEMPERATURE OF LIQUID (° C.) | 25 | 507 | 264 | 33.9 | 10.85 | 4.146 |
|  | 40 | 246 | 101.8 | 16.14 | 5.196 | 2.58 |
|  | 60 | 82.44 | 33.72 | 7.308 | 3.204 | 1.56 |

As shown in Table 1, the viscosity of a high boiling-point solvent tends to decrease with the increase in liquid temperature. Therefore, the penetration of the solvent of the aqueous ink into the recording medium 22 can be enhanced by blowing warm air to increase the aqueous ink temperature and decrease the viscosity of the high boiling-point solvent of the aqueous ink.

When the conveying guide 32 transfers the recording medium 22 to the image formation drum 70, drying drum 76, and fixing drum 84 in the intermediate conveyance body 30, a force (back tension) acts in the direction opposite to the rotation direction of the recording medium 22. As a result, the occurrence of wrinkles or floating when the recording medium 22 is conveyed to the drying drum 76 or fixing drum 84 can be reduced. Thus, because tension is applied and drying is enhanced on the drying drum 76, the effect of reducing curling and cockling is obtained, and because a tension is applied on the fixing drum 84 and paper is conveyed to the fixing unit 18, while reducing the floating of paper, the effect of preventing the occurrence of wrinkles in the fixing unit 18 is obtained.

A device that attracts the non-recording surface of the recording medium 22 by suction can be considered for applying a back tension to the recording medium 22. A device that blows air on the recording surface of the recording medium 22 also can be considered for is applying a back tension to the recording medium 22. By partially restricting the flow of air blown onto the recording surface of the recording medium 22, for example, if the direction of air flow is restricted so that the air flow is blown from blower ports 36 in the direction facing the recording surface of the recording medium 22 by the blow control guide 40, a back tension can be effectively caused to act upon the recording medium 22. Other suitable methods include increasing the surface roughness of the guide surface 44 of the conveying guide 32 or attaching rubber or the like and increasing the friction force.

Further, where the image formation drum 70, or drying drum 76, or fixing drum 84 is provided with a device that brings the recording medium 22 into tight contact with the peripheral surface of the drum, the occurrence of wrinkles of floating can be reliably prevented when the recording medium 22 is conveyed to the image formation drum 70. A suction device or an electrostatic attraction device can be considered for bringing the recording medium 22 into tight contact with the peripheral surface of the drum.

Further, in the first intermediate conveyance unit 24, the recording medium 22 is rotated and moved, while the distal end of the recording medium 22 is held by the holding devices 34 of the intermediate conveyance body 30. In this case, the non-recording surface of the recording medium 22 is conveyed, while being supported by the guide surface 44, by performing at least any one from blowing an air flow from blower ports 36 of the intermediate conveyance body 30 and creating suction from the suction holes 42 of the conveying guide 32. Therefore, the recording medium 22 is conveyed in a state in which the recording surface does not come into contact with the intermediate conveyance body 30. Therefore, the image formed by an aqueous ink applied on the recording surface of the recording medium in the image formation unit 14 remains intact.

By partially restricting the flow of air blown onto the recording surface of the recording medium 22, for example, if the direction of air flow is restricted so that the air flow is blown from blower ports 36 in the direction facing the recording surface of the recording medium 22 by the blow control guide 40, a back tension can be effectively caused to act upon the recording medium 22.

Where either one from suction from the suction holes 42 of the conveying guide 32 and blowing an air flow from blower ports 36 of the intermediate conveyance body 30 is performed in the first intermediate conveyance unit 24 and second intermediate conveyance unit 26, the high boiling-point solvent contained in the aqueous ink applied in the image formation unit 14 penetrates into the recording medium. Therefore, when the image is fixed using the first fixing roller 86 and second fixing roller 88 in the fixing unit 18 of the subsequent process, because the high boiling-point solvent is not present on the surface of the recording medium 22, the adhesion of the aggregated coloring material and recording medium can be ensured, fixing ability of the image is increased, quality of the image is increased, and also the coloring material offset to the first fixing roller 86 and second fixing roller 88 is improved.

When the non-recording surface of the recording medium 22 is attracted by suction, the negative pressure applied from the suction holes 42 by the pump 43 may be variably controlled based on at least one from among the thickness of the recording medium 22 and porosity of the recording medium 22 with the negative pressure control unit 147 (see FIG. 10) of the control system. More specifically, where the thickness of the recording medium 22 is large, the negative pressure applied from the suction holes 42 by the pump 43 is increased to enhance the penetration of solvent into the recording medium 22. Further, where the porosity of the recording medium 22 is small, the negative pressure applied from the suction holes 42 by the pump 43 is increased to enhance the penetration of solvent into the recording medium 22.

Further, when hot air is blown on the recording surface of special paper from blower ports 36 of the intermediate conveyance body 30, in the first intermediate conveyance unit 24 and second intermediate conveyance unit 26, the viscosity of the high boiling-point solvent contained in the ink is decreased, the penetration of the solvent into the recording medium 22 is enhanced, and the drying of the residual moisture contained in the ink is enhanced.

The temperature and amount of air blown from the blower 38 may be adjusted and controlled by the blower control unit 143 of the control system (see FIG. 10) so as to enhance efficiently the decrease in viscosity of the high boiling-point solvent and the drying of the residual moisture contained in the ink.

The inkjet recording apparatus and inkjet recording method in accordance with the present invention are described hereinabove in details, but the present invention is not limited to the above-described examples and it goes without saying that various modification and changes may be made without departing from the scope of the present invention.

<Recording Medium>

In accordance with the present invention, the recording medium 22 with mild permeability such as coated paper for printing can be advantageously used. In particular, the below-described types of recording materials can be advantageously used.

Thus, the preferred examples of the recording medium 22 with mild permeability include gloss or mat paper such as cast coated paper, art paper, coated paper, fine coated paper, high-grade paper, recycled paper, synthetic paper, pressure-sensitive paper, and emboss paper. More specific preferred examples include paper with a weight of 60 g/m$^2$ to 350 g/m$^2$ such as OK Ercard+ (manufactured by Oji Paper Co., Ltd.), SA Kanefuji+ (manufactured by Oji Paper Co., Ltd.), Satin Kanefuji N (manufactured by Oji Paper Co., Ltd.), OK Top Coat+ (manufactured by Oji Paper Co., Ltd.), New Age (manufactured by Oji Paper Co., Ltd.), Tokuhishi Art Bothsides N (manufactured by Mitsubishi Paper Mills Ltd.), Tokuhishi Art Single-side N (manufactured by Mitsubishi Paper Mills Ltd.), New V Mat (manufactured by Mitsubishi Paper Mills Ltd.), Aurora Coat (manufactured by Nippon Paper Industries Co., Ltd.), Aurora L (manufactured by Nippon Paper Industries Co., Ltd.), U-Light (manufactured by Nippon Paper Industries Co., Ltd.), Recycle Coat T-6 (manufactured by Nippon Paper Industries Co., Ltd.), Recycle Mat T-6 (manufactured by Nippon Paper Industries Co., Ltd.), Ivest W (manufactured by Nippon Paper Industries Co., Ltd.), Invercoat M (manufactured by SPAN CORPORATION), High McKinley Art (manufactured by Gojo Paper Mfg. Co., Ltd.), Kinmari Hi-L (manufactured by Hokuetsu Paper Mills, Ltd.), Signature True (manufactured by Newpage Corporation), Sterling Ultra (manufactured by Newpage Corporation), Anthem (manufactured by Newpage Corporation), Hanno ArtSilk (manufactured by Sappi Ltd.), Hanno Art Gross (manufactured by Sappi Ltd.), Consort Royal Semimatt (manufactured by Scheufelen), Consort Royal Gross (manufactured by Scheufelen), Zanders Ikono Silk (manufactured by m-real), Zanders Ikono Gross (manufactured by m-real).

Furthermore, applications to non-permeable media such as plastic films and intermediate transfer media are also possible.

<Aqueous Ink>

The aqueous ink used in the implementation of the present invention will be described below in greater detail.

The aqueous ink in accordance with the present invention is configured as a special ink including at least a resin dispersant (A), a pigment (B) that is dispersed by the resin dispersant (A), self-dispersible polymer microparticles (C), and an aqueous liquid medium (D).

<Resin Dispersant (A)>

The resin dispersant (A) is used as a dispersant for the pigment (B) in the aqueous liquid medium (D) and may be any appropriate resin, provided that it can disperse the pigment (B). The preferred structure of the resin dispersant (A) includes a hydrophobic structural unit (a) and a hydrophilic structural unit (b). If necessary, the resin dispersant (A) can also include a structural unit (c) that is different from the hydrophobic structural unit (a) and hydrophilic structural unit (b).

As for the compounding ratio of the hydrophobic structural unit (a) and hydrophilic structural unit (b), it is preferred that the hydrophobic structural unit (a) takes more than 80 wt. %, preferably 85 wt. % or more of the total weight of the resin dispersant (A). Thus, the compounding ratio of the hydrophilic structural unit (b) has to be not more than 15 wt. %. Where the compounding ratio of the hydrophilic structural unit (b) is more than 15 wt. %, the amount of component that is independently dissolved in the aqueous liquid medium (D), without participating in the dispersion of the pigment, increases, thereby causing degradation of performance such as dispersivity of the pigment (B) and worsening the ejection ability of ink for inkjet recording.

<Hydrophilic Structural Unit (a)>

The hydrophobic structural unit (a) of the resin dispersant (A) in accordance with the present invention includes at least a hydrophobic structural unit (a1) having an aromatic ring that is not directly coupled to an atom forming the main chain of the resin dispersant (A).

The expression "that is not directly coupled to" as used herein means a structure in which an aromatic ring and an atom forming the main chain structure of the resin are coupled via a linking group. With such a configuration, an adequate distance is maintained between the hydrophilic structural unit in the resin dispersant (A) and the hydrophobic aromatic ring. Therefore, interaction easily occurs between the resin dispersant (A) and pigment (B), strong adsorption is induced, and therefore dispersivity is increased.

<Hydrophobic Structural Unit (a1) Having Aromatic Ring>

From the standpoint of pigment dispersion stability, ejection stability, and cleaning ability, it is preferred that the hydrophobic structural unit (a1) having an aromatic ring that is not directly coupled to an atom forming the main chain of the resin dispersant (A) have a content ratio not less than 40 wt. % and less than 75 wt. %, more preferably not less than 40 wt. % and less than 70 wt. %, and even more preferably not less than 40 wt. % and less than 60 wt. % based on the total weight of the resin dispersant (A).

From the standpoint of improving the pigment dispersion stability, ejection stability, cleaning ability, and abrasion resistance, it is preferred that the aromatic ring that is not directly coupled to an atom forming the main chain of the resin dispersant (A) be contained in the resin dispersant (A) at a ratio not less than 15 wt. % and not more than 27 wt. %, more preferably not less than 15 wt. % and not more than 25 wt. %, and even more preferably not less than 15 wt. % and not more than 20 wt. %.

Within the above-described ranges, the pigment dispersion stability, ejection stability, cleaning ability, and abrasion resistance can be improved.

In accordance with the present invention, the hydrophobic structural unit (a1) having an aromatic ring in the hydrophobic structural unit (a) is preferably introduced in the resin dispersant (A) in the structure represented by a General Formula (1) below.

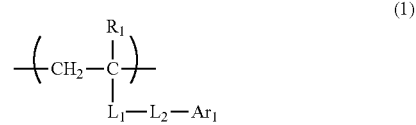

In the General Formula (1), $R_1$ represents a hydrogen atom, a methyl group, or a halogen atom; $L_1$ represents (main chain side) —COO—, —OCO—, —CONR2-, —O—, or substituted or unsubstituted phenylene group; and $R_2$ represents a hydrogen atom and an alkyl group having 1 to 10 carbon atoms. $L_2$ represents a single bond or a divalent linking group having 1 to 30 carbon atom; when it is a divalent linking group, the linking group preferably has 1 to 25 carbon atoms, more preferably 1 to 20 carbon atoms. Examples of suitable substituents include a halogen atom, an alkyl group, an alkoxy group, a hydroxyl group, and a cyano group, but this list is not limiting. $Ar_1$ represents a monovalent group derived from an aromatic ring.

In the General Formula (1) the following combination of structural units is preferred: $R_1$ is a hydrogen atom or a methyl group, $L_1$ is (main chain side) —COO—, and $L_2$ is a divalent linking group having 1 to 25 carbon atoms and including an alkyleneoxy group and/or alkylene group. In the even more preferred combination, $R_1$ is a hydrogen atom or a methyl group, $L_1$ is (main chain side) —COO—, and $L_2$ is (main chain side) —(CH2-CH2-O)n-(n represents the average number of structural repeating units; n=1 to 6).

The aromatic ring in the $Ar_1$ contained in the hydrophobic structural unit (a1) is not particularly limited, and examples of suitable aromatic rings include a benzene ring, a condensed aromatic ring having 8 or more carbon atoms, a hetero ring containing condensed aromatic rings, or two or more linked benzene rings.

The condensed aromatic ring having 8 or more carbon atoms as referred to herein is an aromatic compound having 8 or more carbon atoms that is composed of an aromatic ring having at least two or more condensed benzene rings, and/or at least one or more aromatic rings and an alicyclic hydrocarbon condensed to the aromatic ring. Specific examples thereof include naphthalene, anthracene, fluorene, phenanthrene, and acenaphthene.

The hetero ring in which aromatic rings are condensed are compounds in which an aromatic compound having no heteroatoms preferably a benzene ring) and a cyclic compound having a heteroatom are condensed. The cyclic compound having a heteroatom is preferably a five-membered ring or a six-membered ring. The preferred examples of the heteroatom are a nitrogen atom, an oxygen atom, and a sulfur atom. The cyclic compound having a heteroatom may have a plurality of heteroatoms. In this case, the heteroatoms may be identical or different. Specific examples of the hetero ring in which aromatic rings are condensed include phthalimide, acridone, carbazole, benzoxazole, and benzothiazole.

Specific examples of monomers that can form the hydrophobic structural unit (a1) including a benzene ring, a condensed aromatic ring having 8 or more carbon atoms, a hetero ring in which aromatic rings are condensed, or a monovalent group derived from two or more benzene rings connected to each other are presented below, but the present invention is not limited to the below-described specific examples.

33
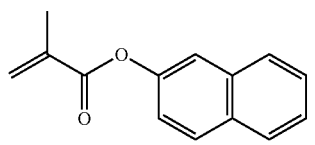
M-1
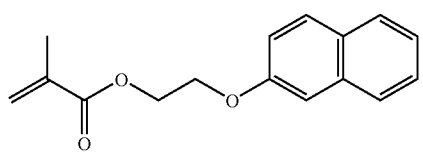
M-3
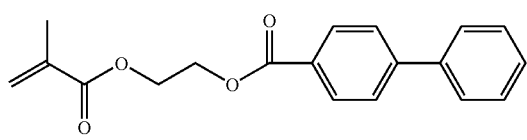
M-5
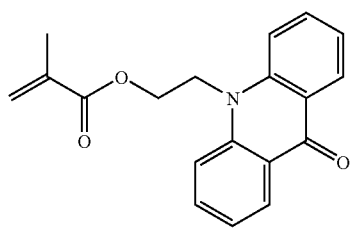
M-7
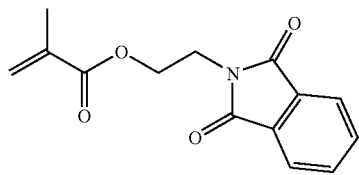
M-9
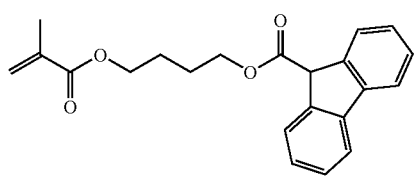
M-11
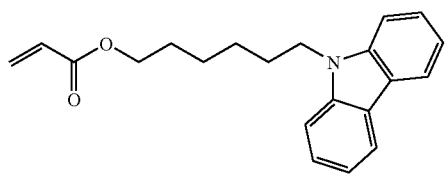
M-13
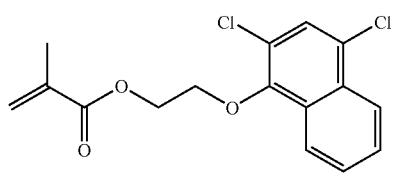
M-15
34
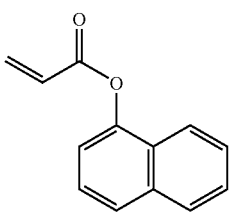
M-2
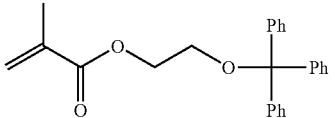
M-4
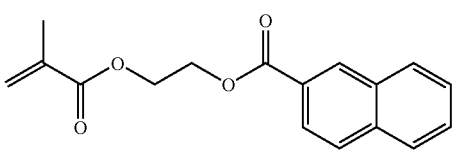
M-6
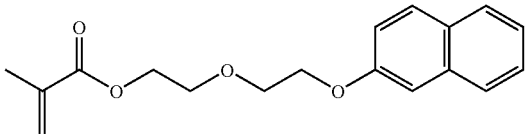
M-8
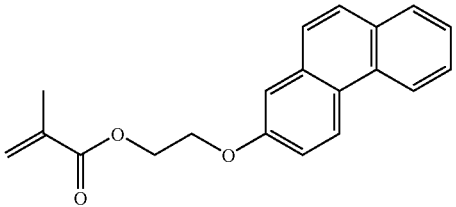
M-10
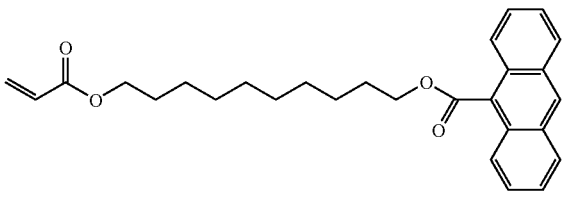
M-12
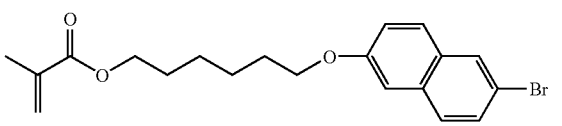
M-14
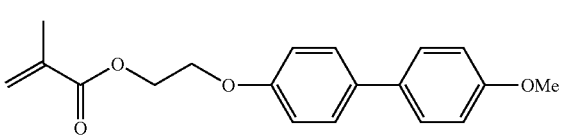
M-16

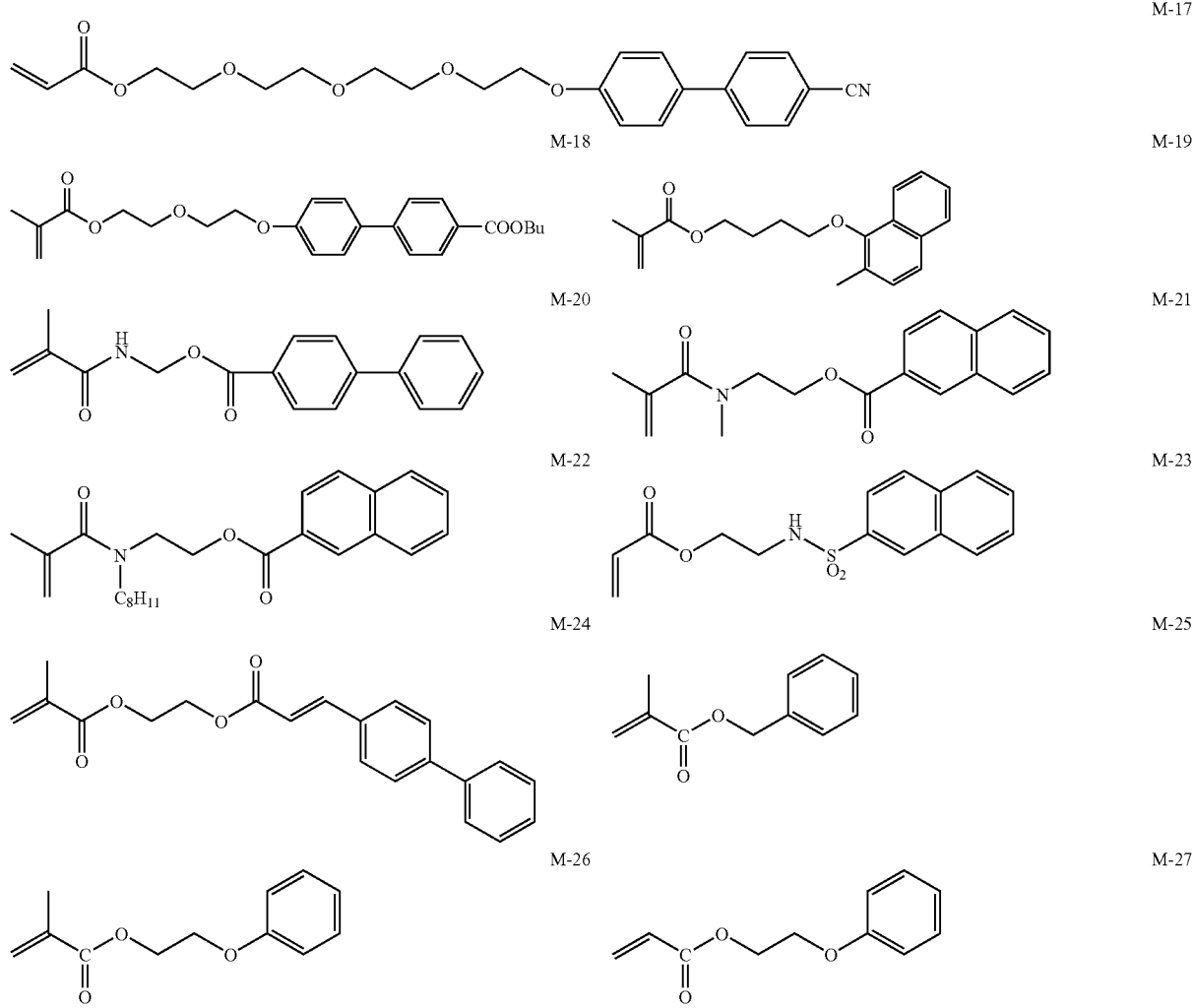

In accordance with the present invention, from the standpoint of dispersion stability, among the hydrophobic structural units (a1) having an aromatic ring that is directly coupled to an atom that forms the main chain of the resin dispersant (A), the preferred structural units are derived from at least any one from among benzyl methacrylate, phenoxyethyl acrylate, and phenoxyethyl methacrylate.

<Hydrophobic Structural Unit (a2) Derived from an Alkyl Ester Having 1 to 4 Carbon Atoms of Acylic Acid or Methacrylic Acid>

The hydrophobic structural unit (a2) derived from an alkyl ester having 1 to 4 carbon atoms of acrylic acid or methacrylic acid that is contained in the resin dispersant (A) has to be contained in the resin dispersant (A) at a content ratio at least not less than 15 wt. %, preferably not less than 20 wt. % and not more than 60 wt. %, and more preferably not less than 20 wt. % and not more than 50 wt. %.

Specific examples of the (meth)acrylates include methyl (meth)acrylate, ethyl (meth)acrylate, (iso)propyl (meth)acrylate, and (iso or tertiary) butyl (meth)acrylate.

The number of carbon atoms in the alkyl group is preferably 1 to 4, more preferably 1 to 2.

<Hydrophilic Structural Unit (b)>

The hydrophilic structural unit (b) constituting the resin dispersant (A) in accordance with the present invention will be described below.

The hydrophilic structural unit (b) is contained at a ratio of more than 0 wt. % and not more than 15 wt. %, preferably not less than 2 wt. % and not more than 15 wt. %, more preferably not less than 5 wt. % and not more than 15 wt. %, and even more preferably not less than 8 wt. % and not more than 12 wt. %.

The resin dispersant (A) includes at least acrylic acid and/or methacrylic acid (b1) as the hydrophilic structural unit (b).

<Hydrophilic Structural Unit (b1)>

The content of the hydrophilic structural unit (b1) has to change depending on the amount of the below-described structural unit (b2) or the amount of the hydrophobic structural unit (a), or both these amounts.

Thus, the resin dispersant (A) in accordance with the present invention may contain the hydrophobic structural unit (a) at a content ratio higher than 80 wt. % and the hydrophilic structural unit (b) at a content ratio not more than 15 wt. % and is determined by the hydrophobic structural units (a1) and (a2), hydrophilic structural units (b1) and (b2), and structural unit (c).

For example, when the resin dispersant (A) is configured only by the hydrophobic structural units (a1) and (a2), hydrophilic structural unit (b1), and structural unit (b2), the content ratio of the acrylic acid and methacrylic acid (b1) can be found by (100−(wt. % of hydrophobic structural units (a1)

and (a2))−(wt. % of structural unit (b2))). In this case, the sum total of the (b1) and (b2) has to be not more than 15 wt. %.

When the resin dispersant (A) is configured by the hydrophobic structural units (a1) and (a2), hydrophilic structural unit (b1), and structural unit (c), the content ratio of the hydrophilic structural unit (b1) can be found by "100−(wt. % of hydrophobic structural units (a1) and (a2))−(wt. % of structural unit (c))".

The resin dispersant (A) can be also configured only by the hydrophobic structural unit (a1), hydrophobic structural unit (a2), and hydrophilic structural unit (b1).

The hydrophilic structural unit (b1) can be obtained by polymerization of acrylic acid and/or methacrylic acid.

The acrylic acid and methacrylic acid can be used individually or in a mixture.

From the standpoint of pigment dispersibility and stability in storage, the acid value of the resin dispersant (A) in accordance with the present invention is preferably not lower than 30 mg KOH/g and not higher than 100 mg KOH/g, more preferably not lower than 30 mg KOH/g and lower than 85 mg KOH/g, and even more preferably not lower than 50 mg KOH/g and lower than 85 mg KOH/g.

The acid value as referred to herein is defined as a weight (mg) of KOH required to neutralize completely 1 g of the resin dispersant (A) and can be measured by a method described in a JIS standard (JIS K0070, 1992).

<Structural Unit (b2)>

The structural unit (b2) preferably has a nonionic aliphatic group. The structural unit (b2) can be formed by polymerizing a monomer corresponding thereto, and an aliphatic functional group may be introduced into the polymer chain after the polymerization of the polymer.

The monomer forming the structural unit (b2) is not particularly limited provided that it has a functional group that can form the polymer and a nonionic hydrophilic functional group. Well known suitable monomers can be used, but from the standpoint of availability, handleability, and utility, vinyl monomers are preferred.

Examples of vinyl monomers include (meth)acrylates, (meth)acrylamides, and vinyl esters having hydrophilic functional groups having a hydrophilic functional group.

Examples of the hydrophilic functional group include a hydroxyl group, an amino group, an amido group (with unsubstituted nitrogen atom), and the below-described alkylene oxide polymers such as polyethylene oxide and polypropylene oxide.

Among them hydroxyethyl (meth)acrylate, hydroxybutyl (meth)acrylate, (meth)acrylamide, aminoethyl acrylate, aminopropyl acrylate, and (meth)acrylates including alkylene oxide polymers are especially preferred.

The structural unit (b2) preferably includes a hydrophilic structural unit having an alkylene oxide polymer structure.

From the standpoint of hydrophility, it is preferred that the alkylene in the alkylene oxide polymer have 1 to 6 carbon atoms, more preferably 2 to 6 carbon atoms, and even more preferably 2 to 4 carbon atoms.

The degree of polymerization of the alkylene oxide polymer is preferably 1 to 120, more preferably 1 to 60, and even more preferably 1 to 30.

It is also preferred that the structural unit (b2) be a hydrophilic structural unit having a hydroxyl group.

The number of hydroxyl groups in the structural unit (b2) is not particularly limited. From the standpoint of hydrophility of the resin (A) and mutual solubility of the solvent or other monomers during the polymerization, it is preferred that this number be 1 to 4, more preferably 1 to 3, even more preferably 1 to 2.

<Structural Unit (c)>

As described above, the resin dispersant (A) in accordance with the present invention can also include a structural unit (c) having a structure different from that of the hydrophobic structural unit (a1), hydrophobic structural unit (a2), and hydrophilic structural unit (b) (this structural unit will be referred to hereinbelow simply as "structural unit (c)").

The structural unit (c) different from the hydrophobic structural unit (a1), hydrophobic structural unit (a2), and hydrophilic structural unit (b), as referred to herein, is a structural unit (c) having a structure different from that of the (a1), (a2), and (b), and it is preferred that the structural unit (c) be a hydrophobic structural unit.

The structural unit (c) can be a hydrophobic structural unit, but it has to be a structural unit having a structure different from that of the hydrophobic structural unit (a1) and hydrophobic structural unit (a2).

The content ratio of the structural unit (c) is preferably not more than 35 wt. %, more preferably not more than 20 wt. %, and even more preferably not more than 15 wt. % based on the entire weight of the resin dispersant (A).

The structural unit (c) can be formed by polymerizing a monomer corresponding thereto. A hydrophobic functional group may be introduced into the polymer chain after the polymerization.

The monomer suitable in the case where the structural unit (c) is a hydrophobic structural unit is not particularly limited, provided that it has a functional group that can form a polymer and a hydrophobic functional group, and well known suitable monomers can be used.

From the standpoint of availability, handleability, and utility, vinyl monomers ((meth)acrylamides, styrenes, and vinyl esters) are preferred as the monomers that can form the hydrophobic structural unit.

Examples of (meth)acrylamides include N-cyclohexyl (meth)acrylamide, N-(2-methoxyethyl) (meth)acrylamide, N,N,-diallyl (meth)acrylamide, and N-allyl (meth)acrylamide.

Examples of styrenes include styrene, methyl styrene, dimethyl styrene, trimethyl styrene, ethyl styrene, isopropyl styrene, n-butyl styrene, tert-butyl styrene, methoxystyrene, butoxystyrene, acetoxystyrene, chlorostyrene, dichlorostyrene, bromostyrene, chloromethyl styrene, hydroxystyrene protected by a group (for example, t-Boc) that can be deprotected by an acidic substance, methylvinyl benzoate, and α-methyl styrene, and vinyl naphthalene Among them, styrene and α-methyl styrene are preferred.

Examples of vinyl esters include vinyl acetate, vinyl chloroacetate, vinyl propionate, vinyl butyrate, vinyl methoxyacetate, and vinyl benzoate. Among them, vinyl acetate is preferred.

The aforementioned compounds can be used individually or in mixtures of two or more thereof.

The resin dispersant (A) in accordance with the present invention may be a random copolymer into which the structural units are introduced irregularly, or a block copolymer into which the structural units are introduced regularly. When resin dispersant is a block copolymer, the synthesis may be performed by introducing the structural units in any order and the same structural component may be used two or more times. From the standpoint of utility and productivity, it is preferred that the resin dispersant be a random copolymer.

Further, the molecular weight range of the resin dispersant (A) in accordance with the present invention is preferably 30,000 to 150,000, more preferably 30,000 to 100,000, and even more preferably 30,000 to 80,000 as represented by a weight-average molecular weight (Mw).

Setting the molecular weight within the aforementioned ranges is preferred because the steric repulsion effect of the dispersant tends to be good and the time for adsorption to a pigment tends to be eliminated by the steric effect.

The molecular weight distribution (represented by the ratio of the weight-average molecular weight to the number-average molecular weight) of the resin used in accordance with the present invention is preferably 1 to 6, more preferably 1 to 4.

Setting the molecular weight distribution within the aforementioned ranges is preferred from the standpoint of ink dispersion stability and ejection stability. The number-average molecular weight and weight-average molecular weight are a molecular weight detected with a differential refractometer by using THF as a solvent in a GPC analyzer employing TSKgel, GMHxL, TSKgel, G4000HxL, TSKgel, G2000HxL (all are trade names of products manufactured by Tosoh Co.) and represented by recalculation using polystyrene as a standard substance.

The resin dispersion (A) used in accordance with the present invention can be synthesized by a variety of polymerization methods, for example, by solution polymerization, precipitation polymerization, suspension polymerization, lump polymerization, and emulsion polymerization. The polymerization reaction can be carried out by conventional operations, for example, in a batch mode, a semi-continuous mode, or a continuous mode.

A method using a radical initiator and a method using irradiation with light or radiation are known as polymerization initiation methods. These polymerization methods and polymerization initiation methods are described in Teiji Tsuruda "Kobunshi Gosei Hoho", Kaiteiban (Nikkan Kogyo Shinbunsha Kan, 1971) and Takayuki Otsu, Masaetsu Kinoshita "Kobunshi Gosei-no Jikkenho" Kagaku Dojin, 1972, p. 124 to 154.

A solution polymerization method using radical initiation is especially preferred as the polymerization method. Examples of solvents that can be used in the solution polymerization method include a variety of organic solvents such as ethyl acetate, butyl acetate, acetone, methyl ethyl ketone, methyl isobutyl ketone, cyclohexaneone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used individually or in mixtures of two or more thereof. A mixed solvent additionally containing water may be also used.

The polymerization temperature has to be set according to the molecular weight of the polymer to be synthesized and the type of polymerization initiator. Usually, the polymerization temperature is about 0° C. to 100° C., but it is preferred that the polymerization be conducted within a range of 50° C. to 100° C.

The reaction pressure can be set appropriately. Usually the reaction pressure is 1 kg/cm² to 100 kg/cm², and preferably 1 kg/cm² to 30 kg/cm². The reaction time is about 5 hours to 30 hours. The resin obtained by be subjected to purification such as reprecipitation.

The preferred specific examples of the resin dispersant (A) in accordance with the present invention are presented below, but the present invention is not limited thereto.

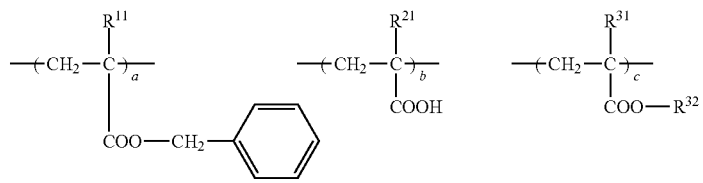

|     | $R^{11}$ | $R^{21}$ | $R^{31}$ | $R^{32}$ | a | b | c | Mw |
|-----|----------|----------|----------|----------|----|----|----|-------|
| B-1 | $CH_3$ | $CH_3$ | $CH_3$ | $-CH_3$ | 60 | 10 | 30 | 46000 |
| B-2 | H | H | H | $-CH_3$ | 60 | 10 | 30 | 50000 |
| B-3 | $CH_3$ | $CH_3$ | $CH_3$ | $-CH_2CH_3$ | 61 | 10 | 29 | 43000 |
| B-4 | $CH_3$ | $CH_3$ | $CH_3$ | $-CH_2CH_2CH_2CH_3$ | 61 | 9 | 30 | 51000 |
| B-5 | $CH_3$ | $CH_3$ | $CH_3$ | $-CH_2(CH_3)CH_3$ | 60 | 9 | 31 | 96000 |
| B-6 | H | H | H | $-CH_2(CH_3)(CH_3)CH_3$ | 60 | 10 | 30 | 32000 |
| B-7 | $CH_3$ | $CH_3$ | $CH_3$ | $-CH_2CH(CH_3)CH_3$ | 60 | 5 | 30 | 75000 |

(a, b and c represent respective compositions (wt. %))

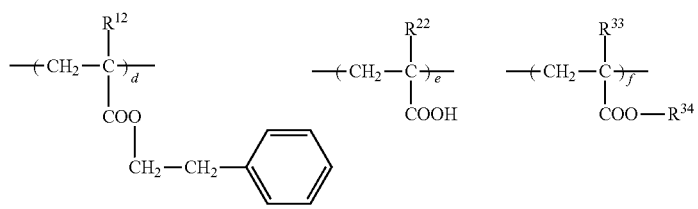

|     | $R^{12}$ | $R^{22}$ | $R^{33}$ | $R^{34}$ | d | e | f | Mw |
|-----|----------|----------|----------|----------|----|----|----|-------|
| B-8 | $CH_3$ | $CH_3$ | $CH_3$ | $-CH_3$ | 55 | 12 | 33 | 31000 |
| B-9 | H | H | H | $-CH2CH(CH3)CH3$ | 70 | 10 | 20 | 34600 |

(d, e and f represent respective compositions (wt. %))

-continued
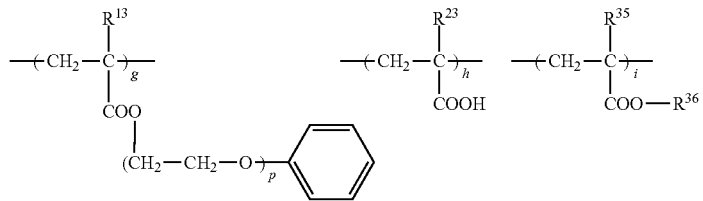
|      | R¹³ | p | R²³ | R³⁵ | R³⁶ | g | h | i | Mw |
|------|-----|---|-----|-----|-----|---|---|---|-----|
| B-10 | CH₃ | 1 | CH₃ | CH₃ | —CH₃ | 60 | 9 | 31 | 35500 |
| B-11 | H   | 1 | H   | H   | —CH₂CH₃ | 69 | 10 | 21 | 41200 |
| B-12 | CH₃ | 2 | CH₃ | CH₃ | —CH₃ | 70 | 11 | 19 | 68000 |
| B-13 | CH₃ | 4 | CH₃ | CH₃ | —CH₂(CH₃)CH₃ | 70 | 7 | 23 | 72000 |
| B-14 | H   | 5 | H   | H   | —CH₃ | 70 | 10 | 20 | 86000 |
| B-15 | H   | 5 | H   | H   | —CH₂CH(CH₃)CH₃ | 70 | 2 | 28 | 42000 |
(g, h and i represent respective compositions (wt. %))
B-16  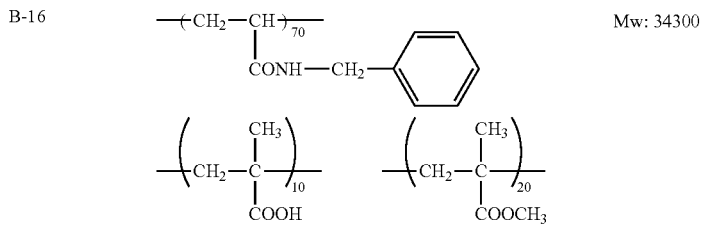  Mw: 34300
Mw
B-17  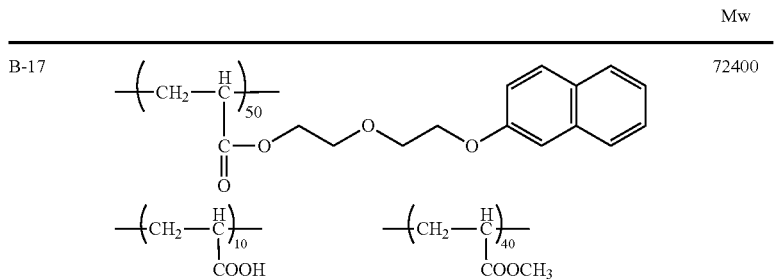  72400
B-18  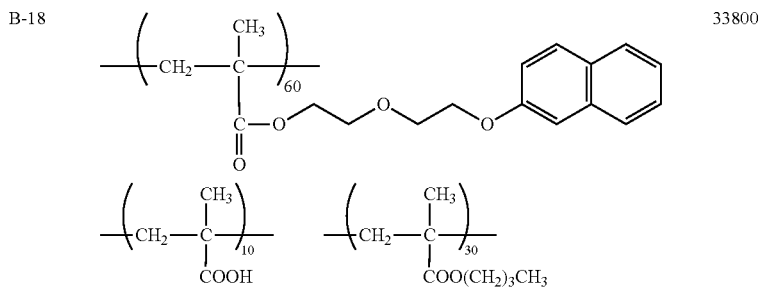  33800
B-19  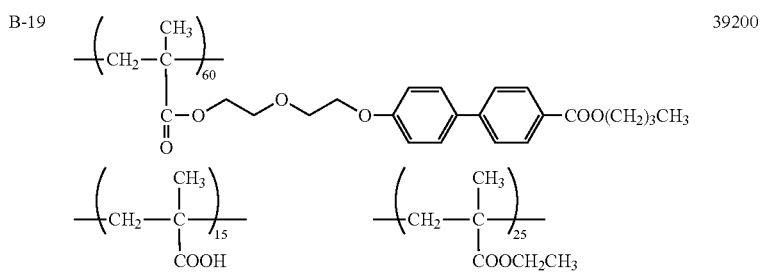  39200

B-20 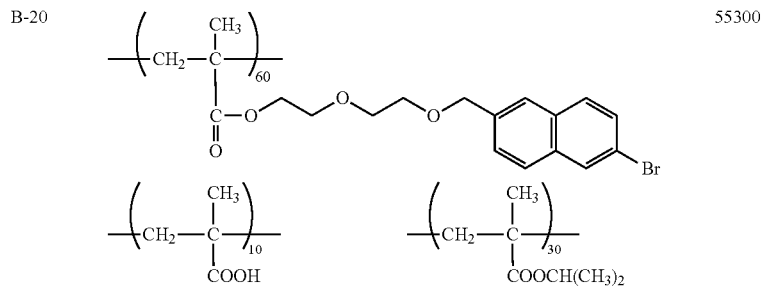 55300

<Ratio of Pigment (B) and Resin Dispersant (A)>

The weight ratio of the pigment (B) and resin dispersant (A) is preferably 100:25 to 100:140, more preferably 100:25 to 100:50. When the resin dispersant is present at a ratio not lower than 100:25, the dispersion stability and abrasion resistance tend to improve, and where the resin dispersant is present at a ratio of 100:140 or less, the dispersion stability tends to improve.

<Pigment (B)>

In accordance with the present invention, the pigment (B) is a general term for color substances (including white color when the pigment is inorganic) that are practically insoluble in water and organic solvents, as described in Kagaku Daijiten (third edition), published on Apr. 1, 1994, (ed. by Michinori Oki), p. 518, and organic pigments and inorganic pigments can be used in accordance with the present invention.

Further, "the pigment (B) dispersed by the resin dispersant (A)" in the description of the present invention means a pigment that is dispersed and held by the resin dispersant (A) and is preferably used as a pigment that is dispersed and held by the resin dispersant (A) in the aqueous liquid medium (D). An additional dispersant may be optionally contained in the aqueous liquid medium (D).

The pigment (B) dispersed by the resin dispersant (A) in accordance with the present invention is not particularly limited, provided that it is a pigment that is dispersed and held by the resin dispersant (A). From the standpoint of pigment dispersion stability and ejection stability, microcapsulated pigments produced by a phase transition method are more preferred from among the aforementioned pigments.

A microcapsulated pigment represents a preferred example of the pigment (B) employed in accordance with the present invention. The microcapsulated pigment as referred to herein is a pigment coated by the resin dispersant (A).

The resin of the microcapsulated pigment has to use the resin dispersant (A), but it is preferred that a polymer compound having self-dispersibility or solubility in water and also having an anionic (acidic) group be used in a resin other than the resin dispersant (A).

<Manufacture of Microcapsulated Pigment>

A microcapsulated pigment can be manufactured by conventional physical and chemical methods using the above-described components such as the resin dispersant (A). For example, a microcapsulated pigment can be manufactured by methods disclosed in Japanese Patent Application Publication Nos. 9-151342, 10-140065, 11-209672, 11-172180, 10-025440, and 11-043636. Methods for manufacturing a microcapsulated pigments will be reviewed below.

A phase transition method or acid precipitation method described in Japanese Patent Application Publication Nos. 9-151342 and 10-140065 can be used as methods for manufacturing microcapsulated pigments, and among them the phase transition method is preferred from the standpoint of dispersion stability.

(a) Phase Transition Method

The phase transition method as referred to in the description of the present invention is basically a self-dispersion (phase transition emulsification) method by which a mixed melt of a pigment and a resin having self-dispersibility or solubility is dispersed in water. The mixed melt may also include the above-described curing agent or polymer compound. The mixed melt as referred to herein is presumed to include a state obtained by mixing without dissolution, a state obtained by mixing with dissolution, and both these states. A more is specific manufacturing method of the "phase transition method" may be identical to that disclosed in Japanese Patent Application Publication No. 10-140065.

(b) Acid Precipitation Method

The acid precipitation method as referred to in the description of the present invention is a method for manufacturing a microcapsulated pigment by using a water-containing cake composed of a resin and a pigment and neutralizing all or some of the anionic groups contained in the resin within the water-containing cake by using a basic compound.

More specifically, the acid precipitation method includes the steps of: (1) dispersing a resin and a pigment in an alkaline aqueous medium and, if necessary, performing a heat treatment to gel the resin; (2) hydrophobizing the resin by obtaining neutral or acidic pH and strongly fixing the resin to the pigment; (3) if necessary, performing filtration and water washing to obtain a water-containing cake; (4) neutralizing all or some of the anionic groups contained in the resin in the water-containing cake by using a basic compound and then re-dispersing in an aqueous medium; and (5) if necessary, performing a heat treatment and gelling the resin.

More specific manufacturing methods of the above-described phase transition method and acid precipitation method may be identical to those disclosed in Japanese Patent Application Publication Nos. 9-151342 and 10-140065. Methods for manufacturing coloring agents described in Japanese Patent Application Publication Nos. 11-209672 and 11-172180 can be also used in accordance with the present invention.

The preferred manufacturing method in accordance with the present invention basically includes the following manufacturing steps: (1) mixing a resin having an anionic group or a solution obtained by dissolving the resin in an organic solvent with an aqueous solution of a basic compound to cause neutralization; (2) admixing a pigment to the mixed liquid to form a suspension and then dispersing the pigment with a dispersing apparatus to obtain a pigment dispersion;

(3) if necessary, removing the solvent by distillation and obtaining an aqueous dispersion in which the pigment is coated with the resin having an anionic group.

In accordance with the present invention, kneading and dispersion treatment mentioned hereinabove can be performed using, for example, a ball mill, a roll mill, a beads mill, a high-pressure homogenizer, a high-speed stirring dispersing apparatus, and an ultrasound homogenizer.

<Pigment B>

The following pigments can be used in accordance with the present invention. Thus, examples of yellow ink pigments include C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, 180.

Examples of magenta ink pigments include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (Bengal), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219. Among them, C. I. Pigment Red 122 is especially preferred.

Examples of cyan ink pigments include C. I. Pigment Blue 1, 2, 3, 15, 15:1, 15:2, 15:3, 15:4, 16, 17:1, 22, 25, 56, 60, C. I. Vat Blue 4, 60, 63. Among them, C. I. Pigment Blue 15:3 is especially preferred.

Examples of other color ink pigments include C. I. Pigment Orange 5, 13, 16, 17, 36, 43, 51, C. I. Pigment Green 1, 4, 7, 8, 10, 17, 18, 36, C. I. Pigment Violet 1 (Rhodamine Lake), 3, 5:1, 16, 19 (quinacridone red), 23, 28. Processed pigments such as graft carbon that are obtained by treating the pigment surface with a resin or the like can be also used.

Carbon black is an example of a black pigment. Specific examples of carbon black include No. 2300, No. 900, MCF88, No. 33, No. 40, No. 45, No. 52, MA 7, MA8, MA100, and No. 2200B manufactured by Mitsubishi Chemical Co., Ltd. Raven 5750, Raven 5250, Raven 5000, Raven 3500, Raven 1255, and Raven 700 manufactured by Colombia Co., Regal 400R, Regal 1330R, Regal 1660R, Mogul L, Monarch 700, Monarch 800, Monarch 880, Monarch 900, Monarch 1000, Monarch 1100, Monarch 1300, and Monarch 1400 manufactured by Cabot Corp., and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 manufactured by Degussa Co., Ltd.

The aforementioned pigments may be used individually or in combinations obtained by selecting a plurality of pigments in each of the above-described groups or a plurality of pigments from different groups.

From the standpoint of dispersion stability and concentration of the aqueous ink, the content ratio of the pigment (B) in the aqueous ink in accordance with the present invention is preferably 1 wt. % to 10 wt. %, more preferably 2 wt. % to 8 wt. %, and even more preferably 2 wt. % to 6 wt. %.

<Self-Dispersible Polymer Microparticles>

The aqueous ink used in accordance with the present invention includes self-dispersible polymer microparticles of at least one kind. Self-dispersible polymer microparticles as referred to herein mean microparticles of a water-insoluble polymer containing no free emulsifying agent, this water-insoluble polymer being capable of assuming a dispersion state in an aqueous medium under the effect of functional groups (especially acidic groups or salt thereof) of the resin itself, without the presence of another surfactant.

The dispersion state as referred to herein includes both an emulsion state (emulsion) in which the water-insoluble polymer is dispersed in a liquid state in the aqueous medium and a dispersion state (suspension) in which the water-insoluble polymer is dispersed in a solid state in the aqueous medium.

From the standpoint of ink stability and ink aggregation speed in the case the water-insoluble polymer is contained in a water-soluble ink, it is preferred that the water-insoluble polymer in accordance with the present invention be a water-insoluble polymer that can assume a dispersion state in which the water-insoluble polymer is dispersed in a solid state.

The dispersion state of the self-dispersible polymer microparticles in accordance with the present invention represents a state such that the presence of a dispersion state can be visually confirmed with good stability at least over a week at a temperature of 25° C. in a system obtained by mixing a solution obtained by dissolving 30 g of a water-insoluble polymer in 70 g of an organic solvent (for example, methyl ethyl ketone), a neutralizing agent capable of 100% neutralization of salt-forming groups of the water-insoluble polymer (where the salt-forming group is anionic, the neutralizing agent is sodium hydroxide, and where the to salt-forming group is cationic, the neutralizing agent is acetic acid), and 200 g water, stirring (apparatus: stirring apparatus equipped with a stirring impeller, revolution speed 200 rpm, 30 min, 25° C.), and then removing the organic solvent from the mixed liquid.

The water-insoluble polymer as referred to herein is a resin that dissolves in an amount of 10 g or less when dried for 2 hours at 105° C. and then dissolved in 100 g of water at is 25° C. The amount dissolved is preferably not more than 5 g, more preferably not more than 1 g. The amount dissolved refers to a state upon 100% neutralization with sodium hydroxide or acetic acid, correspondingly to the type of the salt-forming group of the water-insoluble polymer.

The aqueous medium may be composed of water or, if necessary, may also include a hydrophilic organic solvent. In accordance with the present invention, a composition including water and a hydrophilic organic solvent at a content ratio not more than 0.2 wt. % with respect to the water is preferred, and a composition including only water is more preferred.

A main chain skeleton of the water-insoluble polymer is not particularly limited and a vinyl polymer or a condensation polymer (an epoxy resin, a polyester, a polyurethane, a polyamide, cellulose, a polyether, a polyurea, a polyimide, a polycarbonate, etc.) can be used. Among them, a vinyl polymer is preferred.

The preferred examples of vinyl polymers and monomers constituting vinyl polymers are described in Japanese Patent Application Publication Nos. 2001-181549 and 2002-088294. A vinyl polymer having a dissociative group introduced into the end of the polymer chain by radical polymerization of a vinyl monomer using a chain transfer agent, a polymerization initiator, or an iniferter having a dissociative group (or a substituent that can derive a dissociative group) or by ion polymerization using a compound having a dissociative group (or a substituent that can derive a dissociative group) for either an initiator or a stopping agent can be also used.

The preferred examples of condensation polymers and monomers constituting the condensation polymers are described in Japanese Patent Application Publication No. 20001-247787.

From the standpoint of self-dispersibility, it is preferred that the self-dispersible polymer microparticles in accordance with the present invention include a water-insoluble polymer including a hydrophilic structural unit and a structural unit derived from a monomer having an aromatic group.

The hydrophilic structural unit is not particularly limited provided that it is derived from a monomer including a hydrophilic group, and this structural unit may be derived from one monomer having a hydrophilic group or two or more monomers having a hydrophilic group. The hydrophilic group is not particularly limited and may be a dissociative group or a nonionic hydrophilic group.

From the standpoint of enhancing the self dispersion and also from the standpoint of stability of emulsion or dispersion state that has been formed, it is preferred that the hydrophilic group in accordance with the present invention be a dissociative group, more preferably an anionic dissociative group. Examples of dissociative groups include a carboxyl group, a phosphate group, and a sulfonate group. Among them, from the standpoint of fixing ability when the ink composition is configured, a carboxyl group is preferred.

From the standpoint of self-dispersibility and aggregation ability, it is preferred that the monomer having a hydrophilic group in accordance with the present invention be a monomer having a dissociative group, more preferably a monomer having a dissociative group that has a dissociative group and an ethylenic unsaturated body.

Examples of suitable monomers having a dissociative group include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid. Specific examples of the unsaturated sulfonic acid monomer include styrenesulfonic acid, 2-acrylamido-2-methylpropanesulfonic acid, 3-sulfopropyl (meth)acrylate, and bis-(3-sulfopropyl)-itaconic acid esters. Specific examples of the unsaturated phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate.

Among the monomers including a dissociative group, from the standpoint of dispersion stability and ejection stability, unsaturated carboxylic acid monomers are preferred and acrylic acid and methacrylic acid are especially preferred.

From the standpoint of self-dispersibility and aggregation speed during contact with a reaction liquid, it is preferred that the self-dispersible polymer microparticles in accordance with the present invention include a first polymer having a carboxyl group and an acid value (mg KOH/g) of 25 to 100. Furthermore, from the standpoint of self-dispersibility and aggregation speed during contact with a reaction liquid, it is preferred that the acid value be 25 to 80, more preferably 30 to 65. Where the acid value is not lower than 25, good stability of self-dispersibility is obtained. Where the acid value is not higher than 100, aggregation ability is improved.

The monomer including an aromatic groups is not particularly limited, provided it is a compound having an aromatic group and a polymerizable group. The aromatic group may be a group derived from an aromatic hydrocarbon or a group derived from an aromatic hetero ring. In accordance with the present invention, from the standpoint of particle shape stability in the aqueous medium, it is preferred that the aromatic group be derived from an aromatic hydrocarbon.

The polymerizable group may be a condensation polymerizable group or an addition polymerizable group. In accordance with the present invention, from the standpoint of particle shape stability in the aqueous medium, it is preferred that the polymerizable group be an addition polymerizable group, more preferably a group including an ethylenic unsaturated bond.

The monomer including an aromatic group in accordance with the present invention is preferably a monomer having an aromatic group derived from an aromatic hydrocarbon and an ethylenic unsaturated body, more preferably a (meth)acrylate monomer including an aromatic group. In accordance with the present invention, the monomer including an aromatic group of one kind may be used or a combination of monomers of two or more kinds may be used.

Examples of the monomer including an aromatic group include phenoxyethyl (meth)acrylate, benzyl (meth)acrylate, phenyl (meth)acrylate, and styrene monomers. Among them, from the standpoint of hydrophilic-hydrophobic balance of the polymer chain and ink fixing ability, it is preferred that the monomer including an aromatic group be of at least of one kind selected from phenoxyethyl (meth)acrylate, benzyl (meth)acrylate, and phenyl (meth)acrylate. Among them, phenoxyethyl (meth)acrylate is preferred, and phenoxyethyl acrylate is even more preferred.

"(Meth)acrylate" means acrylate or methacrylate.

The self-dispersible polymer microparticles in accordance with the present invention include a structural unit derived from a (meth)acrylate monomer including an aromatic group, and the content ratio thereof is preferably 10 wt. % to 95 wt. %. Where the content ratio of the (meth)acrylate monomer including an aromatic group is 10 wt. % to 95 wt. %, the stability of self-emulsion or dispersion state is improved. In addition, the increase in ink viscosity can be inhibited.

In accordance with the present invention, from the standpoint of stability of the self-dispersion state, stabilization of particle shape in the aqueous medium by hydrophobic interaction of aromatic rings with each other, and decrease in the amount of water-soluble components caused by adequate hydrophobization of the particles, it is preferred that the content ratio of the (meth)acrylate monomer including an aromatic group be 15 wt. % to 90 wt. %, preferably 15 wt. % to 80 wt. %, more preferably 25 wt. % to 70 wt. %.

The self-dispersible polymer microparticles in accordance with the present invention can be configured, for example, by a structural unit including a monomer having an aromatic group and a structural unit including a monomer having a dissociative group. If necessary, the microparticles may also include other structural units.

The monomers forming other structural units are not particularly limited, provided that they are monomers copolymerizable with the monomer having an aromatic group and the monomer having a dissociative group. Among them, from the standpoint of flexibility of the polymer skeleton and easiness of controlling the glass transition temperature (Tg), a monomer including an alkyl group is preferred.

Examples of the monomer including an alkyl group include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; ethylenic unsaturated monomers having a hydroxyl group, such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; dialkylaminoalkyl (meth)acrylates such as dimethylaminoethyl (meth)acrylate; N-hydroxyalkyl (meth)acrylamides such as N-hydroxymethyl (meth)acrylamide, N-hydroxyethyl (meth)acrylamide, and N-hydroxybutyl (meth)acrylamide; and (meth)acrylamides such as N-alkoxyalkyl (meth)acrylamides, for example, N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide.

The molecular weight range of the water-insoluble polymer constituting the self-dispersible polymer microparticles in accordance with the present invention is preferably 3000 to 200,000, more preferably 50000 to 150,000, even more preferably 10,000 to 100,000, as a weight-average molecular weight. Where the weight-average molecular weight is not less than 3000, the amount of water-soluble components can be effectively inhibited. Where the weight-average molecular weight is not more than 200,000, self-dispersion stability can be increased. The weight-average molecular weight can be measured by gel permeation chromatography (GPC).

From the standpoint of controlling the hydrophilicity and hygrophobicity of the polymer, it is preferred that the water-insoluble polymer constituting the self-dispersible polymer microparticles in accordance with the present invention include a (meth)acrylate monomer including an aromatic group at a copolymerization ratio of 15 wt. % to 90 wt. %, a monomer including a carboxyl group, and a monomer including an alkyl group, have an acid value of 25 to 100, and have a weight-average molecular weight of 3000 to 200,000. It is even more preferred that the water-insoluble polymer constituting the self-dispersible polymer microparticles include a (meth)acrylate monomer including an aromatic group at a copolymerization ratio of 15 wt. % to 80 wt. %, a monomer including a carboxyl group, and a monomer including an alkyl group, have an acid value of 25 to 95, and have a weight-average molecular weight of 5000 to 150,000.

Exemplary Compounds B-01 to B-19 are presented below as specific examples of the water-insoluble polymer constituting the self-dispersible polymer microparticles, but the present invention is not limited thereto. The weight ratio of the copolymer components is shown in the parentheses.

B-01: phenoxyethyl acrylate-methyl methacrylate-acrylic acid copolymer (50/45/5).

B-02: phenoxyethyl acrylate-benzyl methacrylate-isobutyl methacrylate-methacrylic acid copolymer (30/35/29/6).

B-03: phenoxyethyl methacrylate-isobutyl methacrylate-methacrylic acid copolymer (50/44/6).

B-04: phenoxyethyl acrylate-methyl methacrylate-ethyl acrylate-acrylic acid copolymer (30/55/10/5).

B-05: benzyl methacrylate-isobutyl methacrylate-methacrylic acid copolymer (35/59/6).

B-06: styrene-phenoxyethyl acrylate-methyl methacrylate-acrylic acid copolymer (10/50/35/5).

B-07: benzyl acrylate-methyl methacrylate-acrylic acid copolymer (55/40/5).

B-08: phenoxyethyl methacrylate-benzyl acrylate-methacrylic acid copolymer (45/47/8).

B-09: styrene-phenoxyethyl acrylate-butyl methacrylate-acrylic acid copolymer (5/48/40/7).

B-10: benzyl methacrylate-isobutyl methacrylate-cyclohexyl methacrylate-methacrylic acid copolymer (35/30/30/5).

B-11: phenoxyethyl acrylate-methyl methacrylate-butyl acrylate-methacrylic acid copolymer (12/50/30/8).

B-12: benzyl acrylate-isobutyl methacrylate-acrylic acid copolymer (93/2/5).

B-13: styrene-phenoxyethyl methacrylate-butyl acrylate-acrylic acid copolymer (50/5/20/25).

B-14: styrene-butyl acrylate-acrylic acid copolymer (62/35/3).

B-15: methyl methacrylate-phenoxyethyl acrylate-acrylic acid copolymer (45/51/4).

B-16: methyl methacrylate-phenoxyethyl acrylate-acrylic acid copolymer (45/49/6).

B-17: methyl methacrylate-phenoxyethyl acrylate-acrylic acid copolymer (45/48/7).

B-18; methyl methacrylate-phenoxyethyl acrylate-acrylic acid copolymer (45/47/8).

B-19: methyl methacrylate-phenoxyethyl acrylate-acrylic acid copolymer (45/45/10).

A method for manufacturing the water-insoluble polymer constituting the self-dispersible polymer microparticles in accordance with the present invention is not particularly limited. Examples of suitable methods include a method for performing emulsion polymerization in the presence of a polymerizable surfactant and inducing covalent coupling of the surfactant and a water-insoluble polymer and a method for copolymerizing a monomer mixture including the above-described monomer including a hydrophilic group and the monomer including an aromatic group by a well-known polymerization method such as a solution polymerization method and a lump polymerization method. Among the aforementioned polymerization methods, from the standpoint of aggregation speed and stability of deposition in the case of an aqueous ink, the solution polymerization method is preferred, and a solution polymerization method using an organic solvent is more preferred.

From the standpoint of aggregation speed, it is preferred that the self-dispersible polymer microparticles in accordance with the present invention include a first polymer synthesized in an organic solvent and that this first polymer be prepared as a resin dispersion having carboxyl groups and an acid number of 20 to 100, wherein at least some of carboxyl groups of the first polymer are neutralized and water is contained as a continuous phase.

Thus, the method for manufacturing the self-dispersible polymer microparticles in accordance with the present invention preferably includes a step of synthesizing the first polymer in an organic solvent and a dispersion step of obtaining an aqueous dispersion in which at least some of carboxyl groups of the first polymer are neutralized.

The dispersion step preferably includes the following step (1) and step (2).

Step (1): a step of stirring a mixture including a first polymer (water-insoluble polymer), an organic solvent, a neutralizing agent, and an aqueous medium.

Step (2): a step of removing the organic solvent from the mixture.

The step (1) is preferably a treatment in which the first polymer (water-insoluble polymer) is dissolved in an organic solvent, then the neutralizing agent and aqueous medium are gradually added, the components are mixed and stirred, and a dispersion is obtained. By adding the neutralizing agent and aqueous medium to a solution of the water-insoluble polymer obtained by dissolving in an organic solvent, it is possible to obtain self-dispersible polymer particles of a particle size that ensures higher stability in storage. The method for stirring the mixture is not particularly limited and a mixing and stirring apparatus of general use and, if necessary, a dispersing apparatus such as an ultrasound dispersing apparatus or a high-pressure homogenizer can be used.

An alcohol-based solvent, a ketone-based solvent, or an ether-based solvent is preferred as the organic solvent. Examples of the alcohol-based solvent include isopropyl alcohol, n-butanol, t-butanol, and ethanol. Examples of ketone solvents include acetone, methyl ethyl ketone, diethyl ketone, and methyl isobutyl ketone. Examples of ether solvents include dibutyl ether and dioxane. Among these solvents, ketone-based solvents such as methyl ethyl ketone and alcohol-based solvents such as isopropyl alcohol are preferred. Further, with the object of moderating the variations of polarity in a phase transition from an oil system to an aqueous system, it is preferred that isopropyl alcohol and methyl ethyl ketone be used together. Where the two solvents are used together, aggregation and precipitation and also fusion of particles with each other are prevented and self-dispersible polymer microparticles of a fine particle size and high dispersion stability can be obtained.

The neutralizing agent is used so that the dissociative groups be partially or completely neutralized and the self-dispersible polymer form a stable emulsion or dispersion state in water When the self-dispersible polymer in accordance with the present invention has anionic dissociative groups (for example, carboxyl groups) as the dissociative groups, basic compounds such as organic amine compounds, ammonia, and alkali metal hydroxides can be used as the neutralizing agent. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of alkali metal hydroxides include lithium hydroxide, sodium hydroxide, and potassium hydroxide. Among them, from the standpoint of stabilizing the dispersion of the self-dispersible polymer microparticles in accordance with the present invention in water, sodium hydroxide, potassium hydroxide, triethylamine, and triethanolamine are preferred.

These basic compounds are used preferably at 5 mol % to 120 mol %, more preferably 10 mol % to 110 mol %, and even more preferably 15 mol % to 100 mol % per 100 mol of dissociative groups. Where the ratio of the basic compound is not less than 15 mol %, the stabilization effect of particle dispersion in water is demonstrated, and where the ratio is not more than 100 mol %, the amount of water-soluble components is decreased.

In the step (2), the organic solvent is distilled out by the usual method such as vacuum distillation from the dispersion obtained in the step (1), thereby inducing phase transition to an aqueous system and making it possible to obtain an aqueous dispersion of self-dispersible polymer particles. The organic solvent contained in the obtained aqueous dispersion is substantially removed, and the amount of organic solvent is preferably not more than 0.2 wt. %, more preferably not more than 0.1 wt. %.

The mean particle size of the self-dispersible polymer microparticles in accordance with the present invention is preferably within a range of 10 nm to 400 nm, more preferably 10 nm to 200 nm, and even more preferably 10 nm to 100 nm. Particles with a mean size of 10 nm or more are more suitable for manufacture. Where the mean particle size is not more than 400 nm, stability in storage is improved.

The particle size distribution of the self-dispersible polymer microparticles in accordance with the present invention is not particularly limited, and particles with a wide particle size distribution or a monodisperse particle size distribution may be used. Furthermore, water-insoluble particles of two or more kinds may be used as a mixture.

The mean particle size and particle size distribution of the self-dispersible polymer microparticles can be measured, for example, by using a light scattering method.

The self-dispersible polymer microparticles in accordance with the present invention can be advantageously contained in an aqueous ink composition, and the particles of one kind may be used individually, or particles of two or more kinds may be used together.

<Aqueous Liquid Medium (D)>

In the aqueous ink of the inkjet recording system, the aqueous liquid medium (D) represents a mixture of water and a water-soluble organic solvent. The water-soluble organic solvent (also can be referred to hereinbelow as "solvent medium") is used as a drying preventing agent, wetting agent, and penetrating agent.

A drying preventing agent is used with the object of preventing the ink ejection port of a nozzle from clogging by the dried inkjet ink. A water-soluble organic solvent with a vapor pressure lower than that of water is preferred as the drying preventing agent and wetting agent. Further, a water-soluble organic solvent can be advantageously used as a penetrating agent with the object of ensuring better penetration of the ink for inkjet printing into the recording medium (paper and the like).

Examples of water-soluble organic solvents include alkane diols (polyhydric alcohols) such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; sugars such as glucose, mannose, fructose, ribose, xylose, arabinose, galactose, aldonic acid, glucitol (sorbit), maltose, cellobiose, lactose, sucrose, trehalose, and maltotriose; sugar alcohols; hyaluronic acids; the so-called solid wetting agents such as urea; alkyl alcohols having 1 to 4 carbon atoms such as ethanol, methanol, butanol, propanol, and isopropanol, glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-n-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; 2-pyrrolidone, N-methyl-2-pyrrolidone, 1,3-dimethyl-2-imidizolidinone, formamide, acetamide, dimethylsulfoxide, sorbit, sorbitan, acetin, diacetin, triacetin, and sulfolan. These compounds can be used individually or in combinations of two or more thereof.

A polyhydric alcohol is useful as a drying preventing agent or a wetting agent. Examples of suitable polyhydric alcohols include glycerin, ethylene glycol, diethylene glycol triethylene glycol, propylene glycol, dipropylene glycol, tripropylene glycol, 1,3-butanediol, 2,3-butanediol, 1,4-butanediol, 3-methyl-1,3-butanediol, 1,5-pentanediol tetraethylene glycol, 1,6-hexanediol, 2-methyl-2,4-pentanediol, polyethylene glycol, 1,2,4-butanetriol, and 1,2,6-hexanetriol. These alcohols can be used individually or in combinations of two or more thereof.

A polyol compound is preferred as a penetrating agent. Examples of aliphatic diols include 2-ethyl-2-methyl-1,3-propanediol, 3,3,-dimethyl-1,2,-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol. Among them, 2-ethyl-1,3-hexanediol and 2,2,4-trimethyl-1,3-pentanediol are preferred.

The water-soluble organic solvents may be used individually or in mixtures of two or more thereof. The content ratio of the water-soluble organic solvent in the ink is preferably not less than 1 wt. % and not more than 60 wt. %, more preferably not less than 5 wt. % and not more than 40 wt. %.

The amount of water added to the ink is not particularly limited, but it is preferably not less than 10 wt. % and not more than 99 wt. %, more preferably not less than 30 wt. % and not more than 80 wt. %. It is especially preferred that the amount of water be not less than 50 wt. % and not more than 70 wt. %, From the standpoint of dispersion stability and ejection stability, it is preferred that the content ratio of the aqueous liquid medium (D) in accordance with the present invention be not less than 60 wt. % and not more than 95 wt. %, more preferably not less than 70 wt. % and not more than 95 wt. %.

<Surfactant>

It is preferred that a surfactant (can be also referred to hereinbelow as "surface tension adjusting agent") be added to the aqueous ink in accordance with the present invention. Examples of surfactants include nonionic, cationic, anionic, and betaine surfactants. The amount of the surface tension adjusting agent added to the ink is preferably such as to adjust the surface tension of the aqueous ink in accordance with the present invention to 20 mN/m to 60 mN/m, more preferably to 20 mN/m to 45 mN/m, and even more preferably to 25 mN/m to 40 mN/m, in order to eject the ink with an ink jet.

A compound having a structure having a combination of a hydrophilic portion and a hydrophobic portion in a molecule can be effectively used as the surfactant, and anionic surfactants, cationic surfactants, amphoteric surfactants, and nonionic surfactants can be used. Furthermore, the above-described polymer substance (polymer dispersant) can be also used as the surfactant.

Specific examples of anionic surfactants include sodium dodecylbenzenesulfonate, sodium lauryl sulfate, sodium alkyldiphenyl ether disulfonates, sodium alkyl naphthalenesulfonate, sodium dialkylsulfosuccinates, sodium stearate, potassium oleate, sodium dioctylsulfosuccinate, polyoxyethylene alkyl ether sulfuric acid sodium, polyoxyethylene alkyl ether sulfuric acid sodium, polyoxyethylene alkyl phenyl ether sulfuric acid sodium, sodium dialkylsulfosuccinates, sodium stearate, sodium oleate, and t-octylphenoxyethoxypolyethoxyethyl sulfuric acid sodium salt. These surfactants can be used individually or in combinations of two or more thereof.

Specific examples of nonionic surfactants include polyoxyethylene laurylether, polyoxyethylene octyl phenyl ether, polyoxyethylene oleyl phenyl ether, polyoxyethylene nonyl phenyl ether, oxyethylene oxypropylene block copolymer, t-octyl phenoxyethyl polyethoxy ethanol, nonyl phenoxyethyl polyethoxy ethanol. These surfactants can be used individually or in combinations of two or more thereof.

Examples of cationic surfactants include tetraalkylammonium salts, alkylamine salts, benzalkonium salts, alkylpyridium salts, and imidazolium salts. Specific examples include dihydroxyethylstearylamine, 2-heptadecenyl-hydroxyethyl imidazoline, lauryldimethylbenzyl ammonium chloride, cetyl pyridinium chloride, and stearamidomethyl pyridium chloride.

The amount of the surfactant added to the aqueous ink for inkjet recording in accordance with the present invention is not particularly limited, but preferably this amount is not less than 1 wt. %, more preferably 1 wt. % to 10 wt. %, and even more preferably 1 wt. % to 3 wt. %.

<Other Components>

The aqueous ink used in accordance with the present invention may also include other additives. Examples of other additives include such well-known additives as an ultraviolet absorbent, a fading preventing agent, an antimold agent, a pH adjusting agent, an antirust agent, an antioxidant, an emulsion stabilizer, a preservative, an antifoaming agent, a viscosity adjusting agent, a dispersion stabilizer, and a chelating agent.

Examples of the ultraviolet absorbent include a benzophenone-type ultraviolet absorbent a benzotriazole-type ultraviolet absorbent, a salicylate-type ultraviolet absorbent, a cyanoacrylate ultraviolet absorbent, and a nickel complex-type ultraviolet absorbent.

Examples of the fading preventing agent include agents of a variety of organic and metal complex systems. Examples of organic fading preventing agents include hydroquinones, alkoxyphenols, dialkoxyphenols, phenols, anilines, amines, indanes, coumarones, alkoxyanilines, and hetero rings. Examples of metal complexes include nickel complexes and zinc complexes.

Examples of the antimold agent include sodium dehydroacetate, sodium benzoate, sodium pyridinethione-1-oxide, p-hydroxybenzoic acid ethyl ester, 1,2-benzisothiazoline-3-one, sodium sorbitate, and pentachlorophenol sodium. The antimold agent is preferably used at 0.02 wt. % to 1.00 wt. % in the ink.

The pH adjusting agent is not particularly limited, provided that it can adjust the pH to a desired value, without adversely affecting the prepared recording ink, and the agent can be selected appropriately according to the object. Examples of suitable agents include alcohol amines (for example, diethanolamine, triethanolamine, and 2-amino-2-ethyl-1,3-propanediol), alkali metal hydroxides (for example, lithium hydroxide, sodium hydroxide, and potassium hydroxide), ammonium hydroxides (for example, ammonium hydroxide and quaternary ammonium hydroxide), phosphonium hydroxide, and alkali metal carbonates.

Examples of antirust agents include acidic sulfites, sodium thiosulfate, ammonium thiodiglycolate, diisoproplylammonium nitrate, pentaerythritol tetranitrate, dicyclohexyl ammonium nitrite.

Examples of the antioxidant include phenolic antioxidants (including hindered phenol antioxidants), amine antioxidants, sulfur-containing antioxidants, and phosphorus-containing antioxidants.

Examples of the chelating agent include ethylenediaminetetracetatic acid sodium salt, nitrilotriacetic acid sodium salt, hydroxyethylethylenediaminetriacetic acid sodium salt, diethylenetriaminepentaacetic acid sodium salt, and uramyldiacetic acid sodium salt.

<Explanation of Treatment Liquid (Aggregation Treatment Liquid)>

The preferred treatment liquid used in the first embodiment of the present invention causes aggregation of the pigment and polymer microparticles contained in the ink by changing the pH of the ink, and produces aggregates thereof.

Components of the treatment liquid are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acids, orthophosphoric acid, pyrrolidonecarboxylic acid, pyronecarboxylic acid, pyrrolecarboxylic acid, furanecarboxylic acid, pyridinecarboxylic acid, coumaric acid, thiophenecarboxylic acid, nicotinic acid, or derivatives of these compounds, or salts thereof.

A treatment liquid having added thereto a polyvalent metal salt or a polyallylamine is the preferred examples of the treatment liquid. The aforementioned compounds may be used individually or in combinations of two or more thereof.

From the standpoint of aggregation ability with the ink, the treatment liquid preferably has a pH of 1 to 6, more preferably a pH of 2 to 5, and even more preferably a pH of 3 to 5.

The amount of the component that causes aggregation of the pigment and polymer particles of the ink in the treatment liquid is preferably not less than 0.01 wt. % and not more than 20 wt. % based on the total weight of the liquid. Where the amount of this component is less than 0.01 wt. %, sufficient concentration diffusion does not proceed when the treatment liquid and ink come into contact with each other, and sufficient aggregation action caused by pH variation sometimes does not occur. Further, where the amount of this component is more than 20 wt. %, the ejection ability from the inkjet head can be degraded.

From the standpoint of preventing the nozzles of inkjet heads from being clogged by the dried ink, it is preferred that the treatment liquid include an organic solvent capable of dissolving water and other additives. A wetting agent and a penetrating agent are included in the organic solvent capable of dissolving water and other additives.

The solvents can be used individually or in a mixture of plurality thereof together with water and other additives.

The content ratio of the organic solvent capable of dissolving water and other additives is preferably not more than 60 wt. % based on the total weight of the treatment liquid. Where this amount is higher than 60 wt. %, the viscosity of the treatment liquid increases and ejection ability from the inkjet head can be degraded.

In order to improve fixing ability and abrasive resistance, the treatment liquid may fiber include a resin component. Any resin component may be employed, provided that the ejection ability from a head is not degraded when the treatment liquid is ejected by an inkjet system and also provided that the treatment liquid will have high stability in storage. Thus, water-soluble resins and resin emulsions can be freely used.

An acrylic resin, a urethane resin, a polyester, a vinyl resin, and a styrene resin can be considered as the resin components. In order to demonstrate a sufficient function of improving the fixing ability, a polymer with a comparatively high molecular weight has to be added at a high concentration of 1 wt. % to 20 wt. %. However, where such a material is added to and dissolved in a liquid, the viscosity thereof increases and ejection ability is degraded. A latex can be effectively added as an adequate material that can be added to a high concentration, while inhibiting the increase in viscosity. Examples of latex materials include alkyl acrylate copolymers, carboxy-modified SBR (styrene-butadiene latex), SIR (styrene-isoprene) latex, MBR (methyl methacrylate-butadiene latex), and NBR (acrylonitrile-butadiene latex). From the standpoint of the process, in order to improve both the stability during storage at normal temperature and the transferability after heating, while ensuring a strong effect during fixing, it is preferred that the glass transition temperature Tg of the latex be not lower than 50° C. and not higher than 120° C. Furthermore, from the standpoint of the process, in order to obtain sufficient fixing at a low temperature, while ensuring a strong effect during fixing, it is preferred that the minimum film-formation temperature MFT be not higher than 100° C., more preferably not higher than 50° C.

The aggregation ability may be further improved by introducing polymer microparticles of reverse polarity with respect to that of the ink into the treatment liquid and causing the aggregation of the pigment contained in the ink with the polymer microparticles.

The aggregation ability may be also improved by introducing a curing agent corresponding to the polymer microparticle component contained in the ink into the treatment liquid, bringing the two liquids into contact, causing aggregation and also crosslinking or polymerization of the resin emulsion in the ink component.

The treatment liquid can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalenesulfonic acid formalin condensate, and polyoxyethylene alkylsulfuric acid esters and salts, and nonionic surfactants such as polyoxyethyelene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (manufactured by Air Products & Chemicals Co., Ltd.), which is an acetylene-type polyoxyethylene oxide surfactant, be used. Amineoxide-type amphoteric surfactants such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the image formation body (recording medium, intermediate transfer body, etc.). Further, even when the ink is the first to be deposited, effective aggregation action proceeds because of increased wettability of the ink and enlarged contact surface area of the two liquids.

The surface tension of the treatment liquid in accordance with the present invention is preferably 10 mN/m to 50 mN/m. From the standpoint of improving penetration into the permeable recording medium when direct recording is performed and from the standpoint of improving the wettability on the intermediate transfer body and also size reduction ability and ejection ability of droplets when recording is performed by an intermediate transfer system, it is even more preferred that the surface tension be 15 mN/m to 45 mN/m.

The viscosity of the treatment liquid in accordance with the present invention is preferably 1.0 cP to 20.0 cP.

If necessary, a pH buffer agent, an antioxidant, an antimold agent, a viscosity adjusting agent, an electrically conductive agent, an ultraviolet agent, and absorbent, etc. can be also added.

Second Embodiment

In the second embodiment of the image forming apparatus in accordance with the present invention, an intermediate transfer system is employed in which an image is temporarily formed by a two-liquid aggregation method on an intermediate transfer body and this image is then transferred onto a recording medium.

Figure 15:
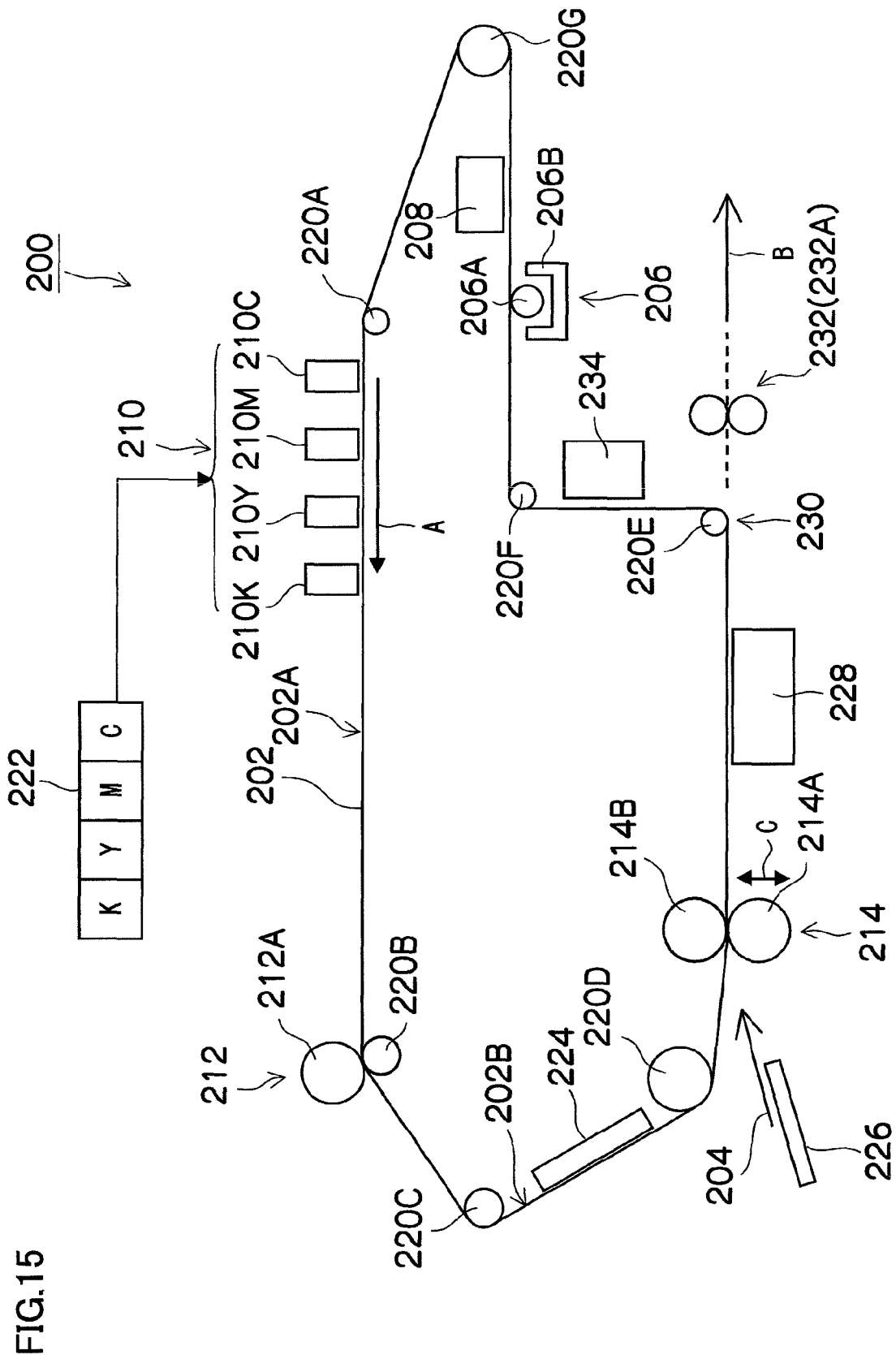
FIG. 15 is a schematic structural diagram illustrating the inkjet printing apparatus of a second embodiment of the present invention.

FIG. 15 is a schematic structural diagram of the inkjet recording apparatus of the second embodiment. An inkjet recording apparatus 200 shown in FIG. 15 employs a two-liquid aggregation system and an intermediate transfer recording system. In this inkjet recording apparatus, an ink image composed of ink aggregates (coloring material aggregates) is formed on an intermediate transfer body 202 by using an ink and an aggregation treatment agent, and the ink image formed on the intermediate transfer body 202 is transferred onto a recording medium 204.

As shown in FIG. 15, the inkjet recording apparatus 200 of the second embodiment mainly includes an aggregation treatment liquid application unit 206 that applies an aggregation treatment agent (aggregation treatment liquid) onto the intermediate transfer body 202, a heating and drying unit 208 that heats and dries the aggregation treatment liquid that has been applied on the intermediate transfer body 202, a printing unit (ink deposition unit) 210 that converts inks of a plurality of colors into droplets and deposits them on the intermediate transfer body 202, a solvent removal unit 212 that removes a liquid solvent (liquid component of the ink and aggregation treatment liquid) located on the intermediate transfer body 202, and a transfer unit 214 that transfers the ink image formed on the intermediate transfer body 202 onto the recording medium 204.

An endless belt is used for the intermediate transfer body 202 shown in FIG. 15. The intermediate transfer body (endless belt) 202 has a structure wound about a plurality of tension rollers (in FIG. 15, seven tension rollers 220A to 220G are shown), and the intermediate transfer body 202 is driven in the counterclockwise direction in FIG. 15 (the direction shown by arrow A in FIG. 15) by the transmission of power from a motor (not shown in FIG. 15) to at least one roller from among the tension rollers 220A to 220G.

An image formation region (not shown in the drawing) where at least a primary image (ink image) is formed on the surface (image formation surface) 202A of the intermediate transfer body (endless belt) 202 that faces the printing unit 210 is formed from a resin, a metal or a rubber and is impermeable to ink droplets. At least the image formation region of the intermediate transfer body 202 is configured to form a horizontal surface (flat surface) having a predetermined flatness.

A medium demonstrating a low penetration rate of the aggregation treatment liquid (a medium having a low penetration ability such that the decrease in the amount (thickness) of the aggregation treatment liquid from the moment the aggregation treatment liquid is applied till it moves directly below the printing unit 210 is not more than 10%) can be also employed for the image formation region of the intermediate transfer body 202. Thus, a medium having poor penetration ability such that the decrease in the amount (thickness) of the aggregation treatment liquid from the moment the aggregation treatment liquid is applied till it moves into a recording region directly below the printing unit 210 is not more than 1%, or an impermeable medium including a medium having a low penetration ability such that the decrease in the amount of the aggregation treatment liquid is not more than 10% can be used for the intermediate transfer body 202.

FIG. 15 shows an endless belt as a form of the intermediate transfer body 202, but the intermediate transfer body that can be employed in accordance with the present invention may also have a drum-like shape or a flat shape.

Examples of preferred materials suitable for the surface layer including the image formation surface 202A of the intermediate transfer body 202 include well-known materials such as polyimide resins, silicone resins, polyurethane resins, polyester resins, polystyrene resins, polyolefin resins, polybutadiene resins, polyamide resins, poly(vinyl chloride) resins, polyethylene resins, and fluororesins.

The surface tension of the surface layer of the intermediate transfer body 202 is preferably not less than 10 mN/m and not more than 40 mN/m. Where the surface tension of the surface layer of the intermediate transfer body 202 is higher than 40 mN/m, the difference in surface tension between the intermediate transfer body and the recording medium 204 onto which the primary image will be transferred becomes zero (or very small) and transferability of the ink aggregate is degraded. Further, where the surface tension of the surface layer of the intermediate transfer body 202 is lower than 10 mN/m, because the surface tension of the aggregation treatment liquid has to be decreased with respect to the surface tension of the surface layer of the intermediate transfer body 202 with consideration for wettability of the aggregation treatment liquid, the surface tension of the aggregation treatment liquid is difficult to decrease to less than 10 mN/m and the freedom of design (selection range) of the intermediate transfer body 202 and aggregation treatment liquid is decreased.

It is preferred that peaks and valleys corresponding to a surface roughness (Ra) of about 0.3 μm be present on the surface layer of the intermediate transfer body 202 because such peaks and valleys inhibit the movement of ink droplets and ink aggregates.

The aggregation treatment liquid application unit 206 is disposed on the upstreammost side in the conveyance direction of the intermediate transfer body (direction shown by arrow A in FIG. 15) and configured by an application roller 206A and an application liquid container 206B accommodating the aggregation treatment liquid. The application roller 206A can rotate following the movement of the intermediate transfer body 202, or the application roller 206A can be driven and rotation controlled independently. As the application roller 206A rotates, the aggregation treatment liquid accommodated in the application liquid container 206B is applied on the image formation surface 202A of the intermediate transfer body 202.

The coating thickness of the aggregation treatment liquid on the intermediate transfer body 202 is preferably set within a range of 0.5 μm to 20 μm. Where the coating thickness is less than 0.5 μm, the film easily becomes nonuniform because the continuity of the liquid film is disrupted, thereby causing problems with quality. Where the coating thickness is more than 20 μm, the amount of energy applied in the drying process is increased and surface properties are degraded.

It is preferred that the contact time of the application roller 206A and intermediate transfer body 202 be controlled in order to control the coating thickness of the aggregation treatment liquid. Where the contact time of the application roller 206A and intermediate transfer body 202 is relatively long, the coating thickness of the aggregation treatment liquid becomes relatively large, and where the contact time of the application roller 206A and intermediate transfer body 202 is relatively short, the coating thickness of the aggregation treatment liquid becomes relatively small.

A porous martial or a material having peaks and valleys on the surface is preferred for the application roller 206A. For example, a roller of a gravure roll type can be used.

FIG. 15 illustrates by way of an example a mode in which the application roller 206A is used for applying the aggregation treatment liquid, but the application mode of the aggregation treatment liquid is not limited to this example, and a variety of other systems can be used. For example, a blade application method or a deposition system using an inkjet head can be employed. In particular, in the case of an inkjet system, the aggregation treatment liquid can be accurately patterned and applied correspondingly to the recording image (image data), and the duration of heating with the heating and drying unit 208 disposed in the last stage can be shortened and the heating energy can be reduced.

The heating and drying unit 208 disposed downstream of the aggregation treatment liquid application unit 206 in the conveyance direction of the intermediate transfer body includes a heater (not shown in FIG. 15) provided on the side of the rear surface 202B of the image formation surface 202A of the intermediate transfer body 202, the heater being so configured that the aggregation treatment liquid located on the intermediate transfer body 202 is dried by blowing a hot air flow heated by the heater from the side of the rear surface 202B onto the intermediate transfer body 202 to which the aggregation treatment liquid has been applied.

The heating temperature of the heater disposed in the heating and drying unit 208 is set in accordance with the type of the aggregation treatment liquid, applied amount (thickness) of the aggregation treatment liquid, ambient temperature, etc., so that a semisolid aggregation treatment layer with a moisture content not more than 56% is formed on the intermediate transfer body 202 that has passed through the heating and drying unit 208.

For example, a semisolid aggregation treatment layer with a thickness of about 4 μm can be formed on the intermediate transfer body 202 by applying the aggregation treatment liquid to a thickness of about 10 μm on the intermediate transfer body 202 with the application roller 206A disposed in the aggregation treatment liquid application unit 206 and then hot-air drying at 70° C. with the heater of the heating and drying unit 208.

In the present embodiment, a configuration is described in which the aggregation treatment liquid is applied to the intermediate transfer body 202, the aggregation treatment liquid located on the intermediate transfer body 202 is heated and dried, and a semi-solid aggregation treatment layer is formed on the intermediate transfer body 202, but the implementation of the present invention is not limited to the example and a configuration can be also employed in which a semisolid aggregation treatment agent is directly applied to the intermediate transfer body 202.

For example, well-known powder scattering methods such as a fluid flow immersion method, an electrostatic atomizing method, a spraying method, and electrostatic dry blowing method, and a scattering method can be used to apply a semisolid aggregation treatment agent directly onto the intermediate transfer body 202. A powder can be also scattered using a container that has an opening provided with a lid that can be opened and closed and stores a powder (semisolid aggregation treatment agent) inside thereof. In this case, powder scattering can be accurately controlled by providing a control device that performs control such that the lid is opened only when a transfer body passes thereby, the powder is scattered over the transfer body, and the lid is closed and the powder is not scattered when the system is not used.

In the recording unit 210 disposed downstream of the heating and drying unit 208 in the conveyance direction of the intermediate transfer body, inkjet heads (referred to hereinbelow simply as "heads") 210C, 210M, 210Y, 210K corresponding to cyan (C), magenta (M), yellow (Y), and black (K) colors are provided from the upstream side in the order of description along the conveyance direction of the intermediate transfer body. Colored inks of respective colors are converted into droplets and deposited onto the image formation surface 202A of the intermediate transfer body 202 from the heads 210C, 210M, 210Y, 210K.

Figure 16:
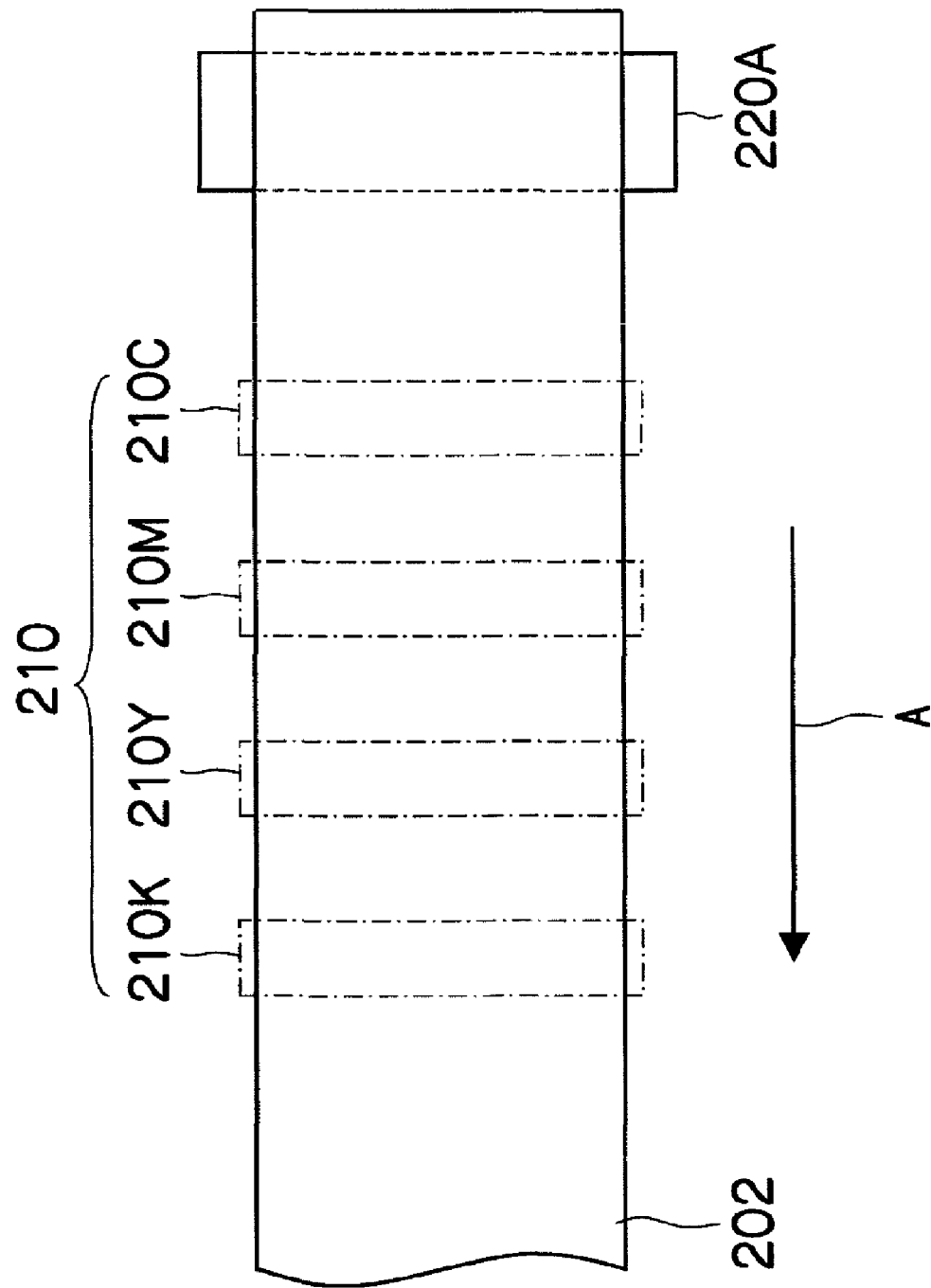
FIG. 16 is a plan view of principal component of a printing unit periphery of the inkjet recording apparatus.

As shown in FIG. 16, the heads 210C, 210M, 210Y, 210K are the full-line heads that have a length corresponding to the maximum width of the image formation region in the intermediate transfer body 202, wherein a plurality of nozzles (not shown in FIG. 16) for ink ejection are disposed along the entire width of the image formation region. The heads 210C, 210M, 210Y, 210K are fixedly disposed so as to extend in the direction perpendicular to the conveyance direction of the intermediate transfer body.

With a configuration in which a full-line head having a nozzle row that covers the entire width of the image formation region of the intermediate transfer body 202 is provided for each ink color, a primary image can be recorded in the image formation region of the intermediate transfer body 202 by performing a one-cycle operation (that is one sub-scanning) of moving the intermediate transfer body 202 and printing unit 210 relative to each other with respect to the conveyance direction (sub-scanning direction) of the intermediate transfer body 202. As a result, the printing can be performed at a higher speed and print productivity can be increased by comparison with those in the case of using a serial (shuttle) head that moves reciprocatingly in the direction (main scanning direction) perpendicular to the conveyance direction of the intermediate transfer body.

In the present embodiment, the minimum ejected amount (ejected volume) of an ink droplet ejected from each nozzle of the heads 210C, 210M, 210Y, 210K is 2 pl, and the maximum recording density (maximum dot density) is 1200 dpi in both the main scanning direction (direction perpendicular to the conveyance direction of the intermediate transfer body) and sub-scanning direction (conveyance direction of the intermediate transfer body).

Further, in the present embodiment, an example of a configuration using CMYK standard colors (four colors) is explained, but the present embodiment is not limited to specific combinations of ink colors and numbers of colors. If necessary, light inks, dark inks, and special color inks may be added. For example, a configuration additionally including an ink head ejecting a light ink such as light cyan or light magenta can be also used. The arrangement order of color heads is also not limited.

An ink storing and loading unit 222 is configured by ink tanks (not shown in FIG. 15) that store colored inks corresponding to the heads 210C, 210M, 210Y, 210K, wherein each tank communicates with a corresponding head via a required channel. The ink storing and loading unit 222 also includes a notification device (display device, alarm sound generator) such that when the residual amount of ink is small, the user is notified to this effect. In addition, the ink storing and loading unit includes a mechanism preventing the erroneous loading of colored inks.

The solvent removal unit 212 is disposed downstream of the printing unit 210 in the conveyance direction of the intermediate transfer body and is configured by a solvent absorption roller 212A. The solvent absorption roller 212A of the present example is provided in a location facing the roller 202B via the intermediate transfer body 202. The solvent absorption roller 212A is configured as roll-shaped porous body (absorbing body). In the solvent removal unit 212, the solvent absorption roller 212A is brought into contact with the liquid solvent (solvent components of ink and aggregation treatment liquid) located on the intermediate transfer body 202 and the liquid solvent is absorbed into the porous body by a capillary force of the porous body, whereby the liquid solvent is removed from the intermediate transfer body 202.

The solvent absorption roller 212A may rotate following the movement (conveyance) of the intermediate transfer body 202 or may be rotated independently. Further, a configuration is preferred in which the roller can be separated from the image formation surface 202A of the intermediate transfer body 202.

The surface energy of the surface of the solvent absorption roller 212A (the surface that comes into contact with the image formation surface 202A of the intermediate transfer body 202) is preferably less than the surface energy of the image formation surface 202A of the intermediate transfer body 202. In the present example, a member with a surface energy not more than 30 mN/m is used for the solvent absorption roller 212A.

By performing solvent removal by using the solvent absorption roller 212A satisfying the above-described surface energy condition, it is possible to absorb and remove the liquid solvent located on the intermediate transfer body 202, while preventing the coloring material from adhering to the solvent absorption roller 212A.

A system that removes the extra solvent from the intermediate transfer body 202 with an air knife and a system that evaporates and removes the solvent by heating (for example, heating with a plate-like heater) the intermediate transfer body 202 or blowing dry air thereonto may be also employed instead of the solvent absorption roller 212A. The system for solvent removal may be of any kind described by way of examples hereinabove, but a system that does not use heating is preferred.

With the system in which the surface of the intermediate transfer body 202 is heated and the system in which heat is supplied to the ink aggregate on the intermediate transfer body 202 and the solvent is evaporated, overheating of the ink aggregate can remove excess amount of the solvent, thereby making it impossible to maintain the preferred viscoelasticity of the aggregate during the transfer and degrading transferability onto the recording medium 204. Furthermore, heat generated by overheating can also adversely affect the ejection performance of heads 210C, 210M, 210Y, and 210K.

On the other hand, in the configuration in which the solvent present on the image formation surface 202A of the intermediate transfer body 202 is absorbed and removed by the solvent absorption roller 212A, even when the residual amount of the solvent on the intermediate transfer body 202 is large, a large amount of solvent still can be removed within an interval that is shorter than that in the other systems. Therefore, a large amount of solvent is (dispersion medium) is not transferred onto the recording medium 204 in the transfer unit 214 of the subsequent stage. Accordingly, even when paper is used as the recording medium 204, problems inherent to aqueous solvents, such as curling and cockling, are prevented.

Further, by removing the extra solvent from the ink aggregates by using the solvent removal unit 212, it is possible to concentrate the ink aggregates and further increase the internal aggregation force. As a result, a stronger internal aggregation force can be applied to the ink aggregates prior to the transfer performed with the transfer unit 214. Furthermore, effective concentration of the ink aggregates by solvent removal makes it possible to impart good fixing ability and gloss to the image even after the image has been transferred onto the recording medium 204.

The solvent removal unit 212 is not necessarily required to remove all the solvent present on the intermediate transfer body 202. Where the solvent is removed in excess and the ink aggregate is concentrated too much, the adhesive force of the ink aggregate to the intermediate transfer body 202 becomes too strong and an excess pressure is required for the transfer. Accordingly, it is preferred that a small amount of the solvent be caused to remain in order to maintain the viscoelasticity advantageous for transferability.

The following effect is obtained when a small amount of solvent is caused to remain on the intermediate transfer body 202. Thus, because the ink aggregate is hydrophobic and the solvent component that has poor volatility (mainly, an organic solvent such as glycerin) is hydrophilic, the ink aggregate and remaining solvent component are separated after the solvent removal is implemented, and a thin liquid layer composed of the remaining solvent component is formed between the ink aggregate and intermediate transfer body. Therefore, adhesion of the ink aggregate to the intermediate transfer body 202 is weakened and transferability can be improved.

The above-described solvent removal can be controlled by varying the pressure by which the solvent absorption roller 212A is pressed against the intermediate transfer body 202. When the solvent removal amount is relatively large, the pressure by which the solvent absorption roller 212A is pressed against the intermediate transfer body 202 may be increased, and when the solvent removal amount is relatively small, the pressure by which the solvent absorption roller 212A is pressed against the intermediate transfer body 202 may be decreased.

Further, a configuration can be also used in which a plurality of solvent absorption rollers with different absorption properties are provided and the solvent absorption roller to be used is selectively switched in accordance with the solvent removal amount.

In the inkjet recording apparatus 200 shown in FIG. 15, a preheating unit 224 is provided between the solvent removal unit 212 and transfer unit 214. The preheating unit 224 is configured by a heater (not shown in FIG. 15) provided on the side of the rear surface 202B of the image formation surface 202A of the intermediate transfer body 202 and is designed to preheat the intermediate transfer body 202 on which the primary image (ink image) has been formed with the heater from the side of the rear surface 202B. A plate-shaped heater is preferably used in the preheating unit 224 of the present example. Furthermore, in the present example a configuration is described in which a heater is disposed on the outside of the intermediate transfer body 202, but a configuration in which a heater is incorporated in the intermediate transfer body 202 can be also used.

The heating temperature of the heater disposed in the preheating unit 224 is within a range of 40° C. to 80° C. and set lower than the heating temperature during the transfer. By preheating the image formation region of the intermediate transfer body 202, it is possible to set the heating temperature of the transfer unit 214 lower than in the case in which no preheating is performed. Furthermore, the transfer time in the transfer unit 214 can be shortened.

In the preheating unit 224, the heating temperature is preferably so set that the temperature of the image formation surface 202A of the intermediate transfer body 202 (the temperature of the region where the image has been formed) exceeds the glass transition temperature Tg of polymer microparticles contained in the ink.

The transfer unit 214, which is disposed downstream of the preheating unit 224 in the conveyance direction of the intermediate transfer body includes a transfer heating roller 214A having a heater (not shown in FIG. 15) and a heating opposite roller 214B that is disposed opposite the transfer heating roller and serves for heating and pressure nipping. The intermediate transfer body 202 and recording medium 204 are sandwiched between these rollers 214A, 214B and pressurized under a predetermined pressure (nip pressure), while being heated at a predetermined temperature, whereby the primary image formed on the intermediate transfer body 202 is transferred onto the recording medium 204.

The heating temperature (transfer temperature) in the transfer unit 214 is preferably 80° C. to 170° C. From the standpoint of transferability, it is even more preferred that this temperature be 100° C. to 150° C. Where the heating temperature in the transfer unit 214 is higher than 170° C., a problem is associated with the deformation of the intermediate transfer body 202. On the other hand, a problem encountered when the heating temperature in the transfer unit is lower than 80° C. is that transferability is degraded.

The nip pressure in the transfer unit 214 is preferably 1.5 MPa to 2.0 MPa. For example, a mechanism (drive device) that moves the transfer heating roller 214A in the vertical direction (direction represented by a reference symbol C in the drawing) in FIG. 15 can be considered for adjusting the nip pressure during the transfer in the transfer unit 214. Thus, where the transfer heating roller 214A is moved in the direction of withdrawing from the heating opposite roller 214B, the nip pressure decreases, and when the transfer heating roller is moved in the direction of approaching the heating opposite roller 214B, the nip pressure increases.

A configuration including a magazine of rolled paper (paper for continuous feed) and a configuration in which paper is supplied from a cassette located with a stack of cut paper instead of the roll paper magazine or together therewith can be used as a configuration of a paper supply unit 226 that supplies the recording medium 204 to the transfer unit 214. In the case of apparatus configuration using rolled paper, a cutter for cutting is provided and the rolled paper is cut to the desired size by the cutter. A plurality of magazines or cassettes with paper of different width or type may be provided together.

When a configuration is employed that can use recording media of a plurality of types, it is preferred that an information recording body such as a bar code or wireless tag having the medium type information recorded therein be attached to the magazine and the information recorded in this information recording body be read out with a predetermined reading device, thereby making it possible to identify automatically the type of the recording medium used (medium type) and perform ink ejection control so as to realize the adequate ink ejection in accordance with the medium type.

The recording medium 204 employed in this example can be identical to that described in the first embodiment.

A configuration in which a cooling unit 228 is disposed downstream of the transfer unit 214 in the conveyance direction of the intermediate transfer body is preferred. The cooling unit 228 cools the intermediate transfer body 202 and recording medium 204 that have passed through the transfer unit 214 and stick together. It is preferred that the cooling unit 228 have a configuration in which cold air is blown with a cooling fan or the like and that the cooling temperature can be regulated in the unit. The cooling unit 228 shown in the present example has a configuration that guarantees the movement time (cooling time) of the intermediate transfer body 202 necessary to cool it to the desired temperature. Temperature defects caused by uneven temperature and the like can be prevented and stable image transfer (peeling) can be ensured by peeling the recording medium 204 from the intermediate transfer body 202 after cooling.

A peeling unit 230 is disposed downstream of the cooling unit 228 in the conveyance direction of the intermediate transfer body. The peeling unit 230 is configured to peel off the recording medium 204 from the intermediate transfer body 202 owing to the rigidity (buckling strength) of the recording medium 204 itself, based on the winding curvature of a peeling roller 220E of the intermediate transfer body 202. The peeling unit 230 may also employ a device for enhancing the peeling, such as peeling hooks.

A fixing unit 232 is disposed downstream of the peeling unit 230 in the conveyance direction of the recording medium (direction shown by arrow B in FIG. 15). The fixing unit 232 includes a heating roller pair 232A that can be regulated to a temperature within a range of 100° C. to 180° C., and the image transferred onto the recording medium 204 is fixed, while the recording medium 204 inserted and squeezed between the heating roller pair 232A is being heated and pressurized.

The heating temperature of the fixing unit 232 is preferably set in accordance with the glass transition temperature of polymer microparticles contained in the ink. In the present example, the heating temperature of the fixing unit 232 is set to 130° C. Further, a configuration in which the nip pressure of the fixing unit 232 is within a range of 2.5 MPa to 3.0 MPa is preferred. Further, where the operations of transferring and fixing the image can be performed in the transfer unit 214, a configuration in which the fixing unit 232 is omitted can be employed.

A cleaning unit 234 is disposed downstream of the peeling unit 230 in the conveyance direction of the intermediate transfer body. The cleaning unit 234 is a device that cleans the intermediate transfer body 202 after the image has been transferred onto the recording medium 204. The cleaning unit is configured by a blade (not shown in the drawing) that wipes out and removes the transfer residue (ink aggregates, etc.), while being pressed against the image formation surface 202A of the intermediate transfer body 202 and a recovery unit (not shown in the drawing) that recovers the removed transfer residue.

The configuration of the cleaning device that removes the transfer residue from the intermediate transfer body 202 is not limited to the above-described example and can be of a system in which a brush roll and a water-absorbing roll are nipped, a an air blow system that blows clean air, a pressure-sensitive adhesive roll system, and a combination of these systems. When a system in which a wiping roll is nipped is used, a large wiping effect can be obtained by changing the linear speed of the belt and linear speed of rollers.

Heads disposed in the printing unit 210 are identical to those described hereinabove in the first embodiment and the explanation thereof is omitted.

Third Embodiment

The third embodiment of the image forming apparatus in accordance with the present invention has a configuration such that in an intermediate transfer system in which an image is temporarily formed by a two-liquid aggregation method on an intermediate transfer body and the image is then transferred onto a recording medium, one treatment liquid including a component causing the coloring material of the ink to aggregate and substantially colorless microparticles is applied to the intermediate transfer body.

The substantially colorless microparticles used in accordance with the present invention may be any microparticles, provided that they are substantially colorless. The expression "substantially colorless" as used herein refers to a state in which when the microparticles in accordance with the present invention are applied at 0.1 g/m$^2$, the light absorption density in a visible range is not more than 0.1.

Specific examples of substantially colorless microparticles include microparticles of polymers such as polyolefins, polyacrylates, polyesters, polystyrene, polyurethanes, and polyisocyanates, microparticles of low-molecular organic compound microparticles such as paraffins, esters (carnauba wax, montanic acid ester wax), stearic acid, stearic acid amides, ethylene bis-stearic acid amides, and zinc stearate, silicone oil microparticles, and colorless inorganic microparticles ($TiO_2$, $CaCO_3$, ZnO, $SiO_2$, $Al_2O_3$, etc.). Further, microcapsulated microparticles in which an organic compound is enclosed in a polymer thin film such as a polyurethane film can be also used.

Among them, from the standpoint of melting or softening during heating and fixing and ability to demonstrate image gloss, microparticles of organic compounds are preferred. Furthermore, from the standpoint of abrasion resistance after the fixing, polymer microparticles are preferred. From the standpoint of the necessity to demonstrate good peeling ability when the image is transferred, it is preferred that polyolefin microparticles with a low surface energy be used.

From the standpoint of obtaining a low softening point, a polymer with a low molecular weight is preferred, and it is even more preferred that the molecular weight be 1000 to 100,000, more preferably 1000 to 5000.

The treatment liquid in accordance with the present invention can include a surfactant.

Examples of suitable surfactants of a hydrocarbon system include anionic surfactants such as fatty acid salts, alkylsulfuric acid esters and salts, alkylbenzenesulfonic acid salts, alkylnaphthalenesulfonic acid salts, dialkylsulfosuccinic acid salts, alkylphosphoric acid esters and salts, naphthalenesulfonic acid formalin condensate, and polyoxyethylene alkylsulfuric acid esters and salts, and nonionic surfactants such as polyoxyethyelene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymer. It is preferred that SURFYNOLS (manufactured by Air Products & Chemicals Co., Ltd.), which is an, acetylene-type polyoxyethylene oxide surfactant, be used. Amineoxide-type amphoteric surfactants such as N,N-dimethyl-N-alkylamineoxide is also a preferred surfactant.

A surfactant described in Japanese Patent Application Publication No. 59-157636, pages 37 to 38 and Research Disclosure No. 308119 (1989) can be also used. Fluorine-containing (fluorinated alkyl system) and silicone-type surfactants such as described in Japanese Patent Application Publication Nos. 2003-322926, 2004-325707, and 2004-309806 can be also used. These surface tension adjusting agents can be also used as an antifoaming agent. Chelating agents represented by fluorine-containing or silicone-type compounds and EDTA can be also used.

These agents are effective in reducing surface tension and increasing wettability on the image formation body.

The surface tension of the treatment liquid in accordance with the present invention is preferably 10 mN/m to 50 mN/m. From the standpoint of improving penetration into the permeable recording medium when direct recording is performed and from the standpoint of improving the wettability on the intermediate transfer body and also size reduction ability and ejection ability of droplets when recording is performed by an intermediate transfer system, it is even more preferred that the surface tension be 15 mN/m to 45 mN/m.

The viscosity of the treatment liquid in accordance with the present invention is preferably 1.0 cP to 20.0 cP.

If necessary, a pH buffer agent, an antioxidant, an antimold agent, a viscosity adjusting agent, an electrically conductive agent, an ultraviolet agent, and absorbent, etc. can be also added.

Any apparatus in which a treatment liquid (aggregation treatment liquid) including a component that causes a coloring material of the ink to aggregate and substantially colorless microparticles is used to form an ink image composed of ink aggregates (coloring material aggregates) on an intermediate transfer body and the ink image formed on the intermediate transfer body is transferred onto a recording medium may be used as an inkjet recording apparatus 400 employed in the third embodiment of the present invention.

Figure 17:
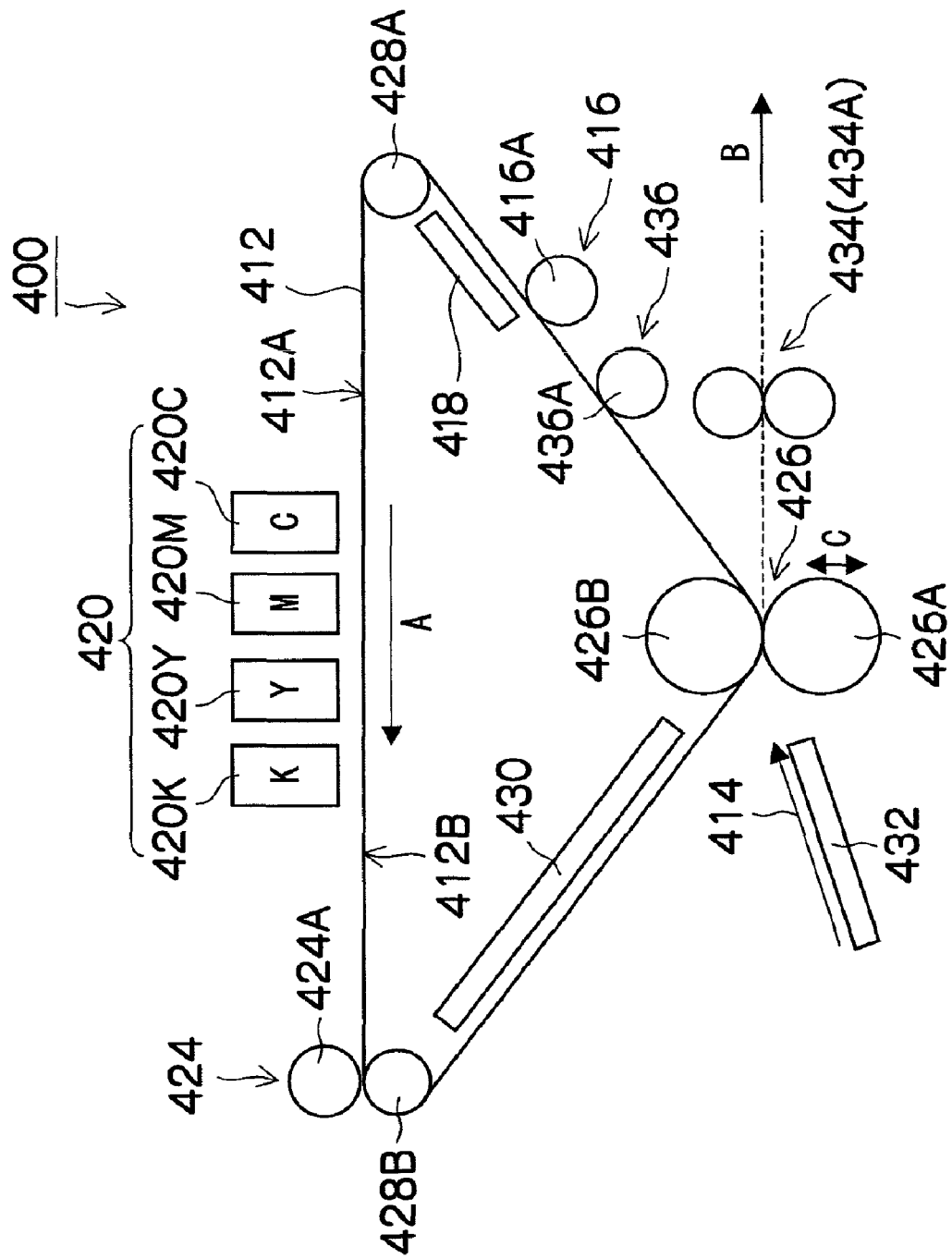
FIG. 17 is a schematic structural diagram illustrating the inkjet printing apparatus of a third embodiment of the present invention.

FIG. 17 illustrates a preferred example of the inkjet recording apparatus 400 of the third embodiment of the present invention. Basically, this apparatus is identical to the inkjet recording apparatus 200 of an intermediate transfer system shown in FIG. 15.

As shown in FIG. 17, the inkjet recording apparatus 400 mainly includes an aggregation treatment liquid application unit 416 that applies an aggregation treatment liquid onto an intermediate transfer body 412, a heating and drying unit 418 that heats and dries the aggregation treatment liquid that has been applied on the intermediate transfer body 412, a printing unit (ink deposition unit) 420 that converts inks of each color of cyan (C), magenta (M), yellow (Y), and black (K) into droplets and deposits them on the intermediate transfer body 412, a solvent removal unit 424 that removes a liquid solvent (liquid component of the ink and aggregation treatment liquid) located on the intermediate transfer body 412, and a transfer unit 426 that transfers the ink image formed on the intermediate transfer body 412 onto the recording medium 414.

An endless belt is used for the intermediate transfer body 412 shown in FIG. 17. The intermediate transfer body (endless belt) 412 has a structure wound about a plurality of tension rollers (in FIG. 17, two tension rollers 428A, 428B and a heating opposite roller 426B for transferring and heating are shown), and the intermediate transfer body 412 is driven in the counterclockwise direction in FIG. 17 (the direction shown by arrow A in FIG. 17; referred to hereinbelow as "conveyance direction of the intermediate transfer body") by the transmission of power from a motor (not shown in FIG. 17) to at least one of these rollers.

An image formation region (not shown in the drawing) where at least a primary image (ink image) is formed on the surface (image formation surface) 412A of the intermediate transfer body (endless belt) 412 that faces the printing unit 420 is formed from a resin, a metal or a rubber and is impermeable to ink droplets. At least the image formation region of the intermediate transfer body 412 is configured to form a horizontal surface (flat surface) having a predetermined flatness.

A medium demonstrating a low penetration rate of the aggregation treatment liquid (a medium having a low penetration ability such that the decrease in the amount (thickness) of the aggregation treatment liquid from the moment the aggregation treatment liquid is applied till it moves directly below the printing unit 420 is not more than 10%) can be also employed for the image formation region of the intermediate transfer body 412. Thus, a medium having poor penetration ability such that the decrease in the amount (thickness) of the aggregation treatment liquid from the moment the aggregation treatment liquid is applied till it moves into a recording region directly below the printing unit 420 is not more than 1%, or an impermeable medium including a medium having a low penetration ability such that the decrease in the amount of the aggregation treatment liquid is not more than 10% can be used for the intermediate transfer body 412.

FIG. 17 shows an endless belt as a form of the intermediate transfer body 412, but the intermediate transfer body that can be employed in accordance with the present invention may also have a drum-like shape or a flat shape.

The preferred materials suitable for the surface layer including the image formation surface 412A of the intermediate transfer body 412 and the preferred surface tension of the intermediate transfer body 412 are identical to those of the inkjet recording apparatus explained with reference to FIG. 15.

The surface tension of the surface layer of the intermediate transfer body 412 is preferably not less than 10 mN/m and not more than 40 mN/m. Where the surface tension of the surface layer of the intermediate transfer body 412 is higher than 40 mN/m, the difference in surface tension between the intermediate transfer body and the recording medium 414 onto which the primary image will be transferred becomes zero (or very small) and transferability of the ink aggregate is degraded. Further, where the surface tension of the surface layer of the intermediate transfer body 412 is lower than 10 mN/m, because the surface tension of the aggregation treatment liquid has to be decreased with respect to the surface tension of the surface layer of the intermediate transfer body 412 with consideration for wettability of the aggregation treatment liquid, the surface tension of the aggregation treatment liquid is difficult to decrease to less than 10 mN/m and the freedom of design (selection range) of the intermediate transfer body 412 and aggregation treatment liquid is decreased.

It is preferred that the surface layer of the intermediate transfer body 412 be configured by a smooth surface with a surface roughness (Ra) not more than 1.0 µm. Where the surface roughness (Ra) of the surface layer of the intermediate transfer body 412 is more than 1.0 µm, the contact surface area of the ink layer and intermediate transfer body 412 increases and transferability onto the recording medium 414 decreases. In accordance with the present invention, as described hereinabove, a particulate layer composed of substantially colorless microparticles is formed on the surface of the intermediate transfer body 412, without forming peaks and valleys directly on the surface of the intermediate transfer body 412. Therefore, the image can be prevented from shrinking by the anchor effect of the particulate layer and transferability can be improved.

The aggregation treatment liquid application unit 416 that applies the aggregation treatment liquid onto the intermediate transfer body 412 is disposed on the upstreammost side in the conveyance direction of the intermediate transfer body (direction shown by arrow A in FIG. 17). The aggregation treatment liquid application unit 416 is configured by an application roller 416A and an application liquid container (not shown in the drawing) accommodating the aggregation treatment liquid. The application roller 416A can rotate following the movement of the intermediate transfer body 412, or the application roller 416A can be driven and rotation controlled independently. As the application roller 416A rotates, the aggregation treatment liquid accommodated in the application liquid container is applied on the image formation surface 412A of the intermediate transfer body 412.

The coating thickness of the aggregation treatment liquid on the intermediate transfer body 412 is preferably set within a range of 0.5 µm to 20 µm. In the present example, the film is uniformly applied at a thickness of about 4 µm. Where the coating thickness is less than 0.5 µm, the film easily becomes nonuniform because the continuity of the liquid film is disrupted, thereby causing problems with quality. Where the coating thickness is more than 20 µm, the amount of energy applied in the drying process is increased and surface properties are degraded.

It is preferred that the contact time of the application roller 416A and intermediate transfer body 412 be controlled in order to control the coating thickness of the aggregation treatment liquid. Where the contact time of the application roller 416A and intermediate transfer body 412 is relatively long, the coating thickness of the aggregation treatment liquid becomes relatively large, and where the contact time of the application roller 416A and intermediate transfer body 412 is relatively short, the coating thickness of the aggregation treatment liquid becomes relatively small.

A porous martial or a material having peaks and valleys on the surface is preferred for the application roller 416A. For example, a roller of a gravure roll type can be used.

FIG. 17 illustrates by way of an example a mode in which the application roller 416A is used for applying the aggregation treatment liquid, but the application mode of the aggregation treatment liquid is not limited to this example, and a variety of other systems can be used. For example, a blade application method or a deposition system using an inkjet head can be employed. In particular, in the case of an inkjet system, the aggregation treatment liquid can be accurately patterned and applied in accordance with the recording image (image data), and the duration of heating with the heating and drying unit 418 disposed in the last stage can be shortened and the heating energy can be reduced.

The heating and drying unit 418 that performs drying of the aggregation treatment liquid applied on the intermediate transfer body 412 is disposed downstream of the aggregation treatment liquid application unit 416 in the conveyance direction of the intermediate transfer body. The heating and drying unit 418 includes a heater (not shown in FIG. 17) provided on the side of the rear surface 412B of the image formation surface 412A of the intermediate transfer body 412, the heater being so configured that the aggregation treatment liquid located on the intermediate transfer body 412 is dried by blowing a hot air flow heated by the heater from the side of the rear surface 412B onto the intermediate transfer body 412 to which the aggregation treatment liquid has been applied. The heating temperature of the heater disposed in the heating and drying unit 418 is set in accordance with the type of the aggregation treatment liquid, applied amount (thickness) of the aggregation treatment liquid, ambient temperature, etc. In the present example, hot-air drying is performed at 70° C.

As a result of drying with the heating and drying unit 418, a thin layer composed of the aggregation treatment agent and particles (substantially colorless microparticles) preventing the image from shrinking is formed on the intermediate transfer body 412. It is not necessary that the entire moisture of the treatment liquid be evaporated in the drying process, and the treatment liquid may be dried to a viscosity increase level such that the particulate layer is prevented from flowing.

In the recording unit 420 disposed downstream of the heating and drying unit 418 in the conveyance direction of the intermediate transfer body, inkjet heads (referred to hereinbelow simply as "heads") 420C, 420M, 420Y, 420K corresponding to cyan (C), magenta (M), yellow (Y), and black (K) colors are provided from the upstream side in the order of description along the conveyance direction of the intermediate transfer body. Colored inks of respective colors are converted into droplets and deposited onto the image formation surface 412A of the intermediate transfer body 412 from the heads 420C, 420M, 420Y, 420K.

The solvent removal unit 424 is disposed downstream of the printing unit 420 in the conveyance direction of the intermediate transfer body. The solvent removal unit 424 is configured by a solvent absorption roller 424A, brought into contact with the liquid solvent (solvent components of ink and aggregation treatment liquid) located on the intermediate transfer body 412, and the liquid solvent is absorbed into the porous body by a capillary force of the porous body, whereby the liquid solvent is removed from the intermediate transfer body 412.

The solvent absorption roller 424A may rotate following the movement (conveyance) of the intermediate transfer body 412 or may be rotated independently. Further, a configuration is preferred in which the roller can be separated from the image formation surface 412A of the intermediate transfer body 412.

The surface energy of the surface of the solvent absorption roller 424A (the surface that comes into contact with the image formation surface 412A of the intermediate transfer body 412) is preferably less than the surface energy of the image formation surface 412A of the intermediate transfer body 412. In the present example, a member with a surface energy not more than 30 mN/m is used for the solvent absorption roller 424A.

By performing solvent removal by using the solvent absorption roller 424A satisfying the above-described surface energy condition, it is possible to absorb and remove the liquid solvent located on the intermediate transfer body 412, while preventing the coloring material from adhering to the solvent absorption roller 424A.

A system that removes the extra solvent from the intermediate transfer body 412 with an air knife and a system that evaporates and removes the solvent by heating (for example, heating with a plate-like heater) the intermediate transfer body 412 or blowing dry air thereonto may be also employed instead of the solvent absorption roller 424A. The system for solvent removal may be of any kind described by way of examples hereinabove, but a system that does not use heating is preferred.

With the system in which the surface of the intermediate transfer body 412 is heated and the system in which heat is supplied to the ink aggregate on the intermediate transfer body 412 and the solvent is evaporated, overheating of the ink aggregate can remove excess amount of the solvent, thereby making it impossible to maintain the preferred viscoelasticity of the aggregate during the transfer and degrading transferability onto the recording medium 414. Furthermore, heat generated by overheating can also adversely affect the ejection performance of heads 420C, 420M, 420Y, and 420K.

On the other hand, in the configuration in which the solvent present on the image formation surface 412A of the intermediate transfer body 412 is absorbed and removed by the solvent absorption roller 424A, even when the residual amount of the solvent on the intermediate transfer body 412 is large, a large amount of solvent still can be removed within an interval that is shorter than that in the other systems. Therefore, a large amount of solvent (dispersion medium) is not transferred onto the recording medium 414 in the transfer unit 426 of the subsequent stage. Accordingly, even when paper is used as the recording medium 414, problems inherent to aqueous solvents, such as curling and cockling, are prevented.

Further, by removing the extra solvent from the ink aggregates by using the solvent removal unit 424, it is possible to concentrate the ink aggregates and further increase the internal aggregation force. As a result, a stronger internal aggregation force can be applied to the ink aggregates prior to the transfer performed with the transfer unit 426. Furthermore, effective concentration of the ink aggregates by solvent removal makes it possible to impart good fixing ability and gloss to the image even after the image has been transferred onto the recording medium 414.

The solvent removal unit 424 is not necessarily required to remove all the solvent present on the intermediate transfer body 412. Where the solvent is removed in excess and the ink aggregate is concentrated too much, the adhesive force of the ink aggregate to the intermediate transfer body 412 becomes too strong and an excess pressure is required for the transfer. Accordingly, it is preferred that a small amount of the solvent be caused to remain in order to maintain the viscoelasticity advantageous for transferability.

The following effect is obtained when a small amount of solvent is caused to remain on the intermediate transfer body 412. Thus, because the ink aggregate is hydrophobic and the solvent component that has poor volatility (mainly, an organic solvent such as glycerin) is hydrophilic, the ink aggregate and remaining solvent component are separated after the solvent removal is implemented, and a thin liquid layer composed of the remaining solvent component is formed between the ink aggregate and intermediate transfer body 412. Therefore, adhesion of the ink aggregate to the intermediate transfer body 412 is weakened and transferability can be improved.

The above-described solvent removal can be controlled by varying the pressure by which the solvent absorption roller 424A is pressed against the intermediate transfer body 412. When the solvent removal amount is relatively large, the pressure by which the solvent absorption roller 424A is pressed against the intermediate transfer body 412 may be increased, and when the solvent removal amount is relatively small, the pressure by which the solvent absorption roller 424A is pressed against the intermediate transfer body 412 may be decreased.

Further, a configuration can be also used in which a plurality of solvent absorption rollers with different absorption properties are provided and the solvent absorption roller to be used is selectively switched in accordance with the solvent removal amount.

In the inkjet recording apparatus 400 shown in FIG. 17, a preheating unit 430 is provided between the solvent removal unit 424 and transfer unit 426. The preheating unit 430 is configured by a heater (not shown in FIG. 17) provided on the side of the rear surface 412B of the image formation surface 412A of the intermediate transfer body 412 and is designed to preheat the intermediate transfer body 412 on which the primary image (ink image) has been formed with the heater from the side of the rear surface 412B. A plate-shaped heater is preferably used in the preheating unit 430 of the present example. Furthermore, in the present example a configuration is described in which a heater is disposed on the outside of the intermediate transfer body 412, but a configuration in which a heater is incorporated in the intermediate transfer body 412 can be also used.

The heating temperature (preheating temperature) of the preheating unit 430 is preferably set lower than the heating temperature (transfer temperature) during the transfer. In the present example, the heating temperature is set to 90° C. By preheating the image formation region of the intermediate transfer body 412, it is possible to set the heating temperature of the transfer unit 426 lower than in the case in which no preheating is performed. Furthermore, the transfer time in the transfer unit 426 can be shortened.

In the preheating unit 430, the heating temperature is preferably so set that the temperature of the image formation surface 412A of the intermediate transfer body 412 (the temperature of the region where the image has been formed) exceeds the glass transition temperature Tg of polymer microparticles contained in the ink.

The transfer unit 426 is disposed downstream of the preheating unit 430 in the conveyance direction of the intermediate transfer body. The transfer unit 426 includes a transfer heating roller 426A having a heater (not shown in FIG. 17) and a heating opposite roller 426B that is disposed opposite the transfer heating roller and serves for heating and pressure nipping. The intermediate transfer body 412 and recording medium 414 are sandwiched between these rollers 426A, 426B and pressurized under a predetermined pressure (nip pressure), while being heated at a predetermined temperature, whereby the primary image formed on the intermediate transfer body 412 is transferred onto the recording medium 414.

The heating temperature (transfer temperature) in the transfer unit 426 is preferably 80° C. to 170° C. From the standpoint of transferability, it is even more preferred that this temperature be 100° C. to 150° C. In the present example, the heating temperature (transfer temperature) is set to 120° C. Where the heating temperature in the transfer unit 426 is higher than 170° C., a problem is associated with the deformation of the intermediate transfer body 412. On the other hand, a problem encountered when the heating temperature in the transfer unit is lower than 80° C. is that transferability is degraded.

The nip pressure in the transfer unit 426 is preferably 1.5 MPa to 2.0 MPa. For example, a mechanism (drive device) that moves the transfer heating roller 426A in the vertical direction (direction represented by a reference symbol C in the drawing) in FIG. 17 can be considered for adjusting the nip pressure during the transfer in the transfer unit 426. Thus, where the transfer heating roller 426A is moved in the direction of withdrawing from the heating opposite roller 426B, the nip pressure decreases, and when the transfer heating roller is moved in the direction of approaching the heating opposite roller 426B, the nip pressure increases.

A configuration including a magazine of rolled paper (paper for continuous feed) and a configuration in which paper is supplied from a cassette located with a stack of cut paper instead of the roll paper magazine or together therewith can be used as a configuration of a paper supply unit 432 that supplies the recording medium 414 to the transfer unit 426. In the case of apparatus configuration using rolled paper, a cutter for cutting is provided and the rolled paper is cut to the desired size by the cutter. A plurality of magazines or cassettes with paper of different width or type may be provided together.

When a configuration is employed that can use recording media of a plurality of types, it is preferred that an information recording body such as a bar code or wireless tag having the medium type information recorded therein be attached to the magazine and the information recorded in this information recording body be read out with a predetermined reading device, thereby making it possible to identify automatically the type of the recording medium used (medium type) and perform ink ejection control so as to realize the adequate ink ejection in accordance with the medium type.

Specific examples of the recording medium 414 employed in this example can be identical to those described in reference to the inkjet recording apparatus of an intermediate transfer system that is shown in FIG. 15.

In the present embodiment, the recording medium 414 passing between the rollers 426A, 426B of the transfer unit 426 is peeled off from the intermediate transfer body 412, but a configuration can be also employed in which a certain interval is provided after the transfer is performed onto the recording medium 414 and before the recording medium 414 is peeled off and intermediate transfer body 412 and recording medium 414 are cooled, in a state in which they stick together after passing through the transfer unit 426, with a cooling fan or a cooling member. It is more preferred that the cooling temperature can be adjusted. By peeling off the recording medium 414 from the intermediate transfer body 412 after cooling, it is possible to prevent transfer defects caused by uneven temperature and enable stable image transfer (peeling).

A fixing unit 434 is disposed downstream of the transfer unit 426 in the conveyance direction of the recording medium (direction shown by arrow B in FIG. 17). The fixing unit 434 includes a heating roller pair 434A that can be regulated to a temperature within a range of 100° C. to 180° C., and the image transferred onto the recording medium 414 is fixed, while the recording medium 414 inserted and squeezed between the heating roller pair 434A is being heated and pressurized.

The heating temperature (fixing temperature) of the fixing unit 434 is preferably set correspondingly, for example, to the glass transition temperature of polymer microparticles contained in the ink. In the present example, the heating temperature (fixing temperature) is set to 130° C. Further, a configuration in which the nip pressure of the fixing unit 434 is within a range of 2.5 MPa to 3.0 MPa is preferred. Further, where the operations of transferring and fixing the image can be performed in the transfer unit 426, a configuration in which the fixing unit 434 is omitted can be employed.

A cleaning unit 436 is disposed downstream of the peeling unit 426 in the conveyance direction of the intermediate transfer body. The cleaning unit 436 is a device that cleans the intermediate transfer body 412 after the image has been transferred onto the recording medium 414. The cleaning unit is configured by a blade (not shown in the drawing) that wipes out and removes the transfer residue (ink aggregates, etc.), while being pressed against the image formation surface 412A of the intermediate transfer body 412 and a recovery unit (not shown in the drawing) that recovers the removed transfer residue.

The configuration of the cleaning device that removes the transfer residue from the intermediate transfer body 412 is not limited to the above-described example and can be of a system in which a brush roll and a water-absorbing roll are nipped, an air blow system that blows clean air, a pressure-sensitive adhesive roll system, and a combination of these systems. When a system in which a wiping roll is nipped is used, a large wiping effect can be obtained by changing the linear speed of the belt and linear speed of rollers.

As shown in FIG. 17, while the intermediate transfer body 412 is conveyed in the conveyance direction of the intermediate transfer body (direction shown by arrow A in FIG. 17), first, the aggregation treatment liquid is applied on the intermediate transfer body 412 by the application roller 416A of the aggregation treatment liquid application unit 416 (aggregation treatment liquid application step). Then, drying of the aggregation treatment liquid on the intermediate transfer body 412 is performed by the heating and drying unit 418, and a solid or high-viscosity liquid-like thin layer (aggregation treatment agent layer, particulate layer) including the aggregation treatment agent and particles (substantially colorless microparticles) is formed on the intermediate transfer body 412 (aggregation treatment liquid drying step). The process of forming the thin layer on the intermediate transfer body 412 will be described below.

After the solid or high-viscosity liquid-like thin layer has been formed on the intermediate transfer body 412, ink droplets of various colors are ejected by the heads 420C, 420M, 420Y, 420K of the printing unit 420 (ink droplet ejection step). When the ink droplets land on the intermediate transfer body 412 on which the thin layer has been formed, an aggregation reaction of the coloring material contained in the ink droplets starts immediately and ink aggregates (coloring material aggregates) spread to a predetermined size are formed on the intermediate transfer body 412. In this case, image shrinkage in the course of the ink aggregation reaction is prevented by the anchor effect produced by the particulate layer. Image degradation caused by the movement of the coloring material is also prevented.

The liquid solvent (solvent component of the ink and aggregation treatment liquid) located on the intermediate transfer body 412 is then absorbed and removed by the solvent absorption roller 424A of the solvent removal unit 424 (solvent removal step). A sufficient adhesion force can be obtained between the dots composed of ink aggregates (coloring material aggregates) and the particulate layer formed on the surface of the intermediate transfer body 412. As a result, the coloring material can be prevented from adhering to the solvent removal roller 424A.

An ink image composed of ink aggregates is thus formed on the intermediate transfer body 412, while the image shrinkage and movement or adhesion of the coloring material are being prevented. Then, the ink image located on the intermediate transfer body 412 is heated to the predetermined temperature by the preheating unit 430 (preheating step), and the ink image formed on the intermediate transfer body 412 is transferred onto the recording medium 414 by the transfer unit 426 (transfer step). In this case, the contact surface area of the intermediate transfer body 412 and ink image (ink layer) is reduced by the solid or high-viscosity liquid-like thin layer (particulate layer) formed on the intermediate transfer body 412 and transferability onto the recording medium 414 is increased.

After the transfer, the recording medium 414 peeled off from the intermediate transfer body 412 is heated and pressurized by the heating roller pair 434A of the fixing unit 434, whereby the transferred ink image is fixed (fixing step).

On the other hand, after the transfer, the intermediate transfer body 412 from which the recording medium 414 has been peeled off is treated in the cleaning unit 436 to remove the residues remaining thereon after the transfer (cleaning step).

The above-described steps are then repeated in the order of description.

A process of forming the solid or high-viscosity liquid-like thin layer (aggregation treatment agent layer, particulate layer) on the intermediate transfer body 412 will be explained below.

Figure 18A:
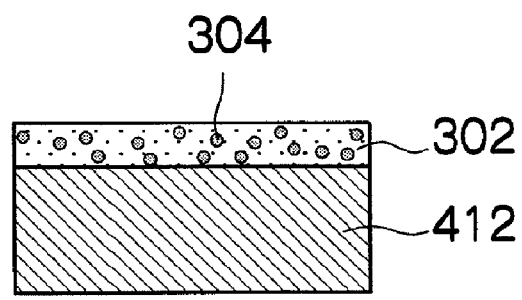
FIGS. 18A to 18D are schematic diagrams illustrating the behavior of ink droplets during landing on the intermediate transfer body.
Figure 18B:
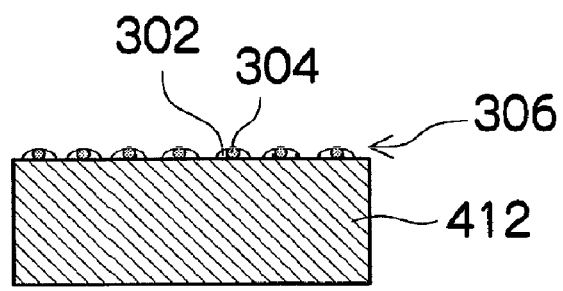
Figure 18C:
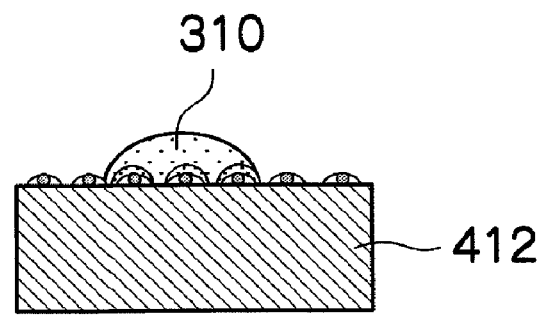
Figure 18D:
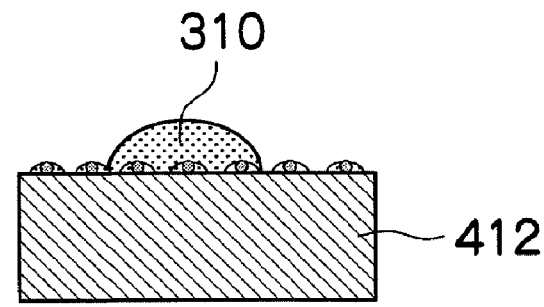

FIGS. 18A to 18D are schematic diagrams illustrating the behavior of ink droplets (dots in accordance with the present invention when they land on the intermediate transfer body (in comparison with FIGS. 41A to 41D in the related art). FIG. 18A shows a state in which an aggregation treatment agent 302 of a predetermined thickness is applied to the intermediate transfer body 412. This is a state in which the substantially colorless microparticles 304 are dispersed in the aggregation treatment agent 302 applied to the intermediate transfer body 412 and the agent has flowability. FIG. 18B illustrates a state after the drying step has been implemented. In the drying step, moisture contained in the aggregation treatment agent 302 is evaporated whereby a particulate layer (peak-valley layer) composed of microparticles 304 is formed on the intermediate transfer body 412. The aggregation treatment agent 302 that has melted in the drying process is localized around the microparticles 304 by the surface tension. Where the drying process ends and the moisture is evaporated, a solid or high-viscosity liquid-like thin layer (aggregation treatment agent layer, particulate layer) 306 composed of the aggregation treatment agent and particles (fine particles 304) is formed. FIG. 18C shows a state immediately after the ink droplets 310 have landed on the intermediate transfer body 412 where the high-viscosity liquid-like thin layer 306 has been formed. Because the aggregation treatment agent 302 is localized close to the microparticles 304, the aggregation reaction of ink droplets 310 advances from a zone close to the microparticles 304 and the viscosity of ink droplets to the microparticles 304 and the viscosity of ink droplets increases. FIG. 18D shows a state in which the diffusion of the aggregation treatment agent 302 has advanced, the aggregation took place in the entire ink droplet 310 (entire dot), and the viscosity of the ink droplet has increased. Due to such local advancement of aggregation, the adhesion to the base material (intermediate transfer body 412) increases, and because of the anchor effect produced by the thin layer (particulate layer) 306, the dot composed of the ink aggregate shows no shrinkage.

Figure 19A:
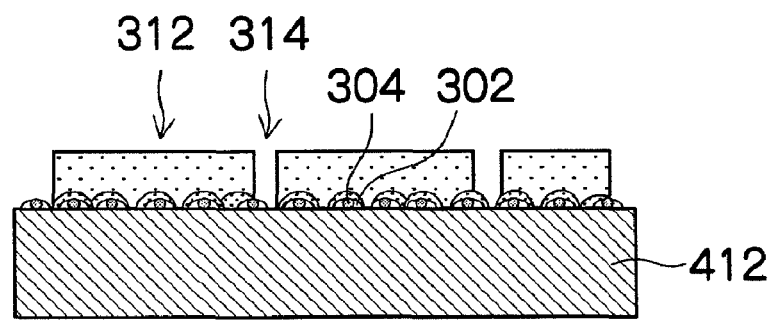
FIGS. 19A and 19B are schematic diagrams illustrating the behavior of ink droplets during the formation of image.
Figure 19B:
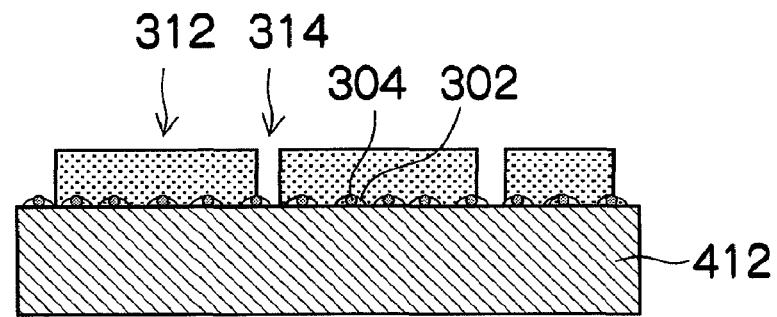
Figure 42A:
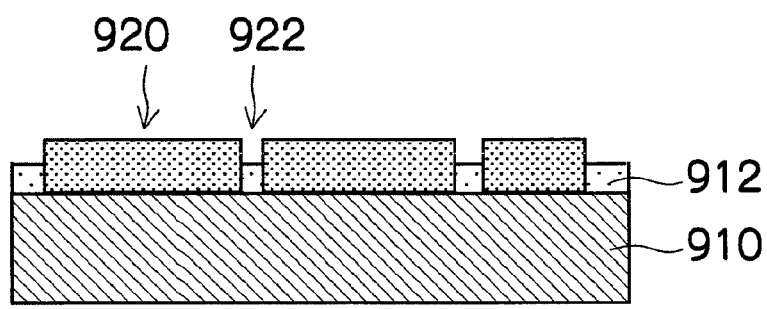
FIGS. 42A and 42B are a schematic diagram illustrating the behavior of ink droplets during the formation of image in the related art.
Figure 42B:
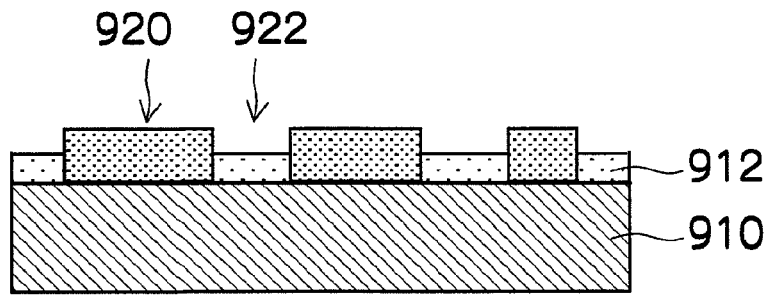

FIGS. 19A and 19B are schematic diagrams illustrating the process in which an image in accordance with the present invention is formed (in comparison with FIGS. 42A and 42B in the related art). FIG. 19A illustrates the state immediately after the image has been formed; in this state, portions (image portions) 312 having the coloring material and white background portion 314 are formed to be co-present correspondingly to the input image data. The image portion 312 is formed by a plurality of dots. Similarly to the state described with reference to FIGS. 18A to 18D, because the aggregation treatment agent 302 is localized close to the microparticles 304, the aggregation reaction advances and thickness rises from the vicinity of the microparticles 304. FIG. 19B shows a state in which the diffusion of the aggregation treatment agent 302 and aggregation have advanced and thickness has increased in the entire image portion 312. Due to such local advancement of aggregation, the adhesion to the base material (intermediate transfer body 412) has increased, and because of the anchor effect produced by the thin layer (particulate layer) 306, the dot composed of the ink aggregate shows no shrinkage.

Figure 20A:
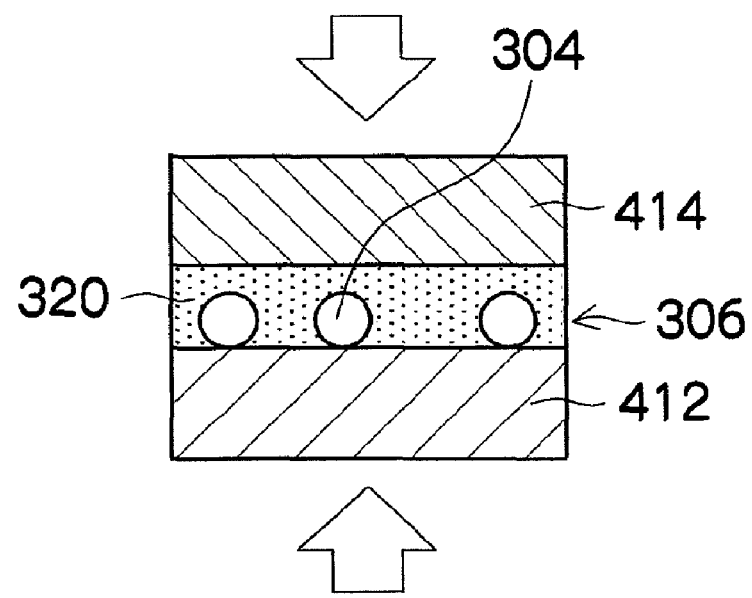
FIGS. 20A and 20B are schematic diagrams illustrating the behavior of ink droplets during image transfer.
Figure 20B:
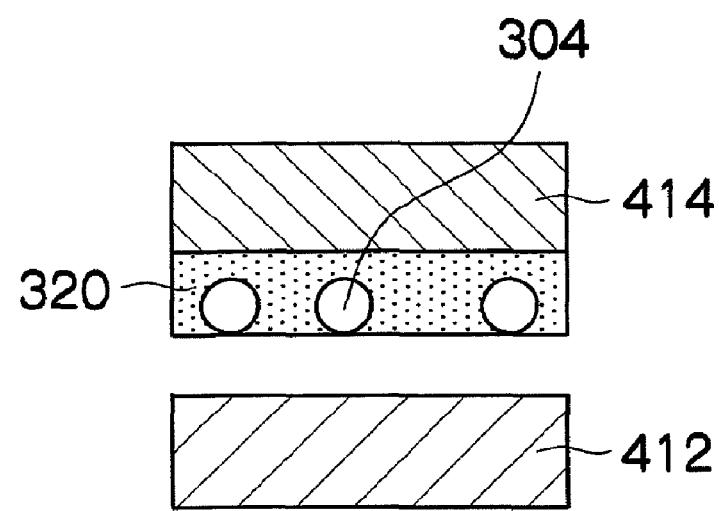
Figure 43A:
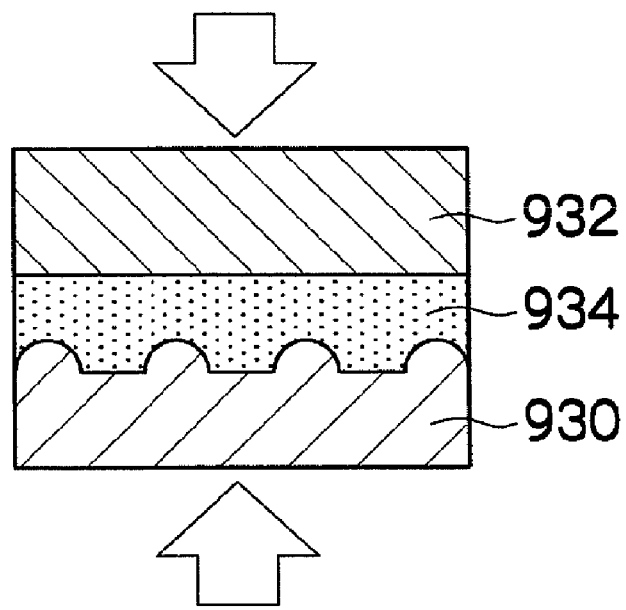
FIGS. 43A and 43B are a schematic diagram illustrating the behavior of ink droplets during image transfer in the related art.
Figure 43B:
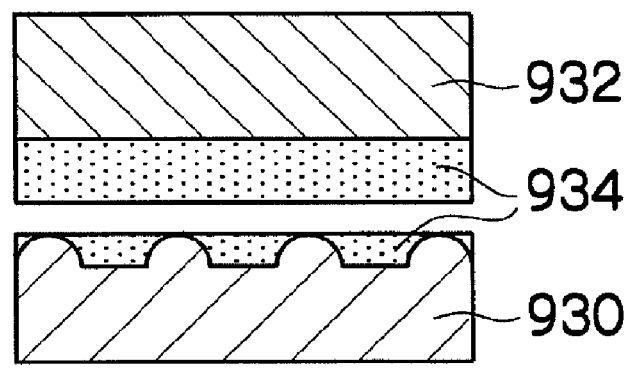

FIGS. 20A and 20B are schematic diagrams illustrating the transfer process in accordance with the present invention (in comparison with FIGS. 43A and 43B in the related art). FIG. 20A illustrates how the image formed on the intermediate transfer body 412 is transferred onto the recording medium 414, while being pressurized by a transfer heating roller (not shown in FIGS. 20A and 20B). The reference numeral 320 in the drawing stands for an ink layer constituting the image formed on the intermediate transfer body 412. FIG. 20B shows a state after the recording medium 414 has been peeled off (that is, the state after the transfer). As shown in FIG. 20A, because the thin layer (particulate layer) 306 has been formed on the intermediate transfer body 412, the contact surface area of the intermediate transfer body 412 and ink layer 320 decreases and, as shown in FIG. 20A, no part of the ink layer 320 remains on the intermediate transfer body 412 and good transferability can be obtained.

Concerning the size of microparticles in the preferred mode of the present invention, the mean particle size is preferably 0.1 μm to 10.0 μm. Where the particle size is less than 0.1 μm, peaks and valleys of sufficient size are not formed on the surface of the particulate layer composed of the microparticles, the anchor effect is degraded, and image shrinkage cannot be inhibited. Where the particle size exceeds 10.0 μm, because the particle size becomes larger than the ink layer thickness, noise provided to the image (spread of the image, etc.) becomes significant.

Concerning the application amount of microparticles, the desirable weight of microparticles per unit surface area of the intermediate transfer body 412 is 0.01 g/m$^2$ to 5.0 g/m$^2$.

Where the weight per unit surface area is less than 0.01 g/m², the amount of particles related to the amount of coloring material becomes too small and, therefore, image shrinkage cannot be inhibited. Further, when the weight of microparticles per unit surface area exceeds 5.0 g/m², the thickness of the particulate layer becomes about 5 μm, and when such a particulate layer is transferred onto paper, the external appearance of paper creates a very unpleasant feel and quality problems arise.

Fourth Embodiment

In the fourth embodiment of the image forming apparatus in accordance with the present invention, in the intermediate transfer system in which an image is temporarily formed by a two-liquid aggregation method on an intermediate transfer body and the image is then transferred onto a recording medium, a first treatment liquid including substantially colorless microparticles and a second treatment liquid including a component that causes the coloring material of the ink to aggregate are configured as separate treatment liquids.

The microparticles are identical to those explained in the third embodiment. Therefore, the explanation thereof is omitted and only the configuration of the inkjet recording apparatus will be explained.

Figure 21:
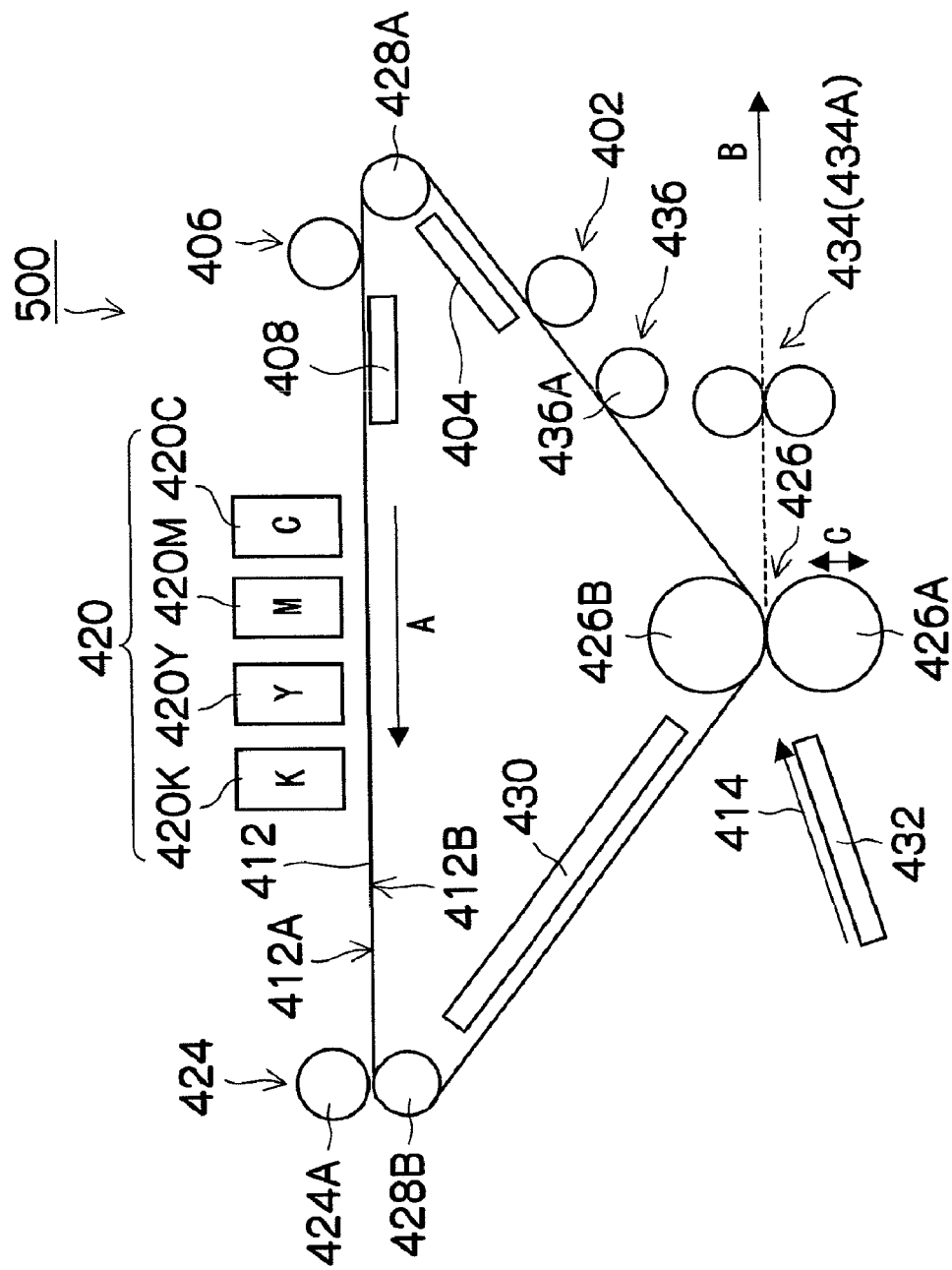
FIG. 21 is a schematic structural diagram illustrating the inkjet printing apparatus of a fourth embodiment of the present invention.

FIG. 21 is a schematic structural diagram illustrating an inkjet recording apparatus 500 of the fourth embodiment of the present invention. Components common to FIG. 17 and FIG. 21 will be denoted by identical reference numerals and the explanation thereof will be omitted.

In the present embodiment, a first treatment liquid including substantially colorless microparticles and a second treatment liquid including a component that causes the coloring material of the ink to aggregate are used. Because the first treatment liquid is non-acidic, the dispersion state of microparticles can be maintained with better stability.

The inkjet recording apparatus 500 shown in FIG. 21 includes a first treatment liquid application unit 402 that applies the first treatment liquid including substantially colorless microparticles onto the intermediate transfer body 412, a first treatment liquid drying unit 404 that dries the first treatment liquid applied on the intermediate transfer body 412, a second treatment liquid application unit 406 that applies the second treatment liquid including a component that causes the coloring material contained in the ink to aggregate, and a second treatment liquid drying unit 408 that dries the second treatment liquid applied on the intermediate transfer body 412.

The first treatment liquid application unit 402 and second treatment liquid application unit 406 employ a configuration identical to that of the aggregation treatment liquid application unit 416 shown in FIG. 17. Further, the first treatment liquid drying unit 404 and second treatment liquid drying unit 408 employ a configuration identical to that of the heating and drying unit 418 shown in FIG. 17.

In the first treatment liquid application unit 402, the first treatment liquid is uniformly applied, for example to a film thickness of 4 μm on the intermediate transfer body 412 that has passed through a cleaning unit 436. As described above, substantially colorless microparticles are dispersed in the first treatment liquid. The first treatment liquid that has been applied on the intermediate transfer body 412 is dried, for example by hot-air drying at 70° C. in the first treatment liquid drying unit 404 located downstream in the conveyance direction of the intermediate transfer body. As a result, a particulate layer composed of the microparticles is formed on the intermediate transfer body 412.

Then, in the second treatment liquid application unit 406, the second treatment liquid is uniformly applied, for example to a film thickness of about 4 μm on the intermediate transfer body 412 on which the particulate layer has been formed. As described above, the second treatment liquid includes a component that causes the coloring material in the ink to aggregate. The second treatment liquid applied on the intermediate transfer body 412 is dried, for example by hot-air drying at 70° C., in the second treatment liquid drying unit 408 located downstream in the conveyance direction of the intermediate transfer body. As a result, a solid or high-viscosity liquid-like thin layer (aggregation treatment agent layer, particulate layer) is formed on the intermediate transfer body 412. More specifically, as shown in FIG. 18B, the aggregation treatment agent 302 is localized around the microparticles 304.

Other features are identical to those of the inkjet recording apparatus 400 (see FIG. 17) of the first embodiment.

EXAMPLES

Example 1

By using the inkjet recording apparatus of a direct image formation system based on drum conveyance shown in FIG. 1, a comparison test was conducted in the following manner to determine whether there is a difference in the dot movement (coloring material movement) and landing interference between a case in which the condition of "the moisture ratio of the aggregation treatment layer is not more than 56%" in accordance with the present invention is satisfied and a case in which it is not satisfied.

<Inkjet Recording Apparatus Used in Accordance with the Present Invention>

A treatment liquid was applied as a thin-film (thickness 2.5 μm) by the treatment liquid application device 56, on the treatment liquid drum 54 (diameter 450 mm), onto the recording medium 22 supplied from the paper supply unit 10 of the inkjet recording apparatus shown in FIG. 1 onto the image formation drum 70. In this case, a gravure roller was used as the treatment liquid application device 56. The recording medium 22 on which the treatment liquid has been applied was then dried by a warm-air blow-out nozzle 58 (warm air with a temperature of 0° C. to 90° C. was blown at 9 m³/min) and an IR heater 60 (0° C. to 200° C.) and part of the solvent contained in the treatment liquid was dried, whereby a semi-solid aggregation treatment layer was formed on the recording medium 22.

The test was performed under the below-described six types of drying conditions of the treatment liquid (Test 1 to Test 6). The recording medium 22 was conveyed to the image formation unit 14 via the first intermediate conveyance unit 24, and aqueous inks of CMY (cyan, magenta, yellow) colors were ejected from the head 72 and deposited correspondingly to the image signals. The ink ejection volume was 2 pl, and the recording was performed at a recording density of 1200 dpi and a recording density of 150 dpi (thinning out) in both the main scanning direction and sub-scanning direction.

Because the treatment liquid drum 54 and drying drum 76 were provided separately from the image formation drum 70, even when drying of the treatment liquid was performed at a high speed, the adverse effect of heat or air blowing did not reach the image formation zone and stable ejection was performed. On the drying drum 76, the drying was performed with the first IR heater 78 (surface temperature 180° C.), warm-air blow-out nozzle 80 (warm air at 70° C. at a blow rate of 12 m³/min), and a second IR heater 82 (surface temperature 180° C.). The drying was performed for about 2 seconds.

The recording medium 22 with an image formed thereon was then heated and fixed under a nip pressure of 0.30 MPa with the fixing drum 84 at 50° C. and the first fixing roller 86 and second fixing roller 88 at 80° C. The first fixing roller 86 and second fixing roller 88 used in this case were produced by providing a silicone rubber layer with a hardness of 30° and a thickness of 6 mm on a metal core and then providing a soft PFA coating thereupon (thickness 50 μm). Such rollers could be effectively brought into intimate contact with the ink image and peeled therefrom.

The recording medium 22 was conveyed at a conveyance speed of 535 mm/s by drum conveying using the drains 54, 70, 76, 84.

<Preparation of Aqueous Ink>
(Synthesis of Resin Dispersant P-1)

A resin dispersant P-1 representing one mode of the resin dispersant (A) was synthesized according to the following scheme.

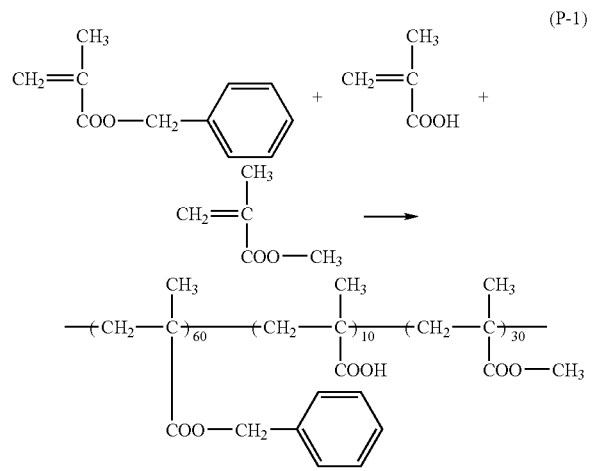

A total of 88 g of methyl ethyl ketone was placed in a three-neck flask with a capacity of 1000 milliliters (ml) equipped with a stirrer and a cooling tube, heating to 72° C. was performed under a nitrogen atmosphere, and then a solution obtained by dissolving 0.85 g of dimethyl 2,2'-azobisisobutyrate, 60 g of benzyl methacrylate, 10 g of methacrylic acid, and 30 g of methyl methacrylate in 50 g of methyl ethyl ketone was dropwise added within 3 hours. Upon completion of dropping, the reaction was conducted for 1 hour, then a solution obtained by dissolving 0.42 g of dimethyl 2,2'-azobisisobutyrate in 2 g of methyl ethyl ketone was added, the temperature was raised to 78° C. and heating was performed for 4 hours. The reaction solution obtained was twice re-precipitated in a large excess amount of hexane, and the precipitated resin was dried to obtain 96 g of the resin dispersant P-1.

The composition of the obtained resin dispersant P-1 was verified by H-NMR, and the weight-average molecular weight (Mw) found by GPC was 44,600. Further, the acid value of the polymer was found by a method described in a JIS standard (JIS K0070:1992). The result was 65.2 mg KOH/g.

(Synthesis of Self-Dispersible Polymer Microparticles B-01)

Self-dispersible polymer microparticles B-01 representing an embodiment of self-dispersible polymer microparticles (C) were synthesized by the following scheme.

A total of 360.0 g of methyl ethyl ketone was loaded into a reaction container formed from a three-neck flask of two liters and equipped with a stirrer, a thermometer, a reflux cooler, and a nitrogen gas introducing tube, and the temperature was raised to 75° C.

A mixed solution including 180.0 g of phenoxyethyl acrylate, 162.0 g of methyl methacrylate, 18.0 g of acrylic acid, 72 g of methyl ethyl ketone, and 1.44 g of "V-601" (manufactured by Wako Junyaku KK) was dropwise added at a constant rate so that the dropwise addition was completed within 2 hours, while maintaining the temperature inside the reaction container at 75° C.

Upon completion of dropping, a solution including 0.72 g of "V-601" and 36.0 g of methyl ethyl ketone was added and stirring was performed for 2 hours at a temperature of 75° C. Then, a solution including 0.72 g of "V-601" and 36.0 g of isopropanol was added and stirring was performed for 2 hours at 75° C., followed by heating to 85° C. and further stirring for 2 hours.

The weight-average molecular weight (Mw) of the copolymer obtained was 64,000, and the acid value was 38.9 (mg KOH/g). The weight-average molecular weight (Mw) was calculated by polystyrene recalculation by gel permeation chromatography (GPC). The columns TSKgel SuperHZM-H, TSKgel SuperHZ4000, and TSKgel SuperHZ200 (manufactured by Tosoh Corp.) were used in this process.

A total of 668.3 g of the polymerization solution of the copolymer was then weighed, 388.3 g of isopropanol and 145.7 ml of 1 mol/L aqueous NaOH solution were added, and the temperature inside the reaction container was raised to 80° C. Then, 720.1 g of distilled water was dropwise added at a rate of 20 m/min and an aqueous dispersion was obtained. The temperature inside the reaction container was then maintained for 2 hours at 80° C., for 2 hours at 85° C., and for 2 hours at 90° C. under atmospheric pressure, and the pressure inside the reaction container was then lowered to distill out a total of 913.7 g of isopropanol, methyl ethyl ketone, and distilled water. As a result, an aqueous dispersion (emulsion) of self-dispersible polymer microparticles (B-01) with a concentration of solids of 28.0% was obtained.

A chemical structure formula of the self-dispersible polymer microparticles (B-01) is presented below. The numerical values relating to each structural unit represent a weight ratio.

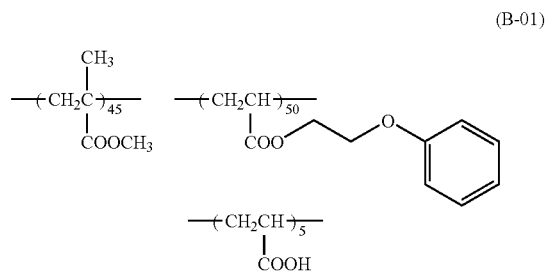

(Preparation of Dispersion of Resin Particles Including a Cyan Pigment)

A total of 10 parts by weight by a Pigment Blue 15:3 (Phthalocyanine Blue A220, manufactured by Dainichi Seika Color & Chemicals Mfg. Co., Ltd.), 5 parts by weight of the resin dispersant (P-1) described in Table 1, 42 parts by weight of methyl ethyl ketone, 5.8 parts by weight of 1N aqueous NaOH solution, and 86.9 parts by weight of deionized water were mixed and dispersed for 2 hours to 6 hours in a bead mill using zirconia beads with a diameter of 1 mm.

The methyl ethyl ketone was removed from the obtained dispersion at 55° C. under reduced pressure and part of water was then removed to obtain a dispersion of resin particles including a cyan pigment with a pigment concentration of 10.2 wt. %.

(Preparation of Cyan Ink Composition C-1)

The obtained dispersion of resin particles including a cyan pigment and self-dispersible polymer microparticles (B-01) were used to prepare a water-soluble cyan ink composition C-1 of the following composition:

Dispersion of resin particles including a cyan pigment: 39.2 parts by weight.
Self-dispersible polymer microparticles (B-01): 28.6 parts by weight.
Glycerin: 20.0 parts by weight.
Diethylene glycol: 10.0 parts by weight.
Olfine E1010: (manufactured by Nisshin Kagaku Kogyo KK): 1.0 part by weight.
Deionized water: 1.2 part by weight.

(Preparation of Magenta Ink Composition M-1)

A magenta ink composition M-1 was prepared in the same manner as the cyan ink composition, except that Cromophthal Jet Magenta DWQ (PR-122) manufactured by Chiba Specialty Chemicals Co., Ltd. was used instead of the Pigment Blue 15:3 (Phthalocyanine Blue A220, manufactured by Dainichi Seika Color & Chemicals Mfg. Co., Ltd.) used in the preparation of the cyan pigment dispersion.

(Preparation of Yellow Ink Composition Y-1)

A yellow ink composition Y-1 was prepared in the same manner as the cyan ink composition, except that Irgalite Yellow GS (PY74) manufactured by Chiba Specialty Chemicals Co., Ltd. was used instead of the Pigment Blue 15:3 (Phthalocyanine Blue A220, manufactured by Dainichi Seika Color & Chemicals Mfg. Co., Ltd.) used in the preparation of the cyan pigment dispersion.

(Preparation of Black Ink Composition Bk-1)

A black ink composition Bk-1 was prepared in the same manner as the cyan ink composition, except that Carbon Black MA100 manufactured by Mitsubishi Chemicals Co., Ltd. was used instead of the Pigment Blue 15:3 (Phthalocyanine Blue A220, manufactured by Dainichi Seika Color & Chemicals Mfg. Co., Ltd.) used in the preparation of the cyan pigment dispersion.

(Preparation of Cyan Ink Composition C-2, Magenta Ink Composition M-2, Yellow Ink Composition Y-2, and Black Ink Composition Bk-2)

Further, aqueous inks satisfying the conditions set forth by the present invention were also prepared by replacing glycerin used as a high boiling-point solvent in the above-described preparation of cyan ink composition C-1, magenta ink composition M-1, yellow ink composition Y-1, and black ink composition Bk-1 with half amount of GP-250 (trioxypropylene glyceryl ether, Sunnix GP250, manufactured by Sanyo Chemical Industries, Ltd.), replacing diethylene glycol with half amount DEGmEE (diethylene glycol monoethyl ether), and making up a difference with water. As a result, cyan ink composition C-2, magenta ink composition M-2, yellow ink composition Y-2, and black ink composition Bk-2 were prepared.

(Preparation of Cyan Ink Composition C-3, Magenta Ink Composition M-3, Yellow Ink Composition Y-3, and Black Ink Composition Bk-3)

As another example, cyan ink composition C-3, magenta ink composition M-3, yellow ink composition Y-3, and black ink composition Bk-3 were prepared by reducing the amount of B-01 in the cyan ink composition C-2, magenta ink composition M-2, yellow ink composition Y-2, and black ink composition Bk-2 to 14.3 parts by weight and replacing the loss with water.

<Preparation of Treatment Liquid>

A treatment liquid was prepared by mixing the components to obtain the below-described composition.

Composition of Treatment Liquid:
Malonic acid (manufactured by Wako Junyaku KK): 15.0%.
Diethylene glycol monomethyl ether (manufactured by Wako Junyaka KK): 20.0%.
Deionized water: 65.0%.

Physical properties of the treatment liquid were measured, and the following results were obtained: viscosity 4.9 mPa·s, surface tension 24.3 mN/m, pH 1.5.

<Recording Medium>

Tokuhishi Art Two-side N (manufactured by Mitsubishi Paper Mills Ltd.) was used as the recording medium.

<Test Method>

The treatment liquid was applied on the recording medium 22 under the above-described conditions relating to the inkjet recording apparatus, ink, treatment liquid, and recording medium, and the degree of drying of the treatment liquid was changed by varying the heating conditions of the warm-air blow-out nozzle 58 and IR heater 60. The movement of coloring material and landing interference in this process were evaluated.

The movement of coloring material was evaluated by forming a beta image with a grid pattern by depositing the ink at 150 dpi. The line width and liquid residue were evaluated by forming a beta image with a grid pattern by depositing the ink at 1200 dpi.

<Evaluation Criteria of Coloring Material Movement>

"poor": average displacement amount related to dot pitch is not less than 7% (not less than 11.9 μm).

"fair": average displacement amount related to dot pitch is not less than 5% (not less than 8.47 μm).

"good": average displacement amount related to dot pitch is not less than 3% and less than 5% (5.08 μm to 8.47 μm).

"excellent": average displacement amount related to dot pitch is less than 3% (less than 5.08 μm).

<Evaluation Criteria of Landing Interference: Evaluation by Line Width and Liquid Residue>

"poor": line width is uneven, or lines are broken, or liquid residue occurred.

"good": none of the line width unevenness, broken lines, and liquid residue was observed.

The test results are shown in FIG. 22. The "moisture content" is determined as a ratio of weight X2 (g/m$^2$) per unit surface area of water contained in the aggregation treatment agent (or aggregation treatment layer) to the total weight X1 (g/m$^2$) per unit surface area of the aggregation treatment agent (or aggregation treatment layer), that is, (X2/X1)×100.

<Test Results>

The table of FIG. 22 shows that in Test 1 (comparative example) in which the aggregation treatment liquid was not dried, the moisture content ratio of the aggregation treatment layer was 64.80%, the coloring material movement was large, and the evaluation was "poor". As shown in Test 2 to Test 6, the moisture content ratio of the aggregation treatment layer decreased with gradual increase in the drying degree of the aggregation treatment liquid. Thus, the moisture content ratio in Test 2 was 59.63%, the coloring material movement was still large, and the evaluation was "poor". The moisture content ratio in Test 3 was 56.12%, the coloring material movement was small, and the evaluation was "good". Further, in Tests 4 to 6 in which the moisture content ratio was further decreased, the coloring material movement was even less, and the evaluation was "excellent". These results suggest that when a moisture content ratio of 56.12% of Test 3 is taken as a goal, a region in which the coloring material movement does not occur is obtained when the moisture content ratio of the aggregation treatment layer is not more than 56%.

On the other hand, when the moisture content ratio was decreased to a level as low as that of Test 5 in which the moisture content ratio was 32.82%, the landing interference (line width, liquid residue) had evaluation "good", but in Test 6, in which the moisture content ratio was 12.87%, problems associated with line width and liquid residue were encountered. This is apparently because when the aggregation treatment agent is almost completely solidified, the aggregation reaction is delayed by the loss of time on dissolution of the solidified aggregation agent during aggregation reaction with the ink.

Therefore, both the problem of coloring material movement and the problem of line width and liquid residue can be resolved by producing a semisolid aggregation treatment layer with a moisture content ratio of 32% to 56%.

A mode can be also considered according to which in order to avoid the coloring material movement, ink deposition is performed in a state in which no treatment liquid layer is present on the recording medium after waiting for the completion of treatment liquid penetration following the application of the aggregation treatment liquid onto the recording medium. However, where the treatment liquid completely penetrates into the recording medium, in order to cause the aggregation of the ink that has landed on the recording medium, it is necessary that the aggregation agent that has already penetrated into the recording medium again ooze out into the ink located on the recording medium, and high-speed aggregation cannot be realized. Further, where the ink is deposited after waiting for the complete penetration of the treatment liquid, a large spacing has to be provided between the treatment liquid application unit and ink ejection unit. The resulting problem is that the apparatus is increased in size.

Further, where the aggregation treatment liquid is dried more than necessary, because the ink droplets directly land on the coated paper, due to the restrictions placed by the ink contact angle, the dot does not spread more than in the case in which the ink lands on a semi-solid aggregation treatment liquid layer. Because in a semisolid state, the ink contact angle decreases, a spread ratio can be ensured.

The ink spread ratio as referred to herein means a d2/d1 ratio, that is, a ratio of dot diameter d2 after fixing to dot diameter d1 calculated for a spherical droplet of the ejected ink. Where the dot spread ratio is small, the ink solvent drying energy after ink deposition increases. In the case of a high-speed conveyance with a paper conveyance speed of 535 mm/sec, in order to evaporate the ink deposited on paper of a small octavo size (469 mm×636 mm), a heater of a 30 kW class is required when the dot spread ratio is 1.660. Where the dots spread ratio decreases, the ejected droplet volume has to be increased in order to obtain the desired diameter of the fixed dot. Because the drying energy is related to the droplet volume, where the spread ratio decreases, the operation proceeds at a third power of the ejected droplet diameter. As a result, where the expansion efficiency becomes less than 1.660, power consumption of the printing device exceeds the level suitable for practical use. From this standpoint, the moisture content of 32% is taken as a lower limit value.

Example 2

In Example 2, the evaluation tests were conducted for aggregation treatments of three kinds: an acid, a polyvalent metal salt, and a cation polymer.

The movement of coloring material was evaluated by forming a beta image with a grid pattern by depositing the ink at 150 dpi. The line width and liquid residue were evaluated by changing the conveyance speed to 215 mm/sec and forming a beta image with a grid pattern by depositing the ink at 1200 dpi.

The test conditions and evaluation results are shown in the table of FIG. 23. The evaluation criteria for the coloring material movement and landing interference are identical to those of Example 1.

The compositions of treatment liquids 1 to 7 in the table of FIG. 23 and acids used in the treatment liquids are presented below. The composition ratios are presented in wt. %.

<Composition of Treatment Liquid>
Aggregating agent: 15.0%.
Diethylene glycol monomethyl ether (manufactured by Wako Junyaku KK): 20.0%.
Deionized water: 65.0%.

Physical properties of the treatment liquid were measured, and the following results were obtained: viscosity 4.9 mPa·s, surface tension 24.3 mN/m, pH 1.5.

<Types of Aggregating Agents>
Treatment liquid 1: malonic acid.
Treatment liquid 2: citric acid.
Treatment liquid 3: succinic acid.
Treatment liquid 4: 2-pyrrolidone-5-carboxylic acid.
Treatment liquid 5: calcium chloride.
Treatment liquid 6: calcium nitrate.
Treatment liquid 7: polyethylene imine.

<Test Results>
The evaluation results relating to the movement of coloring material in the table of FIG. 23 demonstrate that even when the type of the aggregating agent is changed, by drying the treatment liquid applied on the recording medium to "a moisture content ratio of the aggregation treatment layer not more than 56%", it is possible to obtain an extremely small movement of coloring material and, accordingly, the evaluation is "excellent".

On the other hand, the evaluation results relating to landing interference demonstrate that when an image is formed at 1200 dpi in a high-speed conveyance at 215 mm/sec, the deposition interval of the adjacent dots becomes extremely small (100 μsec). As a result, in the cases other than those of the acid aggregation system that uses an acid as an aggregating agent, the aggregation speed is not high enough and the evaluation of line width and liquid residue is "poor". Therefore, in the case of high-speed deposition with a deposition interval not more than 100 μm, it is preferred that a semisolid aggregation treatment liquid be obtained using an acid aggregation agent.

Example 3

Figure 24:
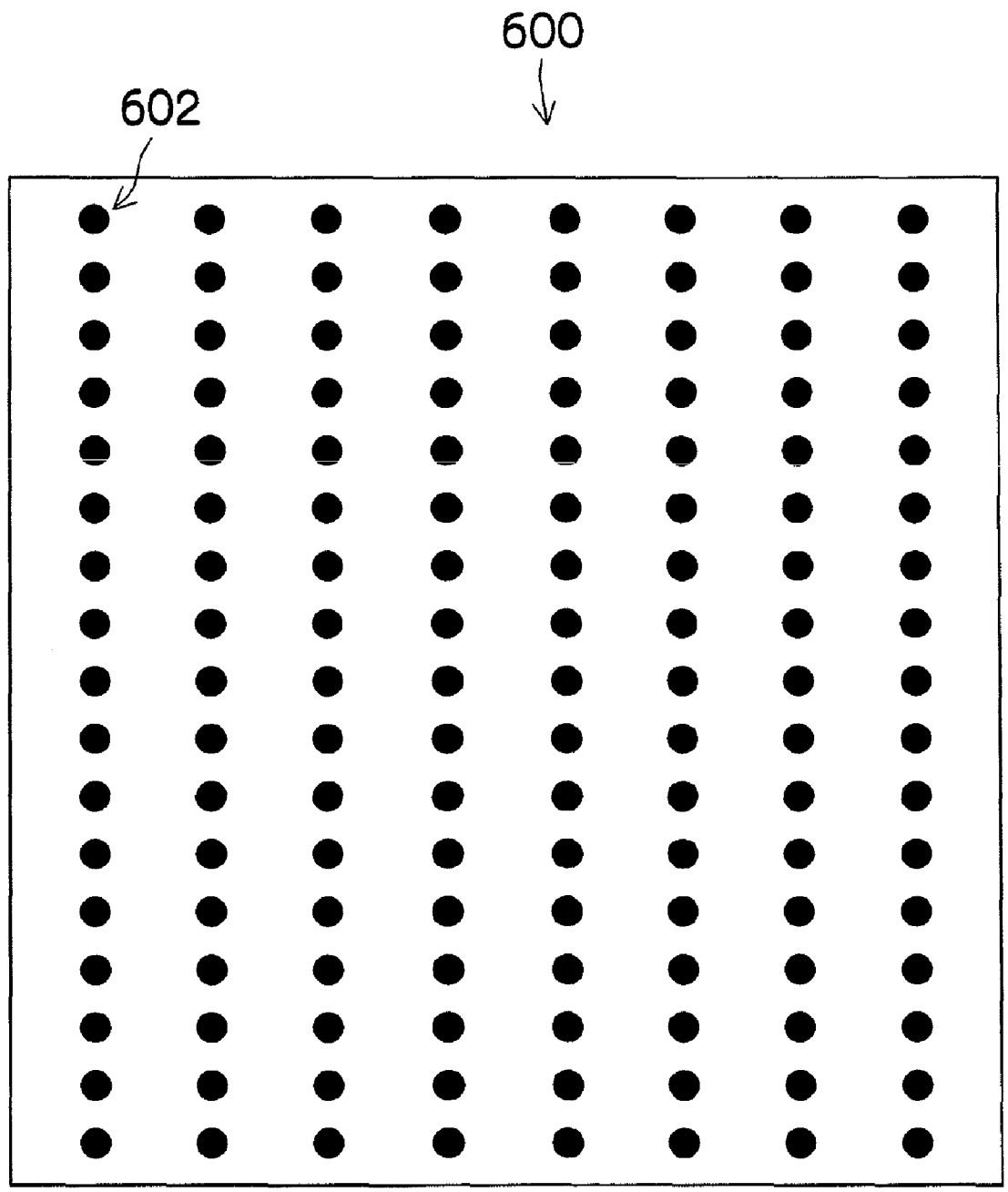
FIG. 24 is a table showing the results obtained in Example 3 of the present invention.
Figure 25:
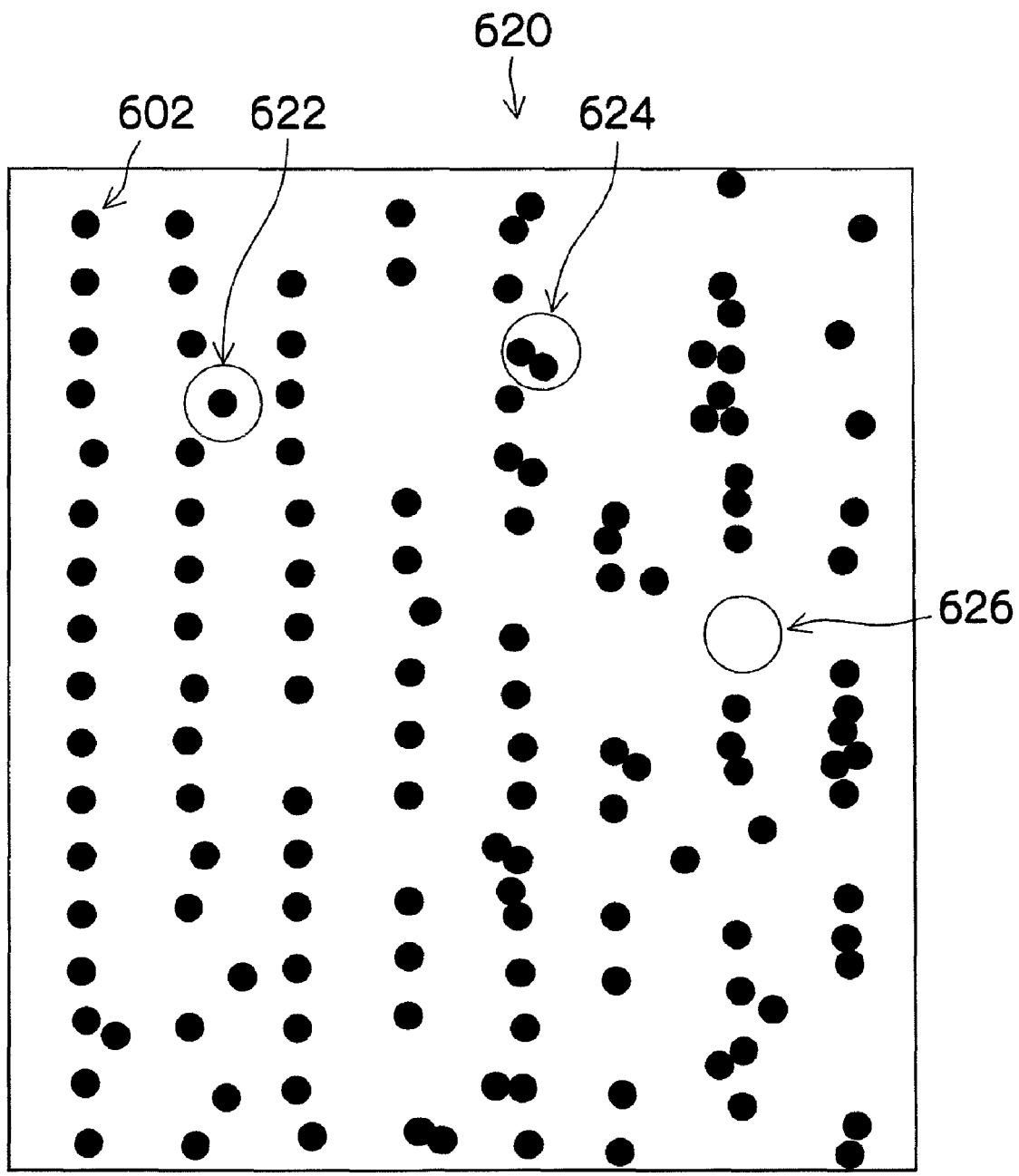
FIG. 25 is an explanatory drawing illustrating a recorded image in a comparative example.

FIG. 24 shows a recorded image of Test 4 (present invention) in Example 1, and FIG. 25 shows a recorded image of Test 1 (comparative example). The recorded images shown in the drawings are represented schematically by enlarging the photographic images obtained with a photographic camera.

In an image 600 of test 4 (present invention) shown in FIG. 24, the error of the formation position of dots 602 was not more than half of the pitch dot, and each dot 602 was confirmed to be fixed in the predetermined landing position. On the other hand, in an image 620 of Test 1 (comparative example) shown in FIG. 25, the dots became unstable in the course of the aggregation reaction and the movement of dots 602 could be easily confirmed. For example, the dot denoted by the reference numeral 622 displaced in the transverse direction in FIG. 25, and an error of the formation position in excess of one half of the dot pitch has occurred. Further, two dots denoted by the reference numeral 624 were not only displaced, but also have integrated. Furthermore, a dot that had to be formed in the position denoted by the reference numeral 626 was not present therein. Thus, in Test 4 employing the present invention, the displacement (coloring material movement) of dots caused by aggregation did not occur and good beta image was formed.

Further, images of predetermined symbols were formed under the test conditions identical to those described above, and comparative evaluation of the recorded symbols was performed (this is not shown in the drawings).

As a result, the symbols recorded in Test 4 (present invention) were vivid and could be correctly recognized visually. On the other hand, the symbols formed in Test 1 (comparative examples) were unclear and could not be accurately recognized visually. Thus, in Test 4 employing the present invention, the displacement (coloring material movement) of dots caused by aggregation did not occur and symbols could be effectively formed.

An assumption model described hereinbelow suggests how the coloring material movement of the deposited ink dots is eliminated by drying the treatment liquid (aggregation treatment liquid) applied on the recording medium and forming a semisolid aggregation treatment layer with a moisture content ratio not more than 56%.

Figure 26A:
FIGS. 26A to 26H are explanatory drawings illustrating an example of the image forming method in accordance with the present invention.
Figure 26B:

A semisolid aggregation treatment layer 1012 with a moisture content ratio not more than 56% is formed on a recording medium 1000 shown in FIG. 26A by applying a treatment liquid on the recording medium 1000 and drying (FIG. 26B).

Figure 26C:
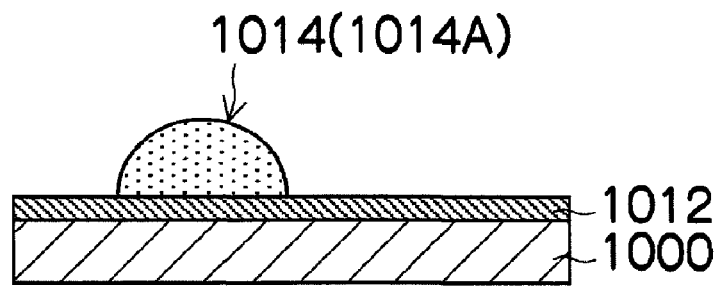
Figure 26D:
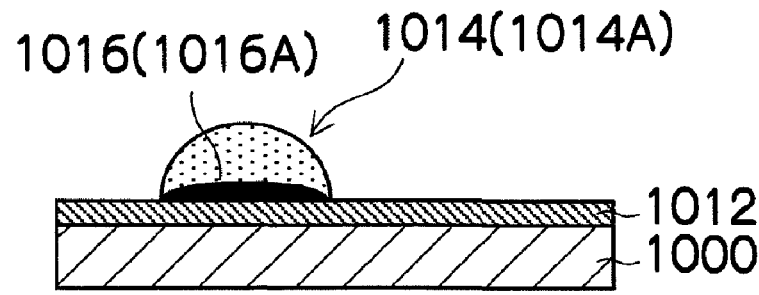

An ink droplet 1014 is then deposited on the recording medium 1000 on which the semisolid aggregation treatment layer 1012 has been formed (FIG. 26C). By depositing the ink droplet 1014 after the semisolid aggregation treatment layer 1012 has been formed on the recording medium 1000, a dot composed of an ink aggregate (coloring material aggregate) 1016 that is to a predetermined size is formed on the aggregation treatment layer 1012 (FIG. 26D).

Figure 27A:
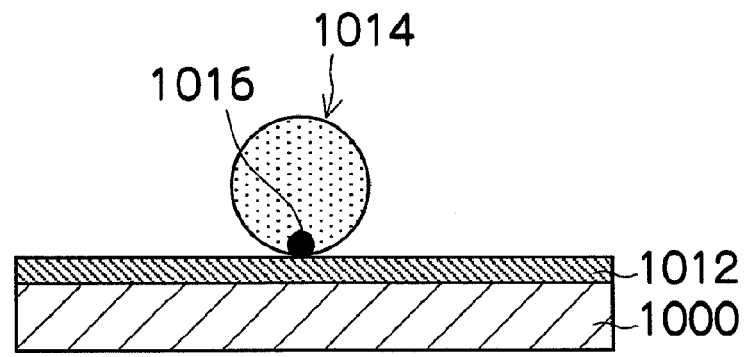
FIGS. 27A to 27C are explanatory drawings illustrating how a dot is formed.
Figure 27B:
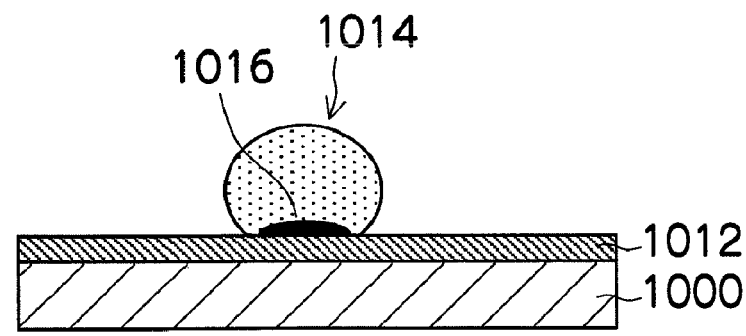
Figure 27C:
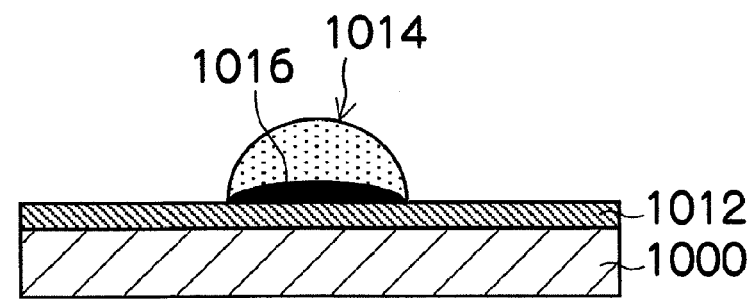

FIGS. 27A to 27C are schematic diagrams illustrating in details how the dot (ink aggregate) is formed. As shown in FIG. 27A, where the ink droplet 1014 lands on the semisolid aggregation treatment layer 1012 formed on the recording medium 1000, an aggregation reaction starts immediately from the contact surface of the droplet with the aggregation treatment layer 1012 and the ink aggregate 1016 is formed. Then, the aggregation reaction proceeds in the vicinity of the contact surface of the ink droplet with the aggregation treatment layer 1012, while the contact surface of the ink droplets 1014 with the aggregation treatment layer 1012 increases gradually due to the balance relationship of the flight energy and surface energy (interface energy) of the ink droplet 1014. Therefore, the ink aggregate 1016 also increases gradually in size along the contact surface with the aggregation treatment layer 1012 (FIG. 27B). As a result, a dot composed of the ink aggregate 1016 that has increased to a predetermined size is formed on the semisolid aggregation treatment layer 1012, as shown in FIG. 27C. Because the predetermined contact surface area is ensured between the ink aggregate (dot) 1016 and the aggregation treatment layer 1012, sufficient adhesion force can be obtained.

Figure 26E:
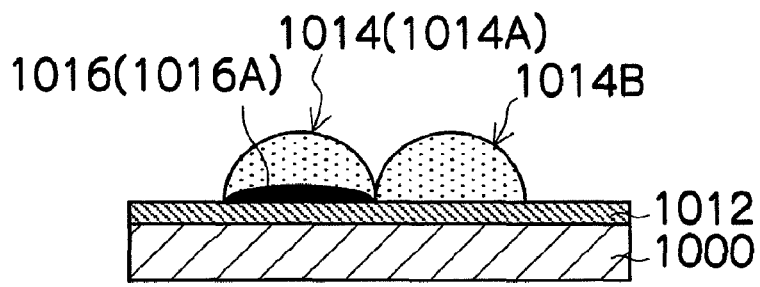
Figure 26F:
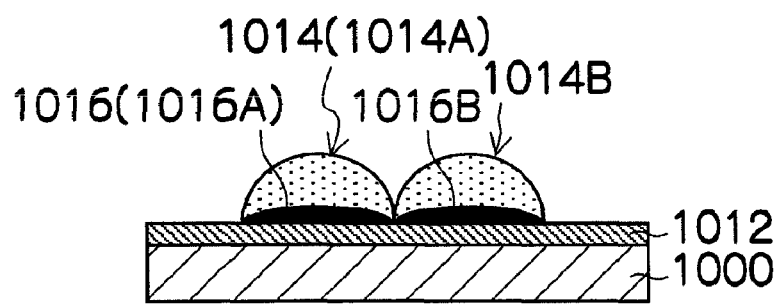

Further, as shown in FIG. 26E, because an ink aggregate 1016A has already been formed by the above-described aggregation reaction in an ink droplet 1014A that has landed on the aggregation treatment layer 1012, even when an ink droplet 1014B is later deposited so as to come into contact with the ink droplet 1014A that has heretofore been deposited, no coalescence of the ink droplets 1014A, 1014B occurs (no landing interference). In the ink droplet 1014B that has later landed on the aggregation treatment layer 1012, an ink aggregate 1016B is also formed by the aggregation reaction (FIG. 26F). In other words, even when a plurality of ink droplets are deposited in the adjacent positions, no landing interference occurs between these ink droplets, the desired dot size and dot shape can be obtained, and a high-quality image can be formed. Further, in the case of ink droplets of different colors, color mixing and bleeding can be prevented.

Figure 26G:
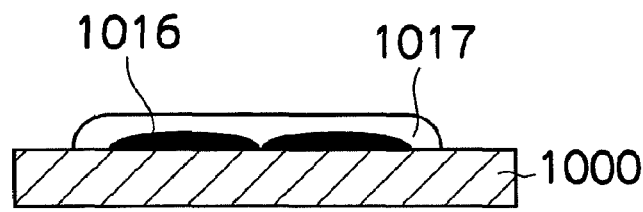

The semisolid aggregation treatment layer 1012 formed on the recording medium 1000 is dissolved in an ink solvent that has separated from the ink aggregate 1016, and a liquid solvent (solvent component of the ink and aggregation treatment liquid) 1017 is formed on the recording medium 1000 so as to cover the ink aggregates 1016 (FIG. 26G). In this case, because the ink aggregates 1016 have already assumed a state in which they have spread to the predetermined size, even when the aggregation treatment layer 1012 is dissolved by the action of ink solvent, since the predetermined surface area is ensured between the ink aggregates (dots) 1016 and recording medium 1000, as shown in FIG. 26G, a sufficient adhesion force can be obtained. Therefore, image degradation cause by the movement of is coloring material can be prevented.

Figure 26H:
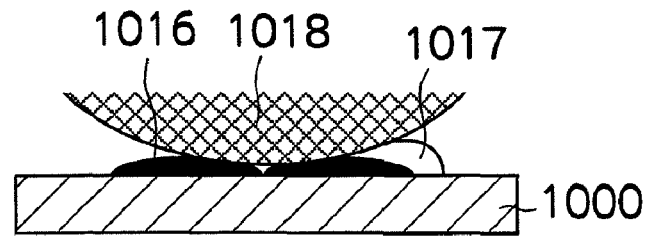

The liquid solvent 1017 present on the recording medium 1000 is then removed. In the present example, as shown in FIG. 26H, a system (solvent absorption system) is employed by which the liquid solvent 1017 present on the recording medium 1000 is absorbed and removed by bringing a solvent absorption roller 1018 having a surface composed of a porous body (absorbing body) into contact with the liquid solvent 1017 located on the recording medium 1000. Because the ink aggregate (dot) 1016 formed by the aggregation reaction can be provided with a sufficient force of adhesion to the recording medium 1000, the liquid solvent 1017 can be absorbed and removed, while preventing the adhesion of the coloring material to the solvent absorption roller 1018.

Example 4

By using the inkjet recording apparatus of an intermediate transfer system shown in FIG. 15, a comparison test was conducted in the following manner to determine whether there is a difference in the dot movement (coloring material movement) and landing interference between a case in which the condition of "the moisture ratio of the aggregation treatment layer is not more than 56%" in accordance with the present invention is satisfied and a case in which it is not satisfied.

In the test, an aggregation treatment liquid was applied to a film thickness of about 10 μm on the intermediate transfer body 202 made from a polyimide, and the coloring material movement and landing interference were evaluated, while varying the moisture content ratio in the aggregation treatment layer located on the intermediate transfer body 202 by drying. More specifically, the heating conditions of the heating and drying unit 208 were changed appropriately, the moisture content ratio of the aggregation treatment layer located on the intermediate transfer body 202 was changed, a primary image (ink image) was formed on the intermediate transfer body 202 and the primary image after the removal of solvent was evaluated. Landing interference was evaluated by evaluating the line width and liquid residue.

The compositions of the ink and aggregation treatment liquid that were used are shown in FIG. 28. Ink deposition conditions were the same in all the tests (A to E) shown in the table of FIG. 29. Thus, the deposition was performed at an ink ejection amount (volume) of 2 pl and a deposition density (dot density) of 1200 dpi in both the main scanning direction and the sub-scanning direction.

The test results of Example 4 are shown in FIG. 29. The evaluation criteria for the coloring material movement and landing interference (line width, liquid residue) were identical to those of Example 1.

As shown in the table of FIG. 29, Test A (comparative example) represents a case in which a process of drying the aggregation treatment layer (liquid layer) located on the intermediate transfer body 202 was omitted, and the moisture content ratio of the aggregation treatment layer was 87.00%. As a result, the position displacement (coloring material movement) of ink dots was large, the evaluation result was "poor", and image degradation was confirmed.

Further, in Test B (comparative example), the aggregation treatment layer (liquid layer) located on the intermediate transfer body 202 was somewhat dried and the moisture content ratio was decreased to 61.98%. In this case the coloring material movement was also large, the evaluation was "poor", and image degradation was confirmed.

On the other hand, in Test C (present invention), the aggregation treatment layer (liquid layer) located on the intermediate transfer body 202 was dried to an extent larger than that of Test B, and the moisture content ratio was decreased to 57.52%. In this case, the coloring material somewhat moved, but no visible problems were associated with the image quality and the evaluation was "good".

In Test D (present invention)), the aggregation treatment layer (liquid layer) located on the intermediate transfer body 202 was dried to an extent larger than that of Test C, and the moisture content ratio was decreased to 28.96%. In this case, the coloring material was absent, the evaluation was "excellent", and good image quality was obtained.

In Test E (comparative example), the aggregation treatment layer (liquid layer) located on the intermediate transfer body 202 was dried to an extent larger than that of Test D, and the moisture content ratio was decreased to 15.00%. In this case, the coloring material was absent and the evaluation was "excellent", but the landing interference was evaluated by "poor".

The above-described results demonstrate that Example 4 confirmed the effect of the present invention. Thus, high-quality image formation can be preformed, while preventing image degradation caused by the movement of coloring material, by forming a semisolid aggregation treatment layer (moisture content ratio 28 to 57%) on the intermediate transfer body 202 and then depositing ink droplets.

Combining the results of Example 1 (direct image formation system) with those of the present Example 4 (intermediate transfer system), it becomes clear that the movement of coloring material of the deposited ink can be effectively prevented by making the moisture content ratio of the aggregation treatment layer not more than 56% both in the case of a direct image formation system in which an image is directly formed on the recording medium and in the case of an intermediate transfer system in which an image is transferred from the intermediate transfer body onto the recording medium. Where the adequate moisture content ratio of the aggregation treatment layer is considered by including the evaluation of landing interference, the results obtained in Examples 1 and 4 suggest that the preferred moisture content ratio of the aggregation treatment layer is not less than 32% and not more than 56%.

Example 5

In Example 5, the relationship between the moisture content ratio of the aggregation treatment layer and adhesion of the coloring material to the solvent absorption roller 810 was tested using the inkjet recording apparatus of a direct image formation system in which an image is directly formed on a recording medium conveyed by a belt.

Figure 30:
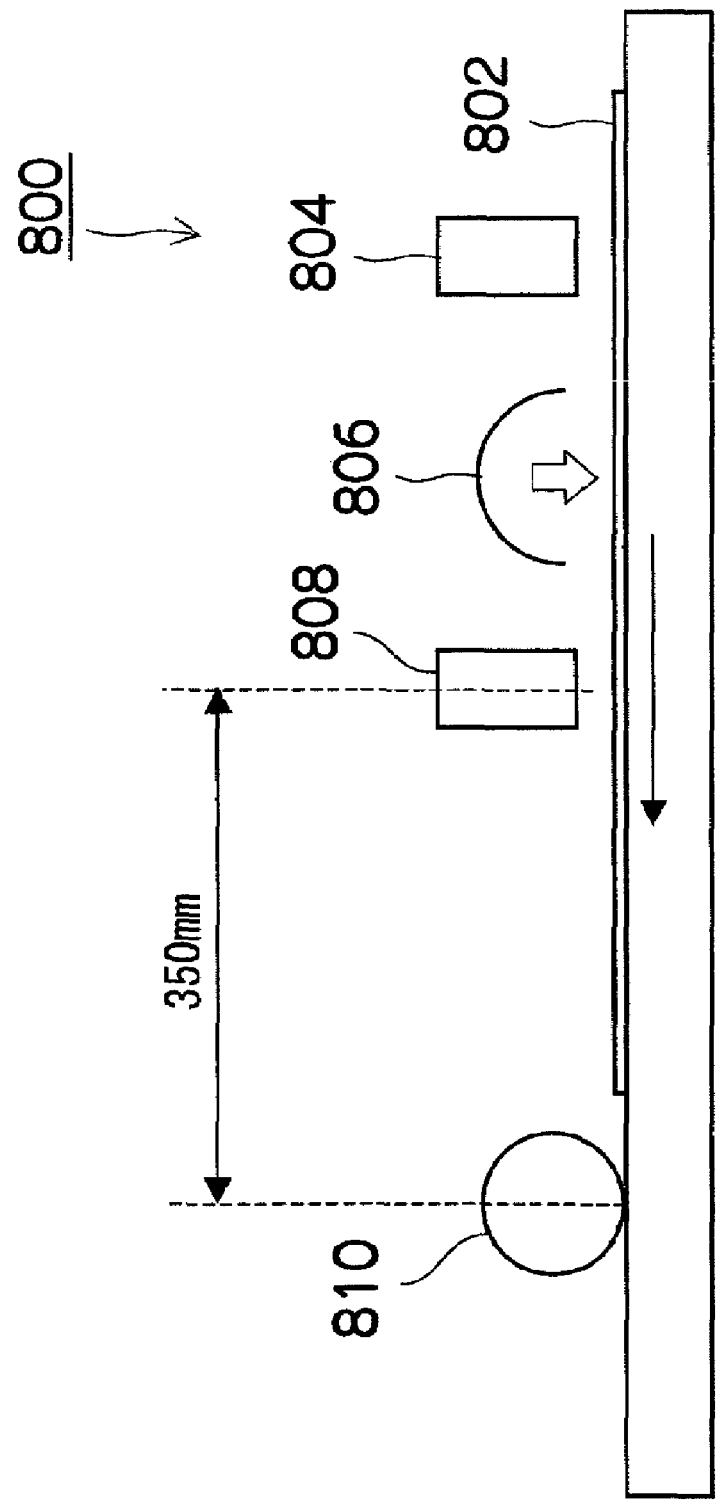
FIG. 30 is an explanatory drawing of a test device for the inkjet recording apparatus used in Example 5 of the present invention.
Figure 40A:
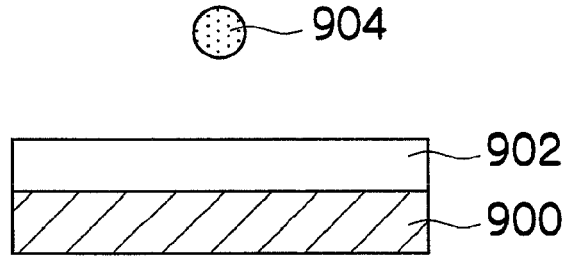
FIGS. 40A to 40E are explanatory drawings illustrating a general process of a two-liquid aggregation system in the related art.
Figure 40B:
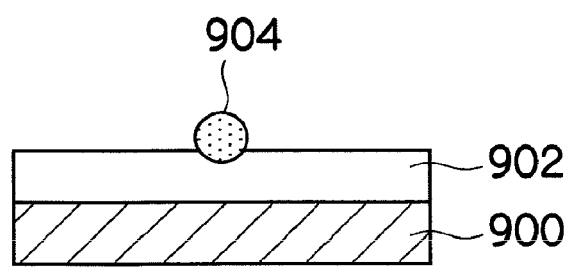
Figure 40C:
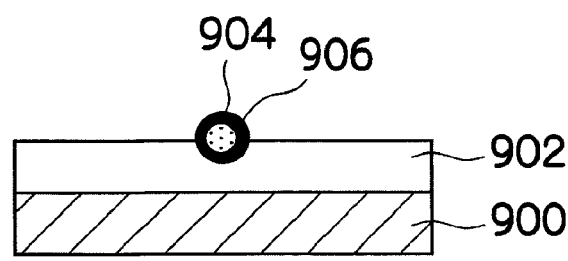
Figure 40D:
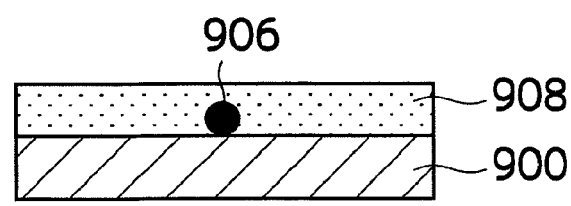
Figure 40E:
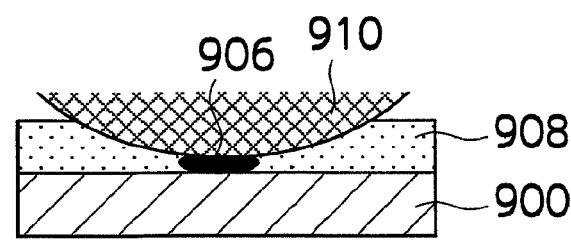
Figure 41A:
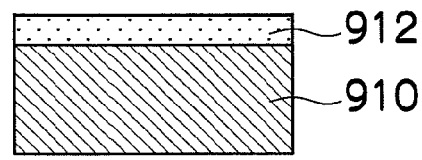
FIGS. 41A to 41D are schematic diagrams illustrating the behavior of ink droplets during landing on the intermediate transfer body in the related art.
Figure 41B:
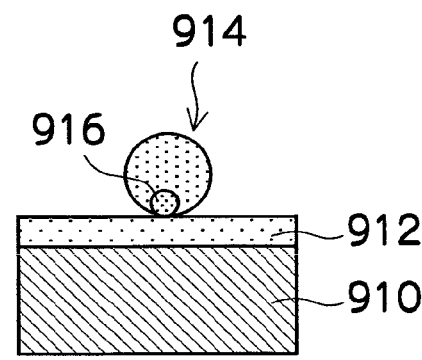
Figure 41C:
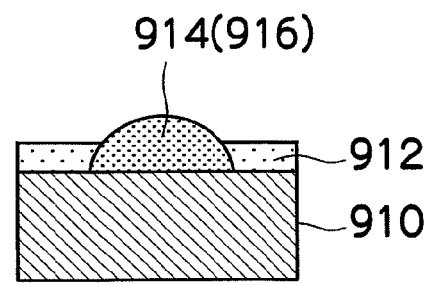
Figure 41D:
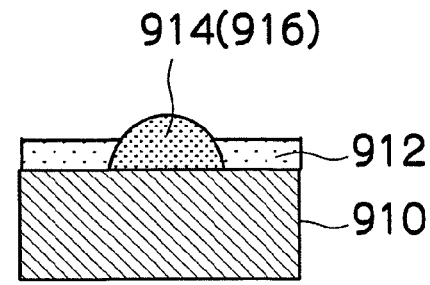

FIG. 30 shows a test device 800 of the inkjet recording apparatus used in Example 5. In the test device 800, a treatment liquid ejection head 804, a hot-air drying unit 806, an ink ejection head 808, and a solvent absorption roller 810 are disposed in the order of description from the upstream side in the conveyance direction (the direction from the right to the left in FIG. 30) of the recording medium 802 conveyed by the belt.

The conditions and method of the test of Example 5 that was performed using the test device 800 are described below.

The distance between the centers of the ink ejection head 808 and solvent absorption roller 810 was set to 350 mm.

A polyimide film (Capton H type, manufactured by Toray-DuPont) was used for the recording medium 802.

The ejection conditions were identical for the treatment liquid ejection head 804 and ink ejection head 808. The ink ejection amount (volume) was 3 pl and the droplet density (dot density) in the main scanning direction and sub-scanning direction was 1200 dpi.

In order to observe the degree of coloring material adhesion, K-Dry 62701 (manufactured by Kureshia KK) was wound about the porous body surface of the solvent absorption roller 810.

The conveyance speed of the recording medium 802 was set to 500 mm/sec. Therefore, the interval from the droplet ejection from the ink ejection head 808 to the contact with the solvent absorption roller 810 was 0.7 sec.

The degree of coloring material adsorption on the solvent absorption roller 810 was also studied for the cases in which the treatment liquid applied on the recording medium was and was not dried. The degree of adsorption was determined by measuring (Xrite 938, manufactured by Xrite Co.) the optical density of the surface of K-Dry 62701 wound about the solvent absorption roller 810 and evaluating the level and coloring material adhesion. The measurement conditions were 0/45, D50, 2 degree viewing.

The test results of Example 5 are shown in FIG. 31.

Test (a): the case in which the moisture content ratio of the aggregation treatment layer is decreased to 56% by drying, and the time from ink ejection to contact with the absorbing body (solvent absorption roller 810) is 0.7 sec.

Test (b): the case in which the moisture content ratio of the aggregation treatment layer is decreased to 52% by drying, and the time from ink ejection to contact with the absorbing body (solvent absorption roller 810) is 0.7 sec.

Test (c): the case in which no drying is performed, the moisture content ratio of the aggregation treatment layer is 87%, and the time from ink ejection to contact with the absorbing body (solvent absorption roller 810) is 0.7 sec.

Test (d): the case in which no drying is performed, the moisture content ratio of the aggregation treatment layer is 87%, and the time from ink ejection to contact with the absorbing body (solvent absorption roller 810) is increased to 30 sec by temporarily stopping the conveyance of the recording medium after ink deposition and then restarting the conveyance.

The table of FIG. 31 demonstrates the following. Comparing the tests (a), (b), (c) in which the time from ink ejection to contact with the absorbing body was the same, in the test (a) (present invention) and test (b) (present invention) in which the moisture content ratio of the aggregation treatment layer was decreased to a value not more than 56% by drying, the optical density of the surface of the K-dry 62701 wound about the solvent absorption roller 810 was significantly decreased with respect to that of test (c) (comparative example) in which no drying was performed and the moisture content ratio of the aggregation treatment layer was as high as 87%. Furthermore, the optical density of the test (a) (present invention) and test (b) (present invention) was also lower than in the test (d) (comparative example) in which the time from ink ejection to contact with the absorbing body was substantially increased to 30 sec.

These results confirmed that by depositing ink droplets after forming a semisolid aggregation treatment layer with a moisture content ratio not more than 56% on the recording medium 802 by drying, it is possible to obtain a sufficient adhesion force between the ink aggregates (dots) and the recording medium 802 and the adhesion of coloring material to the solvent absorption roller 810 can be prevented.

On the other hand, because the amount of coloring material that adhered to the solvent absorption roller 810 in test (a) is large, the solvent absorption capacity of the solvent absorption roller 810 is degraded, as the time elapses, by the coloring material that has been deposited thereon. Further, in test (b) the process speed decreased abnormally and was unsuitable for practical use.

Example 6

Example 6 is a test conducted to verify the effect produced by introducing microparticles into the treatment liquid, which is a specific feature of the invention of the third embodiment.

The compositions of the aggregation treatment agent and ink used in the test of Example 6 are shown in FIG. 32.

As shown in FIG. 32, the aggregation treatment agent (aggregation treatment liquid) that was used was prepared by adding a polyolefin particle dispersion to an acidic solution having an organic acid (2-pyrrolidone-5-carboxylic acid) dissolved therein. Chemipearl W400 manufactured by Mitsubishi Chemical Corp. (mean particle size 4.0 μm) was used as the polyolefin particle dispersion. To improve the application of the treatment agent to an intermediate transfer body with a low surface energy, a fluorine-containing surfactant was added. A pigment coloring material dispersion was used as the ink.

In Example 6, an image of a predetermined symbol was formed on the intermediate transfer body by using a system identical to the inkjet recording apparatus 500 of the intermediate transfer system shown in FIG. 21. A belt having a silicone rubber surface layer was used as the intermediate transfer body 412.

In the test of the example satisfying the requirements of the present invention, the image was formed using the aggregation treatment agent and ink shown in FIG. 32. On the other hand, in the test of the comparative example in which the requirements of the present invention were not satisfied, the image was formed under the same conditions as in the example, except that an aggregation treatment agent obtained by removing the polyolefin particles from the aggregation treatment agent shown in FIG. 32 was used.

As a test method, the case in which an image of a Japanese character "Hawk" was recorded on the intermediate transfer body and the case in which the character was recorded in white were compared. The test results are shown in FIG. 33.

As follows from FIG. 33, in the comparative example, the image shrinkage occurred in the course of ink aggregation reaction, and the usual character was fine, whereas the character recorded in white was thick.

By contrast, in the example, the particulate layer demonstrated an anchor effect, image shrinkage was prevented, the images with an intended line width were recorded both in the case of the normal character and in the case of the character recorded in white, and good character images were obtained. Further, in accordance with the present invention, because an intermediate transfer body with a smooth surface could be used, very good results relating to transferability onto paper were obtained.

Example 7

In Example 7, "image shrinkage", "image noise", and "print appearance" were evaluated by changing the mean particle size and application amount (described hereinbelow as "particle application amount") of microparticles contained in the aggregation treatment agent. Polyolefin particles were used as the microparticles. The test was conducted under the same conditions as those of Example 6, except that the mean particle size and particle application amount of microparticles (polyolefin particles) were changed.

The following evaluation criteria were used for the "image shrinkage", "image noise", and "print appearance".

<Image Shrinkage>
 "good": no image shrinkage.
 "fair": certain image shrinkage.
 "poor": large image shrinkage.

<Image Noise>
 "good": no image noise.
 "fair": certain image noise.
 "poor": large image noise.

<Print Appearance>
 "good": no unpleasant feel.
 "fair": certain unpleasant feel.
 "poor": strong unpleasant feel.

The test results of Example 7 are shown in FIGS. 34 to 36. FIG. 34 shows evaluation results relating to "image shrinkage", FIG. 35 shows evaluation results relating to "image noise", and FIG. 36 shows evaluation results relating to "print appearance".

As for the "image shrinkage", FIG. 34 demonstrates that a mean particle size of 0.1 μm to 20 μm and a particle application amount of 0.01 g/m$^2$ to 10 g/m$^2$ are preferred, and a mean particle size of 1 μm to 20 μm and a particle application amount of 0.1 g/m$^2$ to 10 g/m$^2$ are more preferred.

As for the "image noise", FIG. 35 demonstrates that a mean particle size of 0.01 μm to 10 μm and a particle application amount of 0.001 g/m$^2$ to 10 g/m$^2$ are preferred, and a mean particle size of 0.01 μm to 5 μm and a particle application amount of 0.001 g/m$^2$ to 10 g/m$^2$ are more preferred.

As for the "print appearance", FIG. 36 demonstrates that a mean particle size of 0.001 μm to 20 μm and a particle application amount of 0.001 g/m$^2$ to 5 g/m$^2$ are preferred, and a mean particle size of 0.001 μm to 20 μm and a particle application amount of 0.001 g/m$^2$ to 3 g/m$^2$ are more preferred.

The results obtained in combined evaluation of the test results shown in FIGS. 34 to 36 are shown in FIG. 37. The following evaluation criteria are used in FIG. 37 with respect to the evaluation results relating to each evaluation item. When the evaluation result is "good" for all three items, the combined evaluation is "excellent", when the evaluation result is "good" for two items and "fair" for one item, the combined evaluation is "good", when the evaluation result is "good" was for one item and "fair" for two items, the combined evaluation is "fair", and when the evaluation result is "poor" for one or more items, the combined evaluation is "poor". For example, when the mean particle size is 3 μm and the particle application amount is 0.1 g/m², the evaluation result is "good" for all the evaluation items including "image shrinkage", "image noise", and "print appearance". Therefore, the combined evaluation is "excellent". On the other hand, when the mean particle size is 5 μm and the particle application amount is 0.001 g/m², the evaluation result is "good" for "image noise" and "print appearance", but the evaluation result is "poor" for "image shrinkage". Therefore, the combined evaluation in this case is "poor".

As follows from FIG. 37, from the standpoint of the three evaluation items including "image shrinkage", "image noise", and "print appearance", the preferred mean particle size and particle application amount of microparticles contained in the aggregation treatment agent are within the following ranges: mean particle size 0.1 μm to 10 μm and particle application amount of 0.01 g/m² to 5 g/m². More preferred are the ranges obtained in the case in which a mean particle size of 0.1 μm and a particle application amount of 5 g/m² are excluded, the case in which a mean particle size of 10 μm and a particle application amount of 0.01 g/m² are excluded, and the case in which a mean particle size of 10 μm and a particle application amount of 5 g/m² are excluded from the aforementioned preferred ranges. Even more preferred are the following ranges: mean particle size 3 μm to 5 μm and particle application amount of 0.1 g/m² to 3 g/m².

As a result, it could be confirmed that the present invention ensures the preferred mean particle size and particle application amount of microparticles contained in the so aggregation treatment agent.

Example 8

In Example 8, "image shrinkage", "transferability", "gloss", and "abrasion resistance" were evaluated by changing the type of microparticles contained in the aggregation treatment agent. The test was conducted under the same conditions as those of the above-described Example 6 and Example 7, except that the type of microparticles was changed.

The following evaluation criteria were used for the "image shrinkage", "transferability", "gloss", and "abrasion resistance".

<Image Shrinkage>
"good": no image shrinkage.
"fair": certain image shrinkage.
"poor": large image shrinkage.

<Transferability>
"excellent": transferability is very good (no residual coloring material on the transfer body).
"good": transferability is good (almost no residual coloring material on the transfer body).
"fair": transferability is somewhat insufficient (certain amount of residual coloring material on the transfer body).
"poor": transferability is poor (large amount of residual coloring material on the transfer body).

<Gloss>
"good": strong feel of gloss of the image after heating and fixing.
"fair": somewhat insufficient feel of gloss of the image after heating and fixing.
"poor": poor feel of gloss of the image after heating and fixing.

<Abrasion Resistance>
"good": image film strength after heating and fixing is good.
"fair": image film strength after heating and fixing is somewhat insufficient.
"poor": image film strength after heating and fixing is insufficient.

The "image shrinkage", "transferability", and "gloss" are determined by visual observations of the samples. The "abrasion resistance" is determined by placing an image surface on a paper side of a paper sheet (recording medium), rubbing with a finger, and then visually observing the image surface fracture state.

The test results are shown in FIG. 38.

As follows from FIG. 38, when metal microparticles (titanium oxide microparticles: Tipark R980, manufactured by Ishihara Sangyo Kaisha Ltd.) were used, because the particles did not melt during heating and fixing, "gloss" and "abrasion resistance" were significantly degraded.

Further, when a low-molecular organic compound (paraffin wax microparticles: Trasol PF60, manufactured by Chukyo Yushi Co., Ltd.) was used, toughness was poor and, therefore, "abrasion resistance" was significantly degraded.

When acrylic polymer microparticles (Jurimer FC-30, manufactured by Nippon Junyaku KK) were used, good results were obtained for "image shrinkage", "transferability", "gloss", and "abrasion resistance". Even better transferability was obtained when polyolefin particles were used.

The test results obtained in the above-described Examples 6 to 8 demonstrate that by applying an aggregation treatment agent (aggregation treatment liquid) including a component causing an ink coloring material to aggregate and substantially colorless microparticles on the intermediate transfer body 412 and forming a particulate layer composed of the microparticles on the intermediate transfer body prior to the application of ink to the intermediate transfer body 412, it is possible to suppress the shrinkage of image caused by the aggregation reaction of ink by the anchor effect of the particulate layer. Further, the particulate layer formed on the intermediate transfer body 412 decreased the contact surface area of the image (ink layer) and intermediate transfer body 412 and transferability to the recording medium 414 is increased.

Example 9

Example 9 is a test performed to confirm the effect of microparticles contained in the first treatment liquid when the first treatment liquid and second treatment liquid are separate liquids.

The compositions of the first treatment liquid, second treatment liquid, and ink used in Example 9 are shown in FIG. 39.

According to FIG. 39, the first treatment liquid included a polyolefin particle dispersion (Chemipearl W400 manufactured by Mitsubishi Chemical Corp.). This first treatment liquid was non-acidic and, therefore, the dispersion state of microparticles could be maintained with good stability. Further, the second treatment liquid was an acidic solution having an organic acid (2-pyrrolidone-5-carboxylic acid) dissolved therein. Further, in order to improve the application of the treatment liquid to the intermediate transfer body 412, a respective fluorine-containing surfactant was added to each treatment liquid.

As an example of the present invention, an image was formed by using the first treatment liquid, second treatment liquid, and ink shown in FIG. 39. On the other hand, as a comparative example, an image was formed under the same conditions as in the example, except that the first treatment liquid shown in FIG. 39 was not applied to the intermediate transfer body.

The case in which an image of a Japanese character "Hawk" was recorded on the intermediate transfer body and the case in which the character was recorded in white were compared, as in the above-descried Example 6. In the comparative example, the image shrinkage occurred and the image formation ability was not good, whereas in the example, the particulate layer demonstrated an anchor effect, image shrinkage was prevented, and good images were obtained. Further, in the example, very good results relating to transferability onto paper were obtained.

Therefore, by applying the first treatment liquid including substantially colorless microparticles and forming a particulate layer composed of the microparticles on the intermediate transfer body 412 prior to the application of the second treatment liquid including a component causing the ink coloring material to aggregate and the ink to the intermediate transfer body 412, and by forming the particulate layer comprising the microparticles on the intermediate transfer body 412, it was possible to suppress the shrinkage of image in the course of the aggregation reaction of ink by the anchor effect of the particulate layer. Further, the particulate layer formed on the intermediate transfer body 412 decreased the contact surface area of the image (ink layer) and intermediate transfer body 412 and transferability to the recording medium 414 was increased.

It should be understood, however, that there is no intention to limit the invention to the specific forms disclosed, but on the contrary, the invention is to cover all modifications, alternate constrictions and equivalents falling within the spirit and scope of the invention as expressed in the appended claims.

What is claimed is:

1. An image forming method for forming an image on an image formation body, by using an ink liquid, including a coloring material and an aggregation treatment agent including a component that causes the coloring material to aggregate, the method comprising:
    an aggregation treatment layer formation step of forming, on the image formation body, a semisolid aggregation treatment layer that includes the aggregation treatment agent and substantially colorless microparticles and has a moisture content ratio not more than 56%;
    an ink droplet deposition step of ejecting droplets of the ink liquid and depositing the droplets of the ink liquid onto the image formation body where the aggregation treatment layer has been formed; and
    a solvent removal step of removing a liquid solvent present on the image formation body after the ink droplet deposition step, wherein
    a mean particle size of the microparticles is 0.1 µm to 10.0 µm; and
    an amount of the microparticles applied to the intermediate transfer body is 0.01 g/m² to 5.0 g/m².

2. The image forming method as defined in claim 1, wherein a liquid including the aggregation treatment agent and the substantially colorless microparticles is dried in the aggregation treatment layer formation step.

3. The image forming method as defined in claim 1, wherein the image forming method employs a direct image formation system in which an image is directly formed on the image formation body.

4. The image forming method as defined in claim 1, wherein the image formation body is a recording medium having a property of being mildly permeable or impermeable to liquid.

5. The image forming method as defined in claim 1, wherein the image forming method employs an intermediate transfer system in which an image is formed on the image formation body that is impermeable and the image is then transferred onto a recording medium.

6. The image forming method as defined in claim 1, wherein the solvent removal step includes the step of removing the liquid solvent present on the image formation body by drying.

7. The image forming method as defined in claim 1, wherein the solvent removal step includes the step of removing the liquid solvent present on the image formation body by absorption on an absorbing body.

8. An image forming apparatus which forms an image on an image formation body by using an ink liquid including a coloring material and an aggregation treatment agent including a component that causes the coloring material to aggregate, the apparatus comprising:
    an aggregation treatment layer formation device which forms, on the image formation body, a semisolid aggregation treatment layer that includes the aggregation treatment agent and substantially colorless microparticles and has a moisture content ratio not more than 56%;
    an ink droplet deposition device which ejects droplets of the ink liquid and deposits the droplets of the ink liquid onto the image formation body where the aggregation treatment layer has been formed; and
    a solvent removal device which removes a liquid solvent present on the image formation body after the droplets of the ink liquid have been deposited on the image formation body by the ink droplet deposition device, wherein
    the aggregation treatment layer formation device is a device suitable to apply the microparticles having a mean particle size of 0.1 µm to 10.0 µm to the image formation body, at a rate of 0.01 g/m² to 5.0 g/m².

9. The image forming apparatus as defined in claim 8, wherein the aggregation treatment layer formation device comprises:
    an aggregation treatment liquid application device which applies an aggregation treatment liquid obtained by converting the aggregation treatment agent into a liquid onto the image formation body; and
    an aggregation treatment liquid drying device which dries the aggregation treatment liquid having been applied on the image formation body and forms the semisolid aggregation treatment layer on the image formation body.

10. The image forming apparatus as defined in claim 8, wherein the image forming apparatus is of a direct image formation system in which an image is directly formed on the image formation body.

11. The image forming apparatus as defined in claim 8, wherein the image formation body is a recording medium having a property of being mildly permeable or impermeable to liquid.

12. The image forming apparatus as defined in claim 8, wherein the image forming apparatus is of an intermediate transfer system in which an image is formed on the image formation body that is impermeable and the image is then transferred onto a recording medium.

13. The image forming apparatus as defined in claim 8, wherein the solvent removal device includes a device which removes a liquid solvent present on the image formation body by drying.

14. The image forming apparatus as defined in claim 8, wherein the solvent removal device includes a device which removes a liquid solvent present on the image formation body by absorption on an absorbing body.

15. An image forming method, comprising the steps of:
applying a liquid including a component that causes a coloring material of an ink to aggregate and substantially colorless microparticles onto an intermediate transfer body;
drying the liquid applied on the intermediate transfer body and forming a particulate layer including the microparticles and having a moisture content ratio not more than 56%;
ejecting droplets of the ink and depositing the droplets of the ink onto the intermediate transfer body where the particulate layer has been formed, in accordance with image data;
removing a liquid solvent present on the intermediate transfer body; and
transferring an image formed on the intermediate transfer body to a recording medium, wherein
a mean particle size of the microparticles is 0.1 μm to 10.0 μm; and
an amount of the microparticles applied to the intermediate transfer body is 0.01 $g/m^2$ to 5.0 $g/m^2$.

16. The image forming method as defined in claim 15, wherein the microparticles include an organic compound.

17. The image forming method as defined in claim 16, wherein the microparticles include a polymer.

18. The image forming method as defined in claim 17, wherein the microparticles include a polyolefin.

19. An image forming method, comprising the steps of:
applying a first liquid including substantially colorless microparticles to an intermediate transfer body;
applying a second liquid including a component that causes a coloring material of an ink to aggregate to the intermediate transfer body;
drying the first liquid and the second liquid present on the intermediate transfer body after at least the second liquid has been applied on the intermediate transfer body, and forming a particulate layer including the microparticles and having a moisture content ratio not more than 56%;
ejecting droplets of the ink and depositing the droplets of the ink onto the intermediate transfer body where the particulate layer has been formed, in accordance with image data;
removing a liquid solvent present on the intermediate transfer body; and
transferring an image formed on the intermediate transfer body to a recording medium, wherein
a mean particle size of the microparticles is 0.1 μm to 10.0 μm; and
an amount of the microparticles applied to the intermediate transfer body is 0.01 $g/m^2$ to 5.0 $g/m^2$.

20. The image forming method as defined in claim 19, wherein the microparticles include an organic compound.

21. The image forming method as defined in claim 20, wherein the microparticles include a polymer.

22. The image forming method as defined in claim 21, wherein the microparticles include a polyolefin.

23. An image forming apparatus, comprising:
a liquid application device which applies a liquid including a component that causes a coloring material of an ink to aggregate and substantially colorless microparticles onto an intermediate transfer body;
a drying device which dries the liquid having been applied on the intermediate transfer body and forms a particulate layer including the microparticles and having a moisture content ratio not more than 56%;
an ink droplet deposition device which ejects droplets of the ink and deposits the droplets of the ink onto the intermediate transfer body where the particulate layer has been formed, in accordance with image data;
a solvent removal device which removes a liquid solvent present on the intermediate transfer body; and
a transfer device which transfers an image formed on the intermediate transfer body to a recording medium,
wherein the liquid application device is a device suitable to apply the microparticles having a mean particle size of 0.1 μm to 10.0 μm to the intermediate transfer body, at a rate of 0.01 $g/m^2$ to 5.0 $g/m^2$.

24. An image forming apparatus, comprising:
a first liquid application device which applies a first liquid including substantially colorless microparticles to an intermediate transfer body;
a second liquid application device which applies a second liquid including a component that causes a coloring material of an ink to aggregate to the intermediate transfer body;
a drying device which dries the first liquid and the second liquid present on the intermediate transfer body after at least the second liquid has been applied on the intermediate transfer body and forms a particulate layer including the microparticles and having a moisture content ratio not more than 56%;
an ink droplet deposition device which ejects droplets of the ink and deposits the droplets of the ink onto the intermediate transfer body where the particulate layer has been formed, in accordance with image data;
a solvent removal device which removes a liquid solvent present on the intermediate transfer body; and
a transfer device which transfers an image formed on the intermediate transfer body to a recording medium,
wherein the first liquid application device is a device suitable to apply the microparticles having a mean particle size of 0.1 μm to 10.0 μm to the intermediate transfer body, at a rate of 0.01 $g/m^2$ to 5.0 $g/m^2$.

* * * * *